(12) United States Patent
Zhang et al.

(10) Patent No.: US 11,218,267 B2
(45) Date of Patent: *Jan. 4, 2022

(54) CONFIGURABLE REFERENCE SIGNALS

(71) Applicant: Convida Wireless, LLC, Wilmington, DE (US)

(72) Inventors: Qian Zhang, Basking Ridge, NJ (US); Qing Li, Princeton Junction, NJ (US); Allan Y. Tsai, Boonton, NJ (US); Guodong Zhang, Woodbury, NY (US); Lakshmi R. Iyer, King of Prussia, PA (US); Tianyi Xu, San Jose, CA (US); Pascal M. Adjakple, Great Neck, NY (US); Ahmed ElSamadouny, Austin, TX (US); Salman Khan, Austin, TX (US); Yifan Li, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,489

(22) Filed: Sep. 14, 2020

(65) Prior Publication Data
US 2020/0412498 A1 Dec. 31, 2020

Related U.S. Application Data

(63) Continuation of application No. 16/093,287, filed as application No. PCT/US2017/028633 on Apr. 20, 2017, now Pat. No. 10,812,238.
(Continued)

(51) Int. Cl.
*H04L 5/00* (2006.01)
*H04W 16/28* (2009.01)
(Continued)

(52) U.S. Cl.
CPC ............ *H04L 5/005* (2013.01); *H04B 7/024* (2013.01); *H04B 7/0456* (2013.01);
(Continued)

(58) Field of Classification Search
CPC ..... H04L 5/005; H04L 5/0051; H04L 5/0023; H04B 7/024; H04B 7/0456; H04B 7/0695; H04B 7/0413; H04B 7/088; H04W 16/28
See application file for complete search history.

(56) References Cited

U.S. PATENT DOCUMENTS 8,902,773 B2 12/2014 Anderson et al.
9,002,979 B2 4/2015 Hansen
(Continued)

FOREIGN PATENT DOCUMENTS

CN 101622891 A 1/2010
CN 101690271 A 3/2010
(Continued)

OTHER PUBLICATIONS

"Nokia Networks Enhancements for MTC Paging", R3-151590 Discussion Paper MTC Paging vB, Aug. 14, 2015.
(Continued)

*Primary Examiner* — Deepa Belur
(74) *Attorney, Agent, or Firm* — BakerHostetler

(57) ABSTRACT

It is recognized herein that current LTE reference signals may be inadequate for future cellular (e.g., New Radio) systems. Configurable reference signals are described herein. The configurable reference signals can support mixed numerologies and different reference signal (RS) functions. Further, reference signals can be configured so as to support beam sweeping and beamforming training.

20 Claims, 64 Drawing Sheets

Related U.S. Application Data

(60) Provisional application No. 62/416,902, filed on Nov. 3, 2016, provisional application No. 62/373,176, filed on Aug. 10, 2016, provisional application No. 62/338,350, filed on May 18, 2016, provisional application No. 62/325,394, filed on Apr. 20, 2016.

(51) Int. Cl.
    *H04B 7/0456*    (2017.01)
    *H04B 7/06*      (2006.01)
    *H04B 7/08*      (2006.01)
    *H04B 7/024*     (2017.01)
    *H04B 7/0413*    (2017.01)

(52) U.S. Cl.
    CPC .......... *H04B 7/0695* (2013.01); *H04B 7/088* (2013.01); *H04L 5/0023* (2013.01); *H04L 5/0051* (2013.01); *H04W 16/28* (2013.01); *H04B 7/0413* (2013.01)

(56) References Cited

U.S. PATENT DOCUMENTS

| | | |
|---|---|---|
| 9,198,181 B2 | 11/2015 | Blankenship et al. |
| 9,276,710 B2 | 3/2016 | Damnjanovic et al. |
| 9,338,700 B2 | 5/2016 | Schulist et al. |
| 9,413,451 B2 | 8/2016 | Park et al. |
| 9,559,797 B2 | 1/2017 | Liao et al. |
| 10,028,302 B2 | 7/2018 | Au et al. |
| 10,111,163 B2 | 10/2018 | Vrzic et al. |
| 10,306,671 B2 | 5/2019 | Li et al. |
| 10,432,362 B2 | 10/2019 | Iyer et al. |
| 2007/0042784 A1 | 2/2007 | Anderson |
| 2008/0205351 A1 | 8/2008 | Lindoff et al. |
| 2009/0047902 A1 | 2/2009 | Nory et al. |
| 2009/0298497 A1 | 12/2009 | Lee |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0227611 A1 | 9/2010 | Schmidt et al. |
| 2011/0077013 A1 | 3/2011 | Cho et al. |
| 2011/0222428 A1 | 9/2011 | Charbit et al. |
| 2011/0242997 A1 | 10/2011 | Yin |
| 2012/0009963 A1 | 1/2012 | Kim et al. |
| 2012/0127934 A1 | 5/2012 | Anderson et al. |
| 2012/0163335 A1 | 6/2012 | Chung et al. |
| 2012/0238264 A1 | 9/2012 | Jindal |
| 2013/0017833 A1 | 1/2013 | Sakamoto et al. |
| 2013/0034071 A1 | 2/2013 | Lee et al. |
| 2013/0077574 A1 | 3/2013 | Chandrasekhar et al. |
| 2013/0155847 A1 | 6/2013 | Li et al. |
| 2013/0188503 A1 | 7/2013 | Anepu et al. |
| 2013/0225184 A1 | 8/2013 | Liu et al. |
| 2013/0242882 A1 | 9/2013 | Blankenship et al. |
| 2013/0265932 A1 | 10/2013 | Huang et al. |
| 2014/0036806 A1 | 2/2014 | Chen et al. |
| 2014/0086217 A1 | 3/2014 | Park et al. |
| 2014/0204854 A1 | 7/2014 | Freda et al. |
| 2014/0206854 A1 | 7/2014 | Bennett et al. |
| 2014/0223095 A1 | 8/2014 | Storm et al. |
| 2014/0254544 A1 | 9/2014 | Kar et al. |
| 2014/0293901 A1 | 10/2014 | Hegde |
| 2014/0293942 A1 | 10/2014 | Kang et al. |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2015/0223279 A1 | 8/2015 | Jiao et al. |
| 2015/0234708 A1 | 8/2015 | Storm et al. |
| 2015/0282130 A1 | 10/2015 | Webb et al. |
| 2015/0326484 A1 | 11/2015 | Cao et al. |
| 2015/0327245 A1 | 11/2015 | Zhu et al. |
| 2015/0341091 A1 | 11/2015 | Park et al. |
| 2015/0382262 A1 | 12/2015 | Cho et al. |
| 2015/0382268 A1 | 12/2015 | Hampel et al. |
| 2016/0020877 A1 | 1/2016 | Koutsimanis et al. |
| 2016/0036578 A1 | 2/2016 | Malladi et al. |
| 2016/0073302 A1 | 3/2016 | Yang et al. |
| 2016/0100395 A1 | 4/2016 | Xu et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0165622 A1* | 6/2016 | Luo .................. H04L 1/0028 370/329 |
| 2016/0182201 A1* | 6/2016 | Jiang ................ H04L 5/005 370/235 |
| 2016/0192433 A1 | 6/2016 | Deenoo et al. |
| 2016/0234736 A1 | 8/2016 | Kubota et al. |
| 2016/0234759 A1 | 8/2016 | Kubota et al. |
| 2016/0249269 A1 | 8/2016 | Niu et al. |
| 2016/0253240 A1 | 9/2016 | Cocagne |
| 2016/0270102 A1 | 9/2016 | Zeng et al. |
| 2016/0352545 A1 | 12/2016 | Johnson |
| 2016/0353343 A1 | 12/2016 | Rahman et al. |
| 2016/0353465 A1 | 12/2016 | Vrzic et al. |
| 2017/0013598 A1 | 1/2017 | Jung et al. |
| 2017/0034845 A1 | 2/2017 | Liu et al. |
| 2017/0118054 A1 | 4/2017 | Ma et al. |
| 2017/0134913 A1 | 5/2017 | Cui et al. |
| 2017/0164212 A1 | 6/2017 | Opsenica et al. |
| 2017/0164349 A1 | 6/2017 | Zhu et al. |
| 2017/0201980 A1 | 7/2017 | Hakola et al. |
| 2017/0230985 A1 | 8/2017 | Yamada et al. |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2017/0366311 A1 | 12/2017 | Iyer et al. |
| 2018/0034612 A1 | 2/2018 | Lin et al. |
| 2018/0076994 A1 | 3/2018 | Lee et al. |
| 2018/0115357 A1* | 4/2018 | Park ................... H04B 7/06 |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0270696 A1 | 9/2018 | Duan et al. |
| 2018/0287722 A1 | 10/2018 | Takano |
| 2018/0294860 A1 | 10/2018 | Hakola et al. |
| 2018/0332632 A1 | 11/2018 | Vikberg et al. |
| 2018/0338277 A1 | 11/2018 | Byun et al. |
| 2018/0343043 A1 | 11/2018 | Hakola et al. |
| 2018/0367255 A1 | 12/2018 | Jeon et al. |
| 2018/0368018 A1 | 12/2018 | Kim et al. |
| 2019/0045340 A1 | 2/2019 | Zhu et al. |
| 2019/0045577 A1 | 2/2019 | Kim et al. |
| 2019/0089423 A1* | 3/2019 | Davydov .......... H04B 7/0478 |
| 2019/0159107 A1 | 5/2019 | Kim et al. |
| 2019/0182856 A1 | 6/2019 | Moroga et al. |
| 2019/0190579 A1 | 6/2019 | Wang et al. |
| 2019/0200315 A1* | 6/2019 | Tsai .................. H04W 56/001 |
| 2019/0208474 A1 | 7/2019 | Ali et al. |
| 2019/0281623 A1 | 9/2019 | Andgart et al. |
| 2019/0288789 A1 | 9/2019 | Li et al. |
| 2019/0342782 A1* | 11/2019 | Yum ................. H04L 5/0094 |
| 2019/0363777 A1* | 11/2019 | Karjalainen ....... H04B 7/0626 |
| 2020/0092065 A1 | 3/2020 | Kuang et al. |
| 2020/0351917 A1 | 11/2020 | Bang et al. |
| 2020/0359391 A1 | 11/2020 | Baldemair et al. |
| 2020/0383129 A1* | 12/2020 | Ko ................. H04L 27/2607 |
| 2020/0404655 A1 | 12/2020 | Salem |
| 2020/0404663 A1 | 12/2020 | Zhang et al. |
| 2021/0029646 A1 | 1/2021 | Park |
| 2021/0037561 A1 | 2/2021 | Lyu et al. |
| 2021/0044385 A1 | 2/2021 | Hosseini et al. |
| 2021/0045125 A1 | 2/2021 | Mondal et al. |

(56) References Cited

U.S. PATENT DOCUMENTS

| | | |
|---|---|---|
| 2021/0045181 A1 | 2/2021 | Li et al. |
| 2021/0051646 A1 | 2/2021 | Maaref et al. |
| 2021/0068138 A1 | 3/2021 | Baldemair et al. |
| 2021/0105104 A1 | 4/2021 | Cao et al. |
| 2021/0105833 A1 | 4/2021 | Freda et al. |

FOREIGN PATENT DOCUMENTS

| | | |
|---|---|---|
| CN | 101917765 A | 12/2010 |
| CN | 102026270 A | 4/2011 |
| CN | 102045849 A | 5/2011 |
| CN | 102090126 A | 6/2011 |
| CN | 102474394 A | 5/2012 |
| CN | 102577294 A | 7/2012 |
| CN | 102726109 A | 10/2012 |
| CN | 103069739 A | 4/2013 |
| CN | 103560936 A | 2/2014 |
| CN | 103563462 A | 2/2014 |
| CN | 104092488 A | 10/2014 |
| CN | 104205930 A | 12/2014 |
| CN | 104394558 A | 3/2015 |
| CN | 104753780 A | 7/2015 |
| CN | 104869583 A | 8/2015 |
| CN | 104936189 A | 9/2015 |
| CN | 105050189 A | 11/2015 |
| CN | 105162557 A | 12/2015 |
| CN | 105284172 A | 1/2016 |
| CN | 105323049 A | 2/2016 |
| CN | 105471487 A | 4/2016 |
| EP | 2464076 A2 | 6/2012 |
| EP | 2553860 A1 | 2/2013 |
| EP | 2710844 A1 | 3/2014 |
| EP | 2869478 A1 | 5/2015 |
| EP | 2882110 A1 | 6/2015 |
| EP | 3051906 A1 | 8/2016 |
| EP | 3082362 A1 | 10/2016 |
| EP | 3101971 A1 | 12/2016 |
| EP | 3420659 A1 | 1/2019 |
| JP | 2010-508789 A | 3/2010 |
| JP | 2010-519838 A | 6/2010 |
| JP | 2012-507961 A | 3/2012 |
| JP | 2014-502128 A | 1/2014 |
| JP | 2016-504798 A | 2/2016 |
| JP | 2016-504851 A | 2/2016 |
| JP | 2016-514416 A | 5/2016 |
| JP | 2019-525616 A | 9/2019 |
| KR | 10-2008-0041237 A | 5/2008 |
| KR | 10-2008-0109535 A | 12/2008 |
| KR | 10-2009-0085640 A | 8/2009 |
| KR | 10-2010-0065327 A | 6/2010 |
| KR | 10-2010-0097625 A | 9/2010 |
| KR | 10-2011-0063565 A | 6/2011 |
| KR | 10-2014-0043532 A | 4/2014 |
| KR | 10-2014-0098156 A | 8/2014 |
| KR | 10-2015-0118874 A | 10/2015 |
| KR | 10-1563469 B1 | 10/2015 |
| WO | 2007/052753 A1 | 5/2007 |
| WO | 2007/125910 A1 | 11/2007 |
| WO | 2010/001474 A1 | 1/2010 |
| WO | 2011/097904 A1 | 8/2011 |
| WO | 2011/123805 A1 | 10/2011 |
| WO | 2012/130180 A1 | 10/2012 |
| WO | 2012/155326 A1 | 11/2012 |
| WO | 2014/090200 A1 | 6/2014 |
| WO | 2014/090208 | 6/2014 |
| WO | 2014/135126 A1 | 9/2014 |
| WO | 2014/183803 A1 | 11/2014 |
| WO | 2015/045658 A1 | 4/2015 |
| WO | 2015/067196 A1 | 5/2015 |
| WO | 2015/080646 A1 | 6/2015 |
| WO | 2015/084048 A1 | 6/2015 |
| WO | 2015/100533 A1 | 7/2015 |
| WO | 2015/113205 A1 | 8/2015 |
| WO | 2015/122737 A1 | 8/2015 |
| WO | 2015/141982 A1 | 9/2015 |
| WO | 2016/033731 A1 | 3/2016 |
| WO | WO-2016094191 A1 * | 6/2016 ........ H04W 72/1226 |
| WO | 2016/130353 A2 | 8/2016 |
| WO | 2017/147515 A1 | 8/2017 |
| WO | 2017/191833 A1 | 11/2017 |
| WO | 2017/195478 A1 | 11/2017 |
| WO | 2018/028602 A1 | 2/2018 |

OTHER PUBLICATIONS

Huawei, HiSilicon LTE-NR tight interworking control plane, R2-164268 LTE-NR tight interworking control plane, May 14, 2016.

3GPP TSG GERA1 Adhoc #3 GPC150521, Samsung Electronics, "Discussions of Grant-Free Multiple Access in CIoT (Update GPC150512)", Jul. 2015, 9 pages.

3GPP TSG RAN WG1 Meeting #84bis R1-163049, Design Options for Longer Cyclic Prefix for MBSFN Subframes, Apr. 2016, 3 pages.

3GPP TSG-RAN WG2 Meeting #95 R2-164693, Samsung, "System Information Signalling Design in NR" Aug. 2016, 6 pages.

3GPP TSG-RAN2 meeting #95bis R2-166202, Huawei et al., "Further Discussions of Minimum SI" Oct. 2016, 3 pages.

3GPP TSG-RAN2 Meeting #95bis R2-166203, Huawei et al., "Delivery of "Other SI" in NR", Oct. 2016, 5 pages.

3GPP TSG=RAN WG2 Meeting #95bis, ETSI MCC, "Skeleton report", Oct. 2016, 5 pages.

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.

3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.

3rd Generation Partnership Project (3GPP) RP-161214 TSG RAN Meeting #72, Revision of SI: Study on New Radio Access Technology, NTT Docomo, Busan, Korea, Jun. 13-16, 2016, 8 pages.

3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, no. Belgrade Serbia, Aug. 24, 2015, 3 pages.

3rd Generation Partnership Project (3GPP) S1-161323 TSG-SA WG1 Meeting #74, Editorial cleanup and alignment of eMBB TR22.863, Venice, Italy, May 9-13, 2016, 4 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.

3rd Generation Partnership Project (3GPP) S2-161324 SA WG2 Meeting #113, Solution to Key Issue on Mobility Framework, Sophia Antipolis, FR, Feb. 23-26, 2016, 3 pages.

3rd Generation Partnership Project (3GPP) S2-162982 was S2-162717-MDD and Slice Selection in core and RAN V1, 3rd vol. SA WG2, Nokia et al., no. Nanjing, P.R. China; May 27, Z016, 13 pages.

3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.

3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.

3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.

(56) References Cited

OTHER PUBLICATIONS

3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS TSG RAN WG1 Meeting #85,2016 Nanjing, China 23rd-27th,NTT DoCoMo, Inc, Uplink Multiple Access Schemes for NR, 7.1.3.2, Discussion and Decision, May 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project; (3GPP) TR 22.891 V1.1.0, 3rd Generation Partnership Project; Technical Specification Group Ser-

(56) References Cited

OTHER PUBLICATIONS vices and System Aspects; Feasibility Study on New Services and Markets Technology Enablers; Stage 1 (Release 14), Nov. 2015, 95 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
Budisin, "Decimation Generator of Zadoff-Chu Sequences", C. Carlet and A. Pott (Eds ): SETA 2010, LNCS 6338, pp. 30-40, 2010.
Chu, David, "Polyphase Codes With Good Periodic Correlation Properties", IEEE Transactions on Information Theory, Jul. 1972, 531-532.
Consideration on System Information Broadcast in New RAT, ZTE, 3GPPTSG-RANWG2 Meeting #93bis, R2-162629, Apr. 15, 2016.
ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.
ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.
Huawei et al., "Discussion on frame structure for NR", 3 GPP TSG-RAN WG1#85, R1-164032, May 23-27, 2016, 8 pages.
Huawei, "HiSilicon, UE Slice Association/Overload control Procedure", 3GPP TSG-SA WG2 #115 SZ-162605, May 17, 2016, URL:http://www. 3gpp.org/ftp/tsg_sa/WG2_Arch/TSGS2_115_Nanjing_China/Docs/S2-162605.zip, 11 pages.
IEEE P802.11, Wireless LANs, Proposed TGax draft specification, Comment Resolutions on UL MU Operation, Jul. 25, 2016, 27 pages.
International Telecommunication Union (ITU-R), "IMT Vision—Framework and overall objectives of the future development of IMT for 2020 and beyond", Recommendation ITU-R M.2083-0, Sep. 2015, 21 pages.
ITRI, "Updates to Solution 6. 1.3: Introducing Network Instance ID", 3GPP TSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.
MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.
NGMN 5G Initiative White Paper v1.0, Feb. 17, 2015, 125 pages.
Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_Arch/TSGS2_115_Nanjing_China/Docs/S2-162982.zip, 15 pages.
Nokia, "Solutions for Network Slice Selection", Alcatel-Lucent Shanghai Bell, 3GPP TSGG-RAN WG3 Meeting #92, R3-161356, China, May 23-27, 2016, 9 pages.
NTT Docomo Inc., "Discussion on frame structure for NR", 3GPP TSG-RAN WG1#85, R1-165176, May 23-May 27, 2016, 10 pages.
Qualcomm Incorporated: "Frame structure requirements", 3GPP Draft; vol. RAN WG1, no. Nanjing, China; May 14, 2016.
Qualcomm, 3GPP R1-1612062, TSG-RAN WG1 #87, Control Channel for slot format indicator, Nov. 14-18, 2016 (Year: 2016).
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ;France, RAN WG1, no. Lisbon, Portugal; Oct. 1O, 2016-Oct. 14, 2016 Sep. 30, 2016.
Sesia et al., "LTE—The UMTS Long Term Evolution", Chapter 9.3.3., LTE—The UMTS Long Term Evolution : from theory to Practice; Jul. 20, 2011, pp. 198-200.
ZTE et al., "Forward compatibilty for numerology and fr ame structure design", R1-164261, 3GPP TSG-RAN WG1#85, May 23-27, 2016, 7 pages.
ZTE, "Consideration on RAN architecture impacts of network slicing", 3GPP TSG-RAN WG2 Meeting #93bis, R2-162627, Croatia, Apr. 11-15, 2016, 10 pages.
Huawei et al., "Numerology and wideband operation in NR unlicensed", 3GPP Draft; R1-1803677, 3rd Generation Partnership vol. RAN WG1, no. Sanya, China; Apr. 16, 2018-Apr. 20, 2018, Apr. 15, 2018, Apr. 16, 2018-Apr. 20, 2018.
Huawei et al: "Initial access in NR unlicensed", 3GPP Draft R1-1808062 3rd Generation Partnership Project (3GPP), Mobile Competence Centre, vol. RAN WG1, No. Aug. 10, 2018, Aug. 20, 2018-Aug. 24, 2018.
Nokia et al: Feature Lead's Summary on Channel Access Procedures 3GPP Draft; R1-1809801 NRU Channel Access Summary 3rd Generation Partnership Project (3GPP), Mobile Competence Centre, vol. RAN WG1, no. Gothenburg, Sweden; Aug. 23, 2018, Aug. 20, 2018-Aug. 20, 2018.
ZTE: "Considerations on channel access procedure for NR-U", 3GPP Draft; R2-1811281 Considerations on Random Access Procedure for NR-U, 3rd Generation Partnership Project (3GPP), Mobile Competence Centre vol. RAN WG2, no. Gothenburg, Sweden; Aug. 9, 2018, Aug. 20, 2018-Aug. 24, 2018.
CATT: "On interference measurement enhancement for multi-user MIMO operation", 3GPP TSG RAN WG1 Meeting #85, R1-164223, May 14, 2016, May 23, 2016-May 27, 2016, XP051096527.
CATT: "WF on Interference Measurement Enhancements", 3GPP TSG RAN WGI Meeting #86bis, R1-1610771, Oct. 18, 2016, Oct. 10, 2016-Oct. 14, 2016, XP051160249.
3GPP TS 36.211 V13.0.0, "Technical Specification Group Radio Access Network; Evolved Universal Terrestrial Radio Access (E-UTRA); Physical Channels and Modulation (Release 13)", Dec. 2015, 141pages.

\* cited by examiner

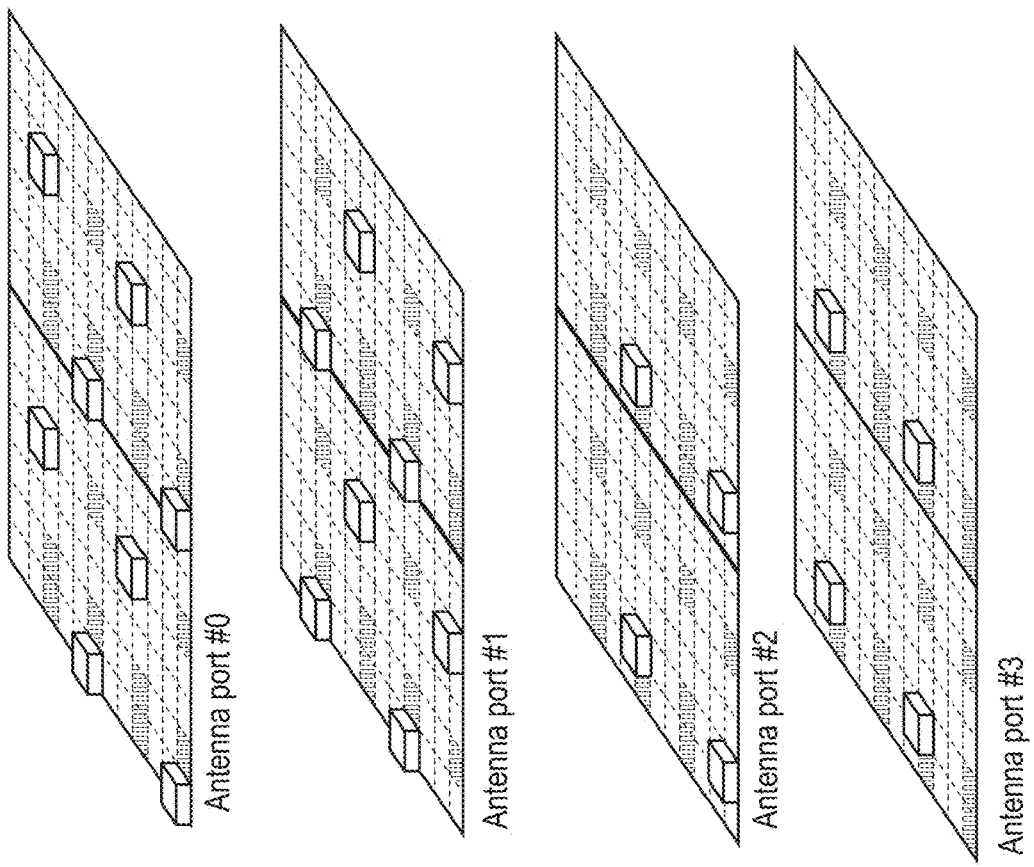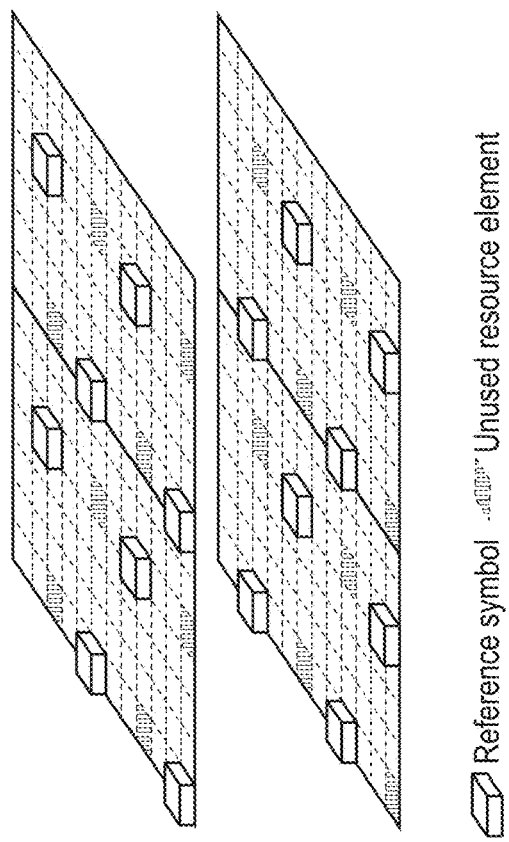
FIG. 1

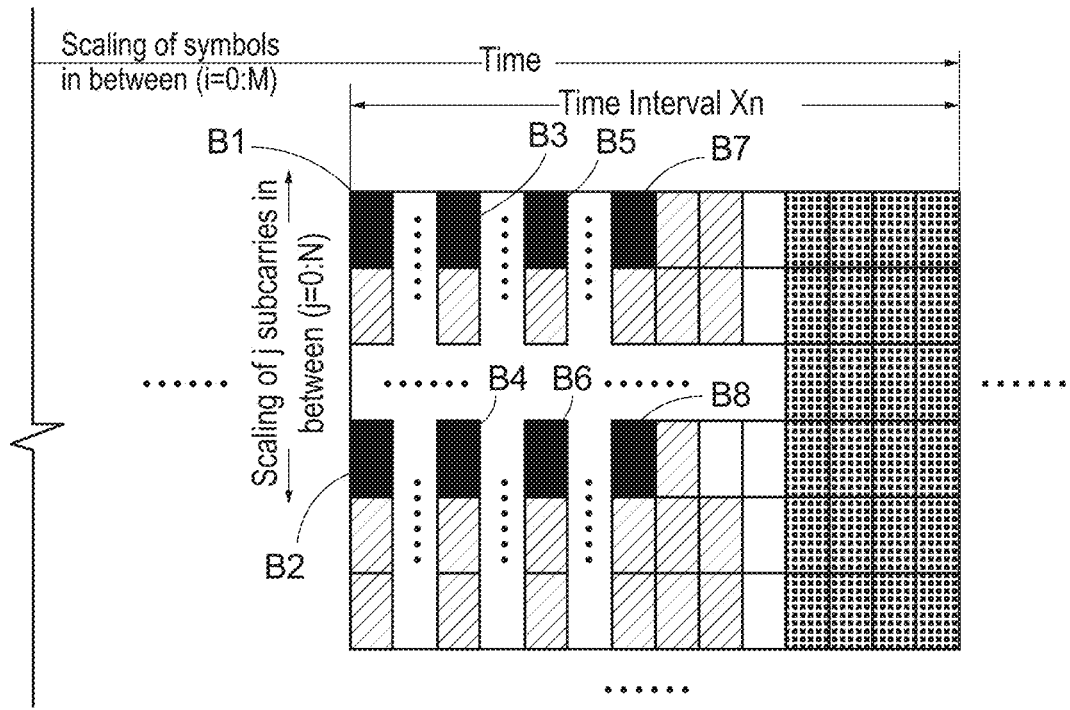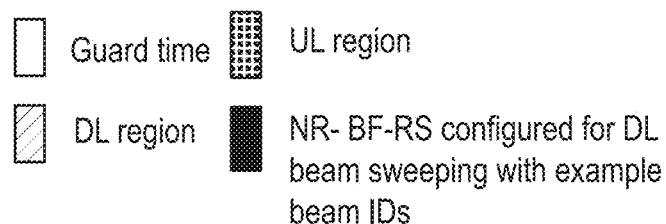
FIG. 16B

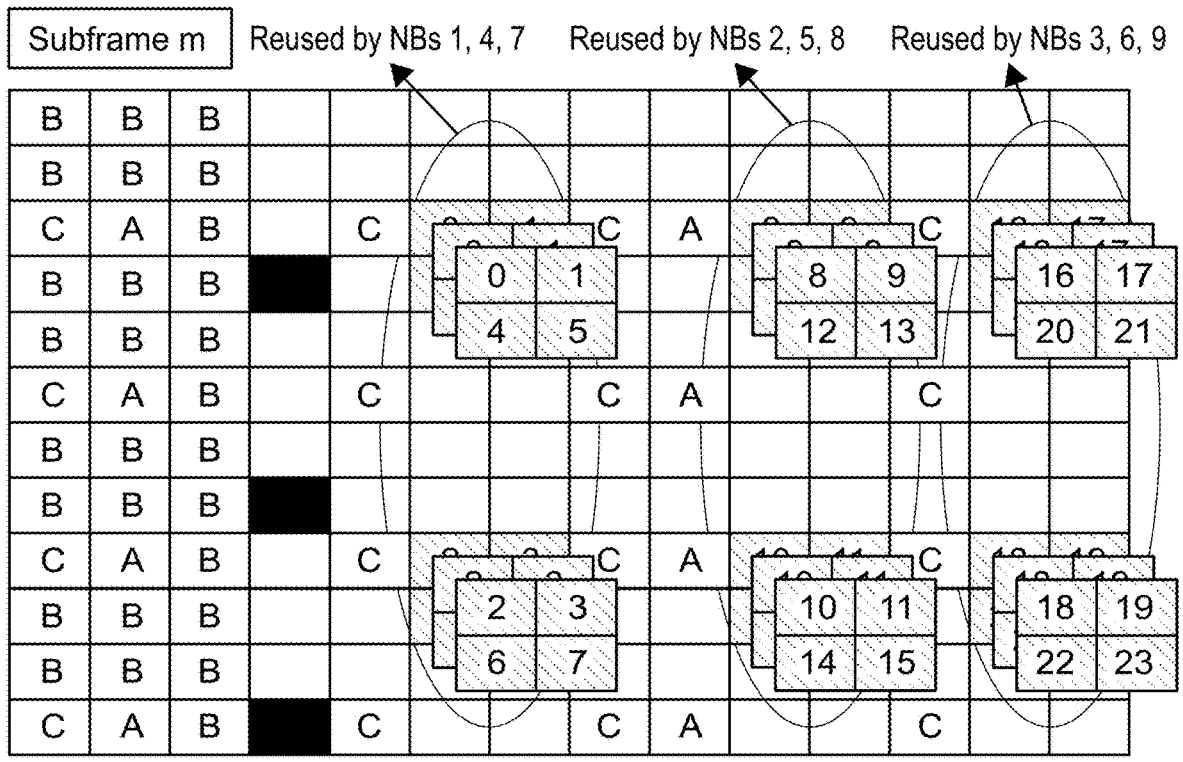
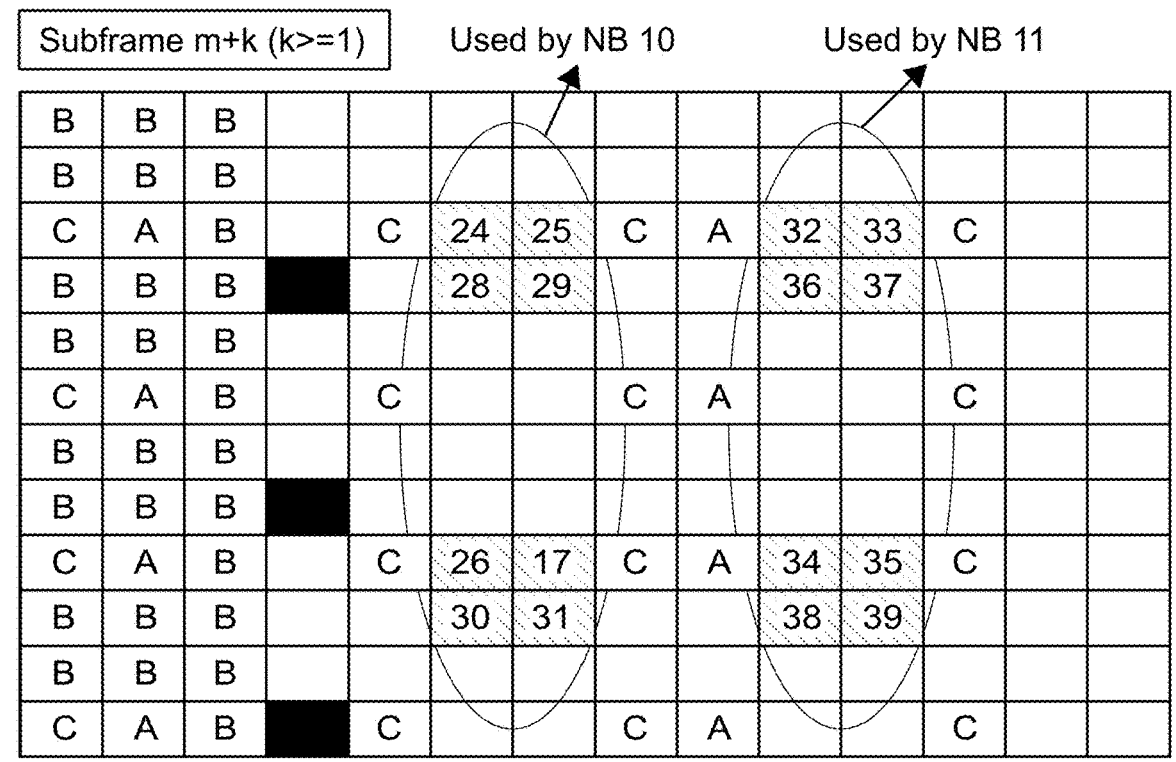
FIG. 35

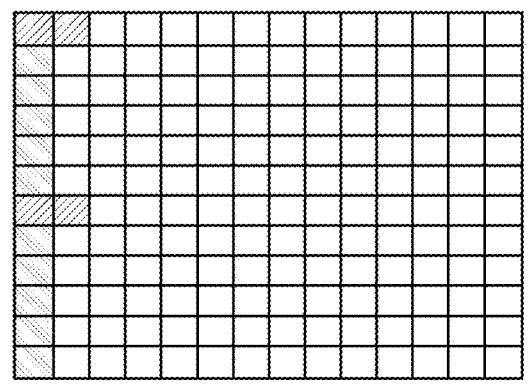
FIG. 50A
Shared Channel (Including data)
DM-RS
Control Information
Tracking RS
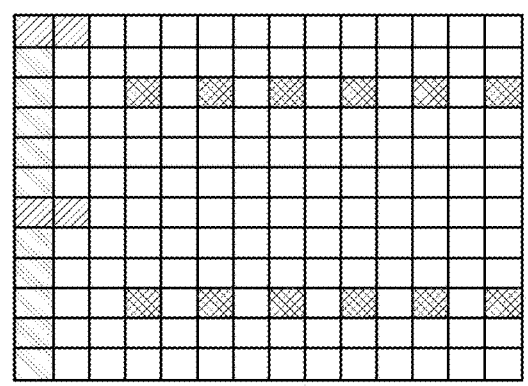
FIG. 50B
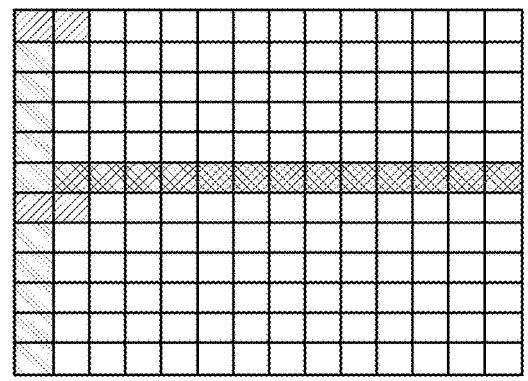
FIG. 50C

CONFIGURABLE REFERENCE SIGNALS

CROSS REFERENCE TO RELATED APPLICATIONS

This application is a continuation of U.S. patent application Ser. No. 16/093,287 filed Oct. 12, 2018 which is a National Stage Application filed under 35 U.S.C. § 371 of International Application No. PCT/US2017/028633 filed Apr. 20, 2017, which claims the benefit of priority to U.S. Provisional Patent Application No. 62/325,394, filed Apr. 20, 2016, U.S. Provisional Patent Application No. 62/338,350, filed May 18, 2016, U.S. Provisional Patent Application No. 62/373,176, filed Aug. 10, 2016 and U.S. Provisional Patent Application No. 62/416,902 filed Nov. 3, 2016 the disclosures of which are incorporated by reference in their entireties.

BACKGROUND

The $3^{rd}$ Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 Ghz, with cmWave and mmWave specific design optimizations.

In Long term Evolution (LTE), downlink (DL) reference signals (RSs) are predefined signals occupying specific resource elements (REs) within the downlink time-frequency RE grid. LTE defines several types of DL RSs that are transmitted in different ways for different purposes. For example, a cell-specific reference signal (CRS) can be transmitted in every DL subframe and in every Resource Block (RB) in the frequency domain (e.g., see FIG. 1). A CRS may be used: (1) by terminals for channel estimation for coherent demodulation of DL physical channels; (2) by terminals to acquire Channel State Information (CSI) configured in transmission modes 1 to 8 as shown Table 1 below (e.g., supporting up to 4 antenna ports); or (3) by terminals as the basis for cell-selection and handover decisions.

TABLE 1

Transmission Modes in LTE

| LTE Rel | Transmission Mode | Description |
| --- | --- | --- |
| 8 | 1 | Single-antenna transmission |
| 8 | 2 | Transmit diversity |
| 8 | 3 | Open-loop codebook-based precoding in the case of more than one layer, transmit diversity in the case of rank-one transmission |
| 8 | 4 | Closed-loop codebook-based precoding |
| 8 | 5 | Multi-user-MIMO version of transmission mode 4 |
| 8 | 6 | Special case of closed loop codebook-based precoding limited to single-layer transmission |
| 8 | 7 | Non-codebook-based precoding supporting single-layer PDSCH transmission |
| 9 | 8 | Non-codebook-based precoding supporting up to two layers |
| 10 | 9 | Non-codebook-based precoding supporting 8 layers |
| 11 | 10 | Extension of transmission mode 9 for enhanced support of different means of DL multi-point coordination and transmission, also referred to as CoMP |

Demodulation Reference Signals (DM-RSs) are another example of a DL RS. A DM-RS can be referred to as User Equipment (UE)-specific reference signals that are intended to be used by terminals for channel estimation for coherent demodulation of Physical Downlink Shared CHannel (PDSCH) in case of transmission modes 7 to 10 (as shown in Table 1) and Enhanced Physical Downlink Control CHannel (EPDCCH). DM-RSs may be used for channel estimation by a specific UE, and then transmitted within the RBs specifically assigned for PDSCH/EPDCCH transmission to that UE. DM-RSs are associated with data signals and precoded prior to the transmission with the same precoder as data. A DM-RS can support up to 8 layers. In addition, as shown in FIG. 2, interference between the reference signals may be avoided by applying mutually orthogonal patterns, referred to as Orthogonal Cover Codes (OCC), to pairs of consecutive reference symbols.

Channel State Information Reference Signals (CSI-RSs) are another example of a DL RS. CSI-RSs are intended to be used by UEs to acquire CSI configured in transmission modes 9 and 10 (as shown in Table 1) for channel-dependent scheduling, link adaptation, and multi-antenna transmissions. Compared to a CRS, a CSI-RS has a lower time/frequency density (e.g., transmitted every 5 ms to 80 ms), thereby implying less overhead and a higher degree of flexibility compared to the cell-specific reference signals. Moreover, the CSI-RS will support up to 8 antenna ports by LTE release 12 (shown in FIG. 3) and up to 16 antenna ports by release 13.

With respect to antenna ports, 3GPP TS 36.211, Evolved Universal Radio Access (E-UTRA), Physical channels and modulation (Release 13) (referred to hereinafter as "TS 36.211"), describes that:

An antenna port is defined such that the channel over which a symbol on the antenna port is conveyed can be inferred from the channel over which another symbol on the same antenna port is conveyed. There is one resource grid per antenna port.

In general, LTE symbols that are transmitted via identical antenna ports are subject to the same channel conditions. In order to determine the characteristic channel for an antenna port, separate reference signals may be defined for each antenna port.

With respect to CSI-RSs, TS 36.211, Evolved Universal Radio Access (E-UTRA), Physical channels and modulation (Release 13), V13.1.0, defines Table 2 below and describes that:

CSI reference signals are transmitted on one, two, four, eight, twelve, or sixteen antenna ports using p=15, p=15, 16, p=15, . . . , 18, p=15, . . . , 22, p=15, . . . , 26 and p=15, . . . , 30, respectively. For CSI reference signals using more than eight antenna ports, $N_{res}^{CSI}>1$ CSI-RS configurations in the same subframe, numbered from 0 to $N_{res}^{CSI}-1$, are aggregated to obtain $N_{res}^{CSI}N_{ports}^{CSI}$ antenna ports in total. Each CSI-RS configuration in such an aggregation corresponds to $N_{ports}^{CSI} \in \{4,8\}$.

TABLE 2

Aggregation of CSI-RS Configurations

| Total number of antenna ports $N_{res}^{CSI}N_{ports}^{CSI}$ | Number of antenna ports per CSI-RS configuration $N_{ports}^{CSI}$ | Number of CSI-RS configurations $N_{res}^{CSI}$ |
|---|---|---|
| 12 | 4 | 3 |
| 16 | 8 | 2 |

The reference-signal sequence $r_{l,n_s}(m)$ is defined by 3GPP TS 36.211:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, N_{RB}^{DL} - 1$$

where $n_s$ is the slot number within radio frame and l is the Orthogonal Frequency Division Multiplexing (OFDM) symbol number within the slot. The pseudo-random sequence c(n) is defined in section 7.2 of TS 36.211.

The pseudo-random sequence generator shall be initialized with $$c_{init} = 2^{10} \cdot (7 \cdot (n_s'+1)+l+1) \cdot (2 \cdot N_{ID}^{CSI}+1)+2 \cdot N_{ID}^{CSI}+N_{CP} \quad (2)$$

at the start of each OFDM symbol where $$n_s' = \begin{cases} 10\lfloor n_s/10 \rfloor + n_s \bmod 2 & \text{for frame structure } type3 \\ n_s & \text{otherwise} \end{cases} \quad (3)$$

$$N_{CP} = \begin{cases} 1 & \text{for normal } CP \\ 0 & \text{for extended } CP \end{cases} \quad (4)$$

Continuing with example DL reference signals, Positioning Reference Signals (PRSs) were introduced in LTE release 9 to enhance LTE positioning functionality. In particular, PRSs support the use of UE measurements on multiple LTE cells to estimate the geographical position of a given UE.

Turning now to uplink reference signals, similar to LTE DL, reference signals are also used in LTE UpLink (UL). LTE defines UL Demodulation Reference Signals (DM-RSs) and UL Sounding Reference Signals (SRSs). UL Demodulation Reference Signals (DM-RSs) are used by the base station for channel estimation for coherent demodulation of the Physical Uplink Shared CHannel (PUSCH) and the Physical Uplink Control CHannel (PUCCH). In LTE, DM-RS are only transmitted within the RBs specifically assigned for PUSCH/PUCCH transmission and span the same frequency range as the corresponding physical channel. UL Sounding Reference Signals (SRS) are used by the base station for CSI estimation for supporting uplink channel-dependent scheduling and link adaptation. An SRS may also be used for the base station to obtain CSI estimation for DL under the case of channel reciprocity.

With respect to CSI feedback in LTE, DL channel-dependent scheduling is a key feature of LTE, which selects the DL transmission configuration and related parameters depending on the instantaneous DL channel condition, including the interference situation for example. To support the DL channel-dependent scheduling, a given UE provides the CSI to the evolved Node B (eNB). The eNB uses the information for its scheduling decisions. The CSI may consist of one or more pieces of information, such as, a rank indication (RI), a precoder matrix indication (PMI), or a channel-quality indication (CQI). The RI may provide a recommendation on the transmission rank to use, or may provide a number of preferred layers that should be used for PDSCH transmission to the UE. The PMI may indicate a preferred precoder to use for PDSCH transmission. The CQI may represent the highest modulation-and-coding scheme to achieve a block-error probability of 10%, for example at most. Together, a combination of the RI, PMI, and CQI forms a CSI feedback report to the eNB. The information included in the CSI report may depend on the UE's configured reporting mode. For example, in some cases, RI and PMI do not need to be reported unless the UE is in a spatial multiplexing multi-antenna transmission mode.

In Long term Evolution (LTE), multi-antenna techniques are used to achieve improved system performance, including improved system capacity (more users per cell), improved coverage (possibility for larger cells), and improved service provisioning (e.g., higher per-user data rates). The availability of multiple antennas at the transmitter and/or the receiver can be utilized in different ways to achieve different objectives. For example, multiple antennas at the transmitter and/or the receiver can be used to provide antenna diversity against fading on the radio channel. Multiple antennas at the transmitter and/or the receiver can be used to "shape" the overall antenna beam in a certain way, which can be referred to as antenna beamforming. For example, antenna beamforming can be used to maximize the overall antenna gain in the direction of the target receiver or to suppress specific dominant interfering signals. Multiple antennas can be used for antenna spatial multiplexing, which refers to the simultaneous availability of multiple antennas at the transmitter and receiver to be used to create multiple parallel communication "channels" over the radio interface. Antenna spatial multiplexing can provide high data rates within a limited bandwidth, which is referred to as Multiple-Input and Multiple-Output (MIMO) antenna processing.

Turning now to downlink control information (DCI), DCI refers to a predefined format in which the DCI is formed and transmitted in a Physical Downlink Control Channel (PDCCH). The DCI format informs the UE how to get its data that is transmitted on a Physical Downlink Shared Channel (PDSCH) in the same subframe. It carries the details for the UE such as, for example, number of resource blocks, a resource allocation type, a modulation scheme, a redundancy version, a coding rate, etc., which help the UE find and decode the PDSCH from the resource grid. There are various DCI formats used in LTE in PDCCH, and example different DCI formats are included in Table 3 below

TABLE 3

Example DCI Formats

| DCI Format | Usage | Major Contents |
|---|---|---|
| Format 0 | UL Grant. Resource Allocation for UL Data | RB Assignment, Transmit Power Control (TPC), PUSCH Hopping Flag |
| Format 1 | DL Assignment for Single-Input and Single-Output (SISO) | RB Assignment, TPC, Hybrid Automatic Repeat Request (HARQ) |
| Format 1A | DL Assignment for SISO (compact) | RB Assignment, TPC, HARQ |
| Format 1B | DL Assignment for MIMO with Rank 1 | RB Assignment, TPC, HARQ, PMI |
| Format 1C | DL Assignment for SISO (minimum size) | RB Assignment |
| Format 1D | DL Assignment for Multi User MIMO | RB Assignment, TPC, HARQ, DL Power Offset |
| Format 2 | DL Assignment for Closed Loop MIMO | RB Assignment, TPC, HARQ, Precoding Information |
| Format 2A | DL Assignment for Open Loop MIMO | RB Assignment, TPC, HARQ, Precoding Information |
| Format 2B | DL Assignment for Transmission Mode 8 (Dual layer beamforming) | RB Assignment, TPC, HARQ, Precoding Information |
| Format 2C | DL Assignment for Transmission Mode 9 | RB Assignment, TPC, HARQ, Precoding Information |
| Format 3 | TPC Commands for PUCCH and PUSCH with 2 bit power adjustment | Power Control Only |
| Format 3A | TPC Commands for PUCCH and PUSCH with 1 bit power adjustment | Power Control Only |
| Format 4 | UL Assignment for UL MIMO (up to 4 layers) | RB Assignment, TPC, HARQ, Precoding Information |

An example DCI format is illustrated in Table 4, which contains fields for DCI format 2.

TABLE 4

DCI Format 2

| Field Name | Length (Bits) |
|---|---|
| Resource allocation header | 1 |
| Resource block assignment for resource allocation Type 0 | 6 (1.4 MHz) |
| | 8 (3 MHz) |
| | 13 (5 MHz) |
| | 17 (10 MHz) |
| | 19 (15 MHz) |
| | 25 (20 MHz) |
| Subset | N/A (1.4 MHz) |
| | 1 (3 MHz) |
| | 1 (5 MHz) |
| | 2 (10 MHz) |
| | 2 (15 MHz) |
| | 2 (20 MHz) |
| Shift | N/A (1.4 MHz) |
| | 1 (3 MHz) |
| | 1 (5 MHz) |
| | 1 (10 MHz) |
| | 1 (15 MHz) |
| | 1 (20 MHz) |
| Resource block assignment for resource allocation Type 1 | N/A (1.4 MHz) |
| | 6 (3 MHz) |
| | 13 (5 MHz) |
| | 14 (10 MHz) |
| | 16 (15 MHz) |
| | 22 (20 MHz) |
| TPC for PUCCH | 2 |
| Downlink Assignment Index | 2 |
| HARQ Process | 3 (FDD) |
| | 4 (TDD) |
| Transport block to codeword swap flag | 1 |
| Modulation and Coding Scheme (MCS) for Transport Block 1 | 5 |
| New Data Indicator (NDI) for Transport Block 1 | 1 |
| Redundancy Version (RV) for Transport Block 1 | 2 |
| MCS for Transport Block 1 | 5 |

Referring generally to FIG. 4, with respect to three-dimensional (3D) beam systems (which can also be referred to as beamforming systems), a 3D beam system (e.g., 3D beam system 400) can explore both horizontal and elevation (vertical) angles. In addition, 3D beamforming can achieve a better degree of freedom as compared to traditional 2D beamforming systems that only consider horizontal angles. The 3D beamforming system uses Active Antenna System (AAS) technology to adjust antenna weights of horizontal antenna ports and also the antenna elements in the vertical direction. Referring in particular to FIG. 4, an example 3D beam 402 can be characterized by a beam emission direction 404 and a beamwidth ΔB. The beam emission direction 404 can be described by a horizontal angle 406 and an elevation angle 408, where ψ represents the horizontal angle and θ represents the elevation angle of the beam 402. The beamwidth ΔB indicates how wide the 3D beam 402 can span. In practice, a 3D beam is distinguished by its 3 dB beamwidth. Thus, to summarize, a 3D beam can be characterized by the parameters of horizontal angle, elevation angle, and beamwidth (ψ, θ, ΔB). As shown, the emission direction 404 can be distinguished by the horizontal angle 406 (in the x and y plane) and the elevation angle (in the x and z plane).

Turning now to Full-Dimension (FD) Multiple-Input and Multiple-Output (MIMO), FD-MIMO typically includes a base station with a two-dimensional antenna array that supports multi-user joint elevation and azimuth beamforming. This will result in higher cell capacity compared to conventional systems in release 12. Recent study has shown that with FD-MIMO techniques, LTE systems can achieve 3-5× performance gain cell capacity and cell edge throughput.

As stated above, LTE has introduced CSI-RS, which can be used for DL channel CSI estimation for all the UEs. There are up to 8 antenna ports specified in release 10 and up to 16 antenna ports specified in release 13. The CSI-RS design principal is one of the bases for 3D MIMO systems.

It is recognized herein that current LTE reference signals may be inadequate for future cellular (e.g., New Radio) systems.

SUMMARY

Configurable reference signals are described herein. In an example embodiment, an apparatus can obtain a reference signal configuration, wherein the reference signal configuration comprises time and/or frequency resources allocated for a reference signal. The reference signal configuration may further comprise spatial resources allocated for the reference signal. Further, the apparatus can transmit the reference signal in accordance with the reference signal configuration, such that at least one device obtains information from the reference signal. The time resources associated with the reference signal may include at least one of a start time at which the reference signal is allocated, a number of time intervals during which the reference signal is allocated, a time pattern at which the reference signal is allocated, or an indication of whether the reference signal is periodic. In an example, the reference signal configuration is a function of one or more characteristics associated with the time intervals. The frequency resources associated with the reference signal may include at least one of a start frequency at which the reference signal is allocated, a number of subcarriers in which the reference signal is allocated, a frequency pattern at which the reference signal is allocated, and/or with an indication of a frequency hopping pattern. The reference signal configuration may include one or more functions performed by the reference signal, and the one or more functions may include control channel demodulation, data channel demodulation, interference measurement, channel state information measurement, radio resource management measurement, beam sweeping, beamform training, time and frequency offset tracking, or synchronization.

It is also recognized herein that as the number of transmit antennas in systems (e.g., NR systems) increases, the reference signal (RS) overhead may increase to unacceptable levels. Embodiments described herein provide an enhanced and more efficient design for Channel State Information Reference Signals (CSI-RS) as compared to current approaches.

In one embodiment, an apparatus comprises a processor, a memory, and communication circuitry. The apparatus is connected to a network, for instance a new radio (NR) network, via its communication circuitry. The apparatus further comprises computer-executable instructions stored in the memory of the apparatus which, when executed by the processor of the apparatus, cause the apparatus to perform operations. For example, the apparatus can obtain context information corresponding to one or more terminals. Based on the context information, the apparatus can define spot areas for covering by one or more 3D beams. The apparatus can assign one or more 3D beams to respective spot areas. Based on the assignment, the apparatus can identify 3D beams that are non-adjacent with respect to one other, and the apparatus can send the 3D beams that are identified as non-adjacent with respect to one another to the respective spot areas using the same antenna port. Further, based on the context information, the apparatus can define at least one null spot area within which no terminal is present, and the apparatus can assign no beam to the null spot area. In one example, based on the assignment, the apparatus identifies 3D beams that are adjacent to one another, and sends the 3D beams that are identified as adjacent to each other via different antenna ports. The apparatus may obtain context information corresponding to one or more terminals by periodically receiving geographic data from the one or more terminals. The geographic data may be indicative of a physical location of the respective terminal. The 3D beams may comprise Channel State Information Reference Signals (CSI-RS), and the antenna ports may comprise CSI-RS ports. Further, the apparatus described above may be part of a radio access network. For example, the apparatus may be part of an eNodeB or an eNodeB like entity.

In another example embodiment, an apparatus can, based on location information associated with each of a plurality of mobile devices, form a first wide beam that is sent to an area within a cell. The apparatus can receive a report from each of one or more mobile devices within the area, each report indicating an optimal wide beam associated with the respective mobile device. Based on the received reports, the apparatus can group select mobile devices of the one or more mobile devices into a first cluster, and send the first wide beam to the first cluster, wherein the optimal wide beam associated with the select mobile devices may be the first wide beam. Further, the apparatus can receive an indication, from one or more of the select mobile devices in the first cluster, of a second wide beam that is associated with a second cluster of mobile devices. The indication can identify the second wide beam as an interference beam, and there may be more than one interference beam. Thus, the apparatus can send the first wide beam and the second wide beam to the first and second clusters, respectively, using different antenna ports. Further still, when no indication that identifies a third wide beam as an interference beam is received from any of the mobile devices in the first cluster, the apparatus can send the first and third wide beams to first and third clusters, respectively, using the same antenna port.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 1 depicts an example Cell-Specific Reference Signal (CRS) allocation per resource block.

FIGS. 16A and 16B illustrate an example beamforming reference signal (BF-RS) for Initial Access.

FIG. 35 is a 2D grid table that shows an example of Tier 2 Beam CSI-RS resource allocation with inter-cluster CSI-RS reuse.

FIG. 50A depicts an example in which no TRS is allocated.

FIG. 50B depicts an example in which multiple resources are allocated for a TRS in frequency.

FIG. 50C depicts an example in which a higher density of a TRS is assigned in time.

DETAILED DESCRIPTION OF ILLUSTRATIVE EMBODIMENTS

Figure 2:
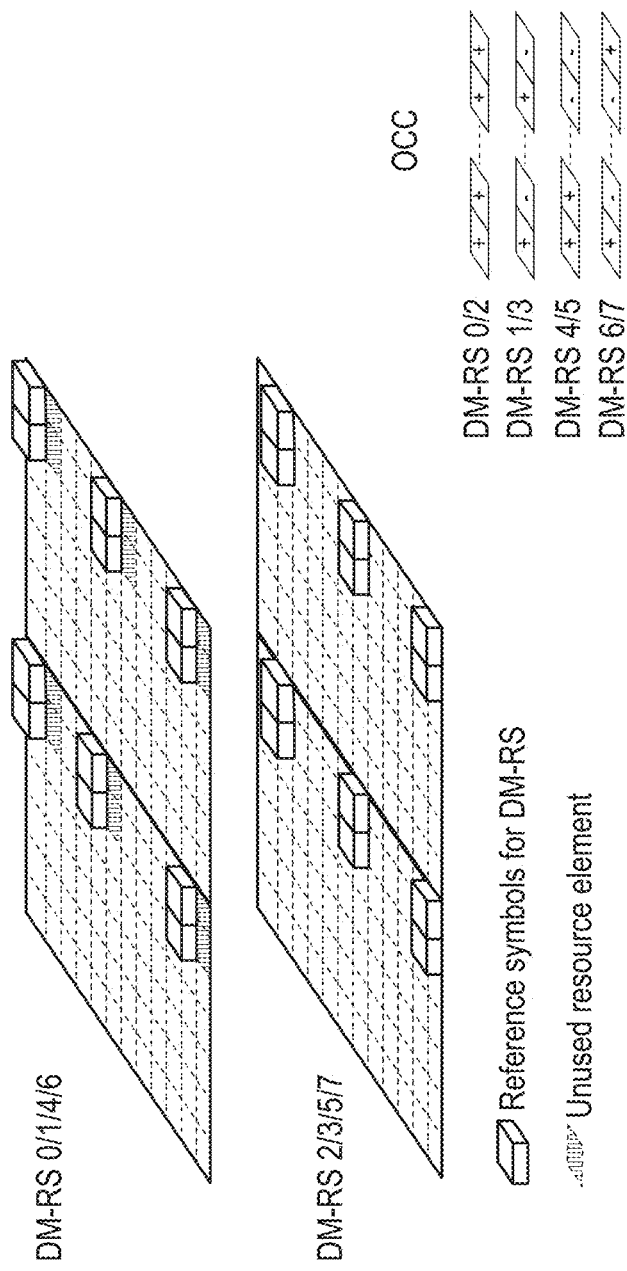
FIG. 2 depicts an example Demodulation Reference Signals (DM-RS) allocation per resource block.
Figure 3:
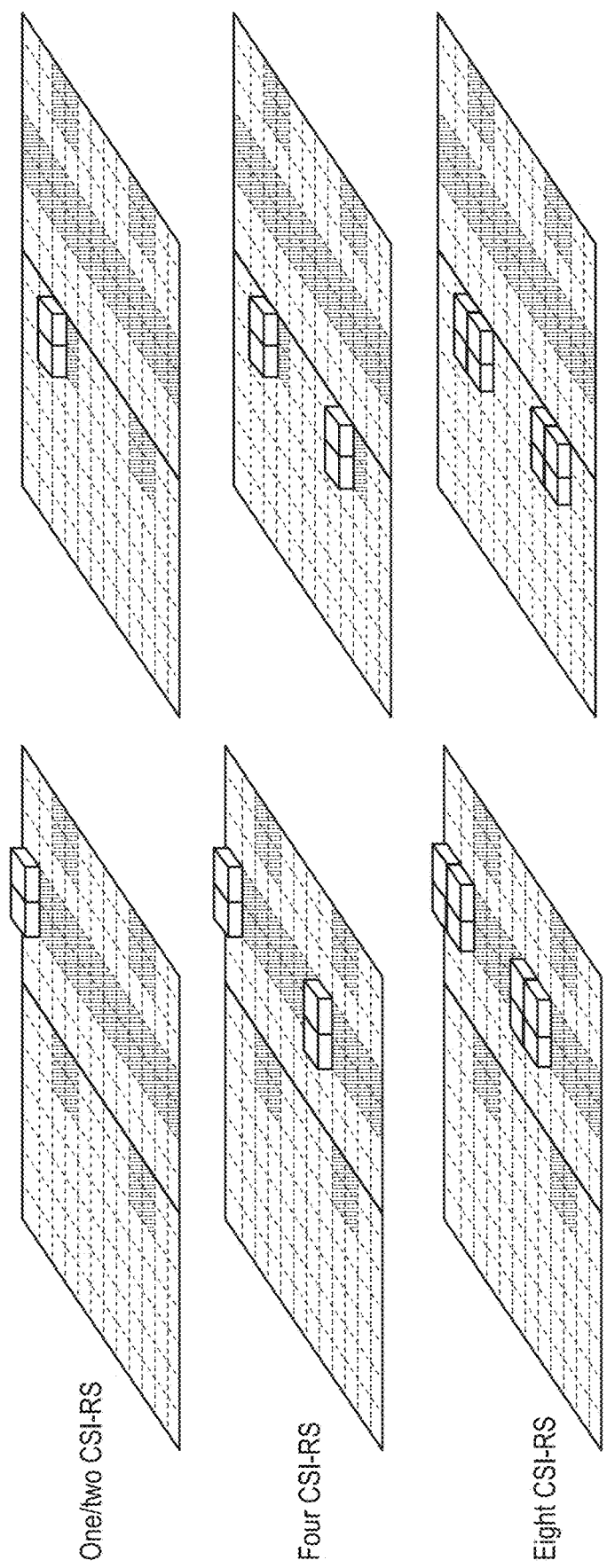
FIG. 3 depicts an example Channel State Information Reference Signal (CSI-RS) allocation per resource block.
Figure 4:
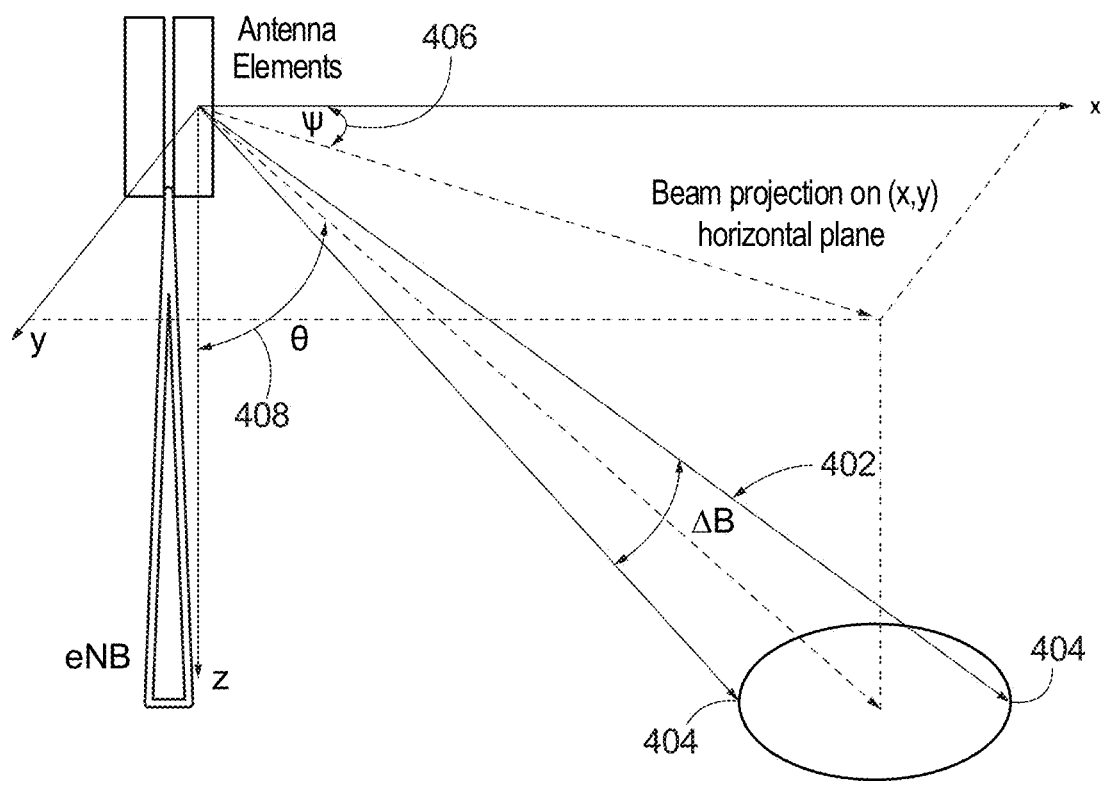
FIG. 4 depicts an example 3D beam.

As an initial matter, 3D Multiple-Input and Multiple-Output (MIMO) can be referred to as 5G MIMO or new radio (NR) MIMO herein, without limitation.

It is recognized herein that a straightforward approach for implementing 3D MIMO would be to assign one Channel State Information (CSI) Reference Signal (RS) (CSI-RS) port per each transmit antenna element. It is further recognized herein that in this approach, however, the number of transmit antennas at a base station will be limited by the available number of CSI-RS ports and by the available resource elements in the time-frequency resource block, which might not be possible from the practical system design and standardization points of view with larger number of antennas at the base station. Currently, there are two approaches for a CSI-RS design for Full Dimension (FD) MIMO (FD-MIMO) to support up to 16 antenna ports: beamformed CSI-RS and non-precoded CSI-RS schemes, which are now described by way of background.

With respect to current approaches to beamformed CSI-RS, in order to acquire relatively accurate 3D MIMO channel estimation and CSI, CSI-RS symbols transmitted on the transmit antenna elements in every column are precoded with the elevation beam weighting vector. Hence, for each elevation beam, only one CSI-RS port is assigned to the transmit antenna elements in one column. All the horizontal ports are used and different CSI-RS ports are used by different columns. Each column is precoded with a weighting vector to form the desired elevation beam.

For example, with respect to elevation beam 1, the CSI-RS symbols transmitted on transmit elements in the first column are precoded with weighting vector $W_{(1)}^v$ and the same procedure with the same weighting vector is applied to the second column of transmit antenna elements. Thus, if there are $N_h$ horizontal ports, the procedure will be repeated until the last column. Then for elevation beam 2, the CSI-RS will be precoded with a different weighting vector $W_{(2)}^v$. The same procedure will be repeated for elevation beam 2 and for the remaining elevation beams. Thus, each elevation beam will have a different CSI-RS configuration that uses different CSI-RS ports/REs per the RB transmitting CSI-RS. Assuming there are Q elevation beams, then $Q \times N_h$ number of CSI-RS ports/REs are required to transmit the CSI-RS for the FD-MIMO systems described above.

Thus, in some FD-MIMO systems, for each elevation beam, one CSI-RS port is assigned to the transmit antenna elements in one column. The CSI-RS symbols transmitted on the transmit antenna elements in one column are precoded with a weighting vector forming the desired elevation beam. For the elevation beam $W_{(1)}^v$, a UE will search for its horizontal precoding matrix $W_{(2)}^v$ and calculate the Channel Quality Indication (CQI). Procedures are repeated for each elevation beam. A UE will measure one or more beamformed CSI-RS resources. In some cases, the optimal elevation beam can be selected as the one with the maximum CQI. The UE can report the beams' channel information to the eNB or select the optimal beam and report the beam index and corresponding CSI to the eNB using CSI reporting mechanisms. CSI reporting, such as CQI and/or PMI and RI, is associated with the selected beam(s).

With respect to current approaches to non-precoded CSI-RS, which can also be referred to as Kronecker-Product (KP) based CSI framework, KP-based CSI-RS is based on the assumption that the 3D channel $H_{3D}$ between an eNB and a UE can be approximated by the KP between the azimuth and elevation domain channels $H_h$ and $H_v$, respectively, $$H_{3D} \approx H_h \otimes H_v \quad (5)$$

where $w_h$ and $w_v$ are the precoding vectors for the azimuth and elevation domains respectively, and $w_{3D} \approx w_h \otimes w_v$ is a KP-based precoder. Thus, the effective channel will be:

$$H_{3D} W_{3D} \approx (H_h \otimes H_v)(w_h \otimes w_v) = (H_h w_h) \otimes (H_v w_v) \quad (6)$$

The CSI-RS ports are transmitted on elements in the vertical and horizontal axes of the array. A UE can be configured with multiple CSI processes—one associated with the azimuth CSI-RS resource and another associated with the elevation CSI-RS resource. These CSI processes are used for obtaining precoder information for the azimuth and the elevation dimensions separately from the UE. At the eNB, the azimuth and the elevation precoder information is used to form a 2D precoder with a Kronecker structure. As an example, a 64-port precoder can be formed at the eNB from CSI feedback comprising of an 8-port precoding feedback in azimuth and 8-port precoding feedback in elevation. Thus, with respect to the KP-based CSI-RS scheme, the total number of CSI-RS ports required is equal to $N_h + N_v - 1$, as compared to $N_h N_v$ when using the straightforward approach.

It is recognized herein that the number of transmit antennas at the base station may be increased, for example, to 32 antenna ports or greater. Further, beamformed CSI-RS and non-precoded CSI-RS may improve the above-summarized schemes to support more antenna ports. Further, with respect to 5G systems, it is possible that a significantly increased number of antennas may be implemented at the base station to further increase cell capacity, for example, by 10× performance gain. For example, an eNB may use antenna arrays with a few hundred antennas simultaneously serving many UEs in the same time-frequency resource. Without being bound by theory, in an example massive MIMO system, as the number of the transmit antennas increases to infinity (very large), cross-correlation of two random channel realizations decreases to zero, and there will be no multi-user interference resulting from co-scheduling and multiple access. This may greatly improve the system throughput, and it may be energy-efficient, secure, robust, and efficient (e.g., use spectrum efficiently), which makes massive 3D MIMO a potentially key enabler for 5G cellular systems.

Turning now to NR frame structure, subframes may be self-contained, such that a subframe may contain control information for a grant, data, and an A/N acknowledgement. Further, a self-contained subframe may have configurable UL/DL/side link allocations and reference signals within its resources. In some cases, a time interval X (e.g., Interval-X) may contain one or more of the following, presented by way of example and without limitation, a DL transmission part, a guard, and an UL transmission part. The DL transmission part of the time interval X may contain downlink control information, downlink data transmissions, and/or reference signals. The UL transmission part of time the interval X to may contain uplink control information, uplink data transmissions, and/or reference signals.

With respect to NR beamformed access, it is recognized herein that characteristics of the wireless channel at higher frequencies may be significantly different from the sub-6 GHz channel on which the LTE network is currently deployed. It is further recognized herein that it may be a challenge to design the new Radio Access Technology (RAT) for higher frequencies while overcoming this larger path-loss. In addition to this larger path-loss, the higher frequencies are subject to unfavorable scattering environment due to blockage caused by poor diffraction. Therefore, it is recognized herein that MIMO/beamforming may be critical to guaranteeing sufficient signal level at the receiver end.

In some cases, relying solely on digital precoding to compensate for the additional path-loss in higher frequencies might not be enough to provide similar coverage as below 6 GHz. Thus, the use of analog beamforming for achieving additional gain can be an alternative in conjunction with digital precoding. The sufficiently narrow beam may be formed with many antenna elements, which is likely to be quite different from the one assumed for the LTE evaluations. For large beamforming gain, the beam-width correspondingly tends to get reduced, and hence the coverage beam with the large directional antenna gain might cover the entire horizontal sector area, specifically in 3-sector configuration for example.

Thus, in some cases, multiple transmissions in the time domain with narrow coverage beams steered to cover different serving areas might be necessary. The analog beam of a subarray can be steered toward a single direction on each OFDM symbol, and thus the number of subarrays may determine the number of beam directions, and the corresponding coverage on each OFDM symbol. The provision of multiple narrow coverage beams for this purpose can be referred to as "beam sweeping." For analog and hybrid beamforming, the beam sweeping may be critical to provide the basic coverage in NR. In some cases, for analog and hybrid beamforming with massive MIMO for example, multiple transmissions in the time domain with narrow coverage beams steered to cover different serving areas may be critical to cover the entire coverage areas within a serving cell in NR.

3GPP TR 38.913 defines scenarios and requirements for New Radio (NR) technologies. Example Key Performance Indicators (KPIs) that impose requirements, which may be relevant to embodiments described herein, for eMBB, URLLC and mMTC devices are summarized in Table 5 below.

TABLE 5

Example KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
|  | Mobility interruption time | Mobility interruption time means the shortest time duration supported by the system during which a user terminal cannot exchange user plane packets with any base station during transitions. | 0 ms for intra-system mobility |
|  | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
|  | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
|  | Reliability | Reliability can be evaluated by the success probability of transmitting X bytes [1] within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge). NOTE1: Specific value for X is FFS. | $1-10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
|  | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |

TABLE 5-continued

Example KPIs for eMBB, URLLC and mMTC Devices

| Device | KPI | Description | Requirement |
|---|---|---|---|
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

As described further below, embodiments described herein may help enable enhanced mobile broadband (eMBB). Example deployment scenarios for eMBB include, indoor hotspots, dense urban areas, rural areas, urban macro areas, and high speed areas. An indoor hotspot generally refers to a small coverage area per site/TRP (Transmission and Reception Point) and high user throughput or user density in buildings. Key characteristics of this deployment scenario include high capacity, high user density, and consistent user experience.

A dense urban microcellular deployment scenario generally focuses on macro TRPs with or without micro TRPs. A dense urban area generally refers to an area with high user densities and traffic loads, such as in city centers and other dense urban areas. Key characteristics of this deployment scenario include high traffic loads, outdoor coverage, and outdoor-to-indoor coverage. A rural deployment scenario generally focuses on larger and continuous coverage. Key characteristics of this scenario include continuous wide area coverage and supporting high speed vehicles. An urban macro deployment scenario generally focuses on large cells and continuous coverage. Key characteristics of this scenario include continuous and ubiquitous coverage in urban areas. With respect to high speed areas, it is recognized herein that there will be a growing demand for mobile services in vehicles, trains, and aircrafts. While some services are the natural evolution of the existing ones (e.g., navigation, entertainment, etc.), some others represent completely new scenarios, such as broadband communication services on commercial aircrafts (e.g., by a hub on board). The degree of mobility required will depend upon the specific use case. In one example use case, speeds may be greater than 500 km/h.

Another example deployment scenario is urban coverage for massive connection. The urban coverage for massive connection scenario generally focuses on large cells and continuous coverage for massive machine type communications (mMTC). Key characteristics of this scenario include continuous and ubiquitous coverage in urban areas, with very high connection density of mMTC devices. This deployment scenario may apply to the evaluation of the Key Performance Indicator (KPI) of connection density. As yet another example, a highway deployment scenario focuses on scenarios in which vehicles are traveling on roadways at high speeds. Key performance indicators (KPIs) evaluated under this scenario include reliability/availability at high speeds/mobility (and thus frequent handover operations). Yet another example deployment scenario is urban grid for connected car, which focuses on highly densely deployed vehicles placed in urban areas. For example, this scenario may include freeways that lead through an urban grid. An example KPI evaluated under this scenario is reliability/availability/latency in high network load and high UE density situations.

Figure 5:
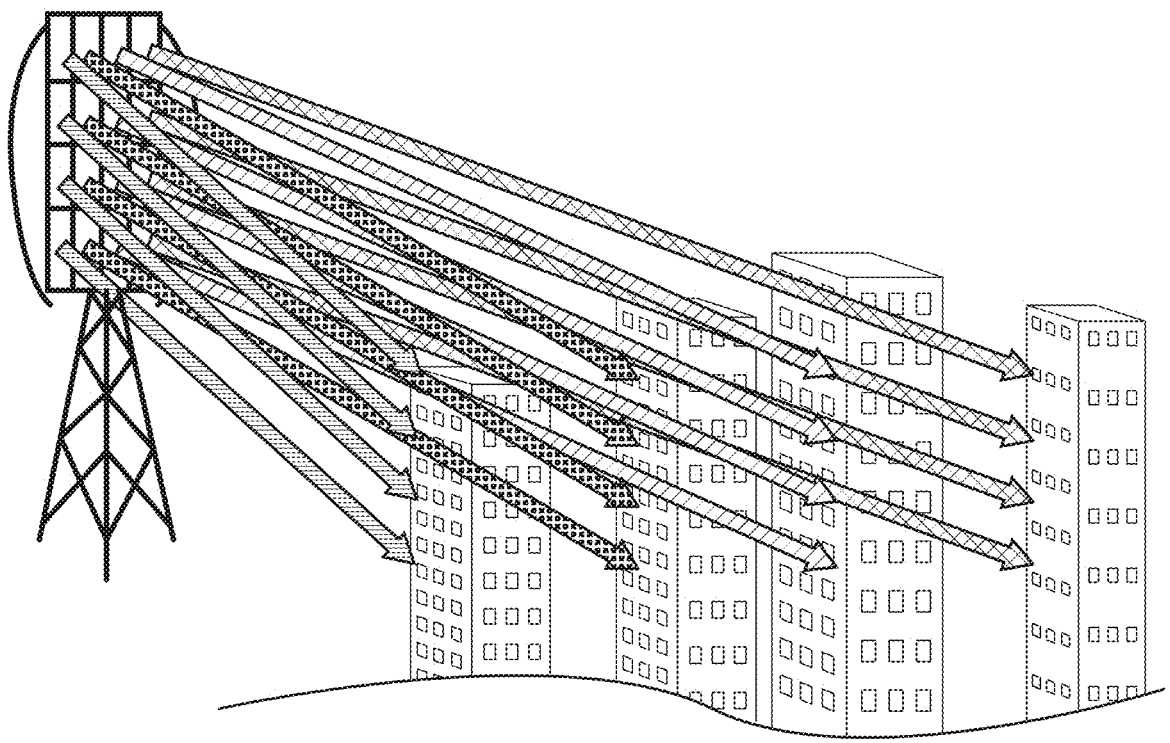
FIG. 5 depicts an example high data rate (indoor) use case in which one or more embodiments can be implemented.

Referring now to FIG. 5, an example use case is depicted for an eMMB indoor scenario (e.g., office or residence) that focuses on small coverage area per beam or Transmission and Reception Point (TRP), and high number of 3D MIMO beams for user throughput or user density in buildings. Key characteristics of this deployment scenario may include high capacity, high user density, and consistent user experience indoors with stational or nomadic mobility. Therefore, the 3D MIMO beams may be static or slow changing as shown in FIG. 5.

Figure 6:
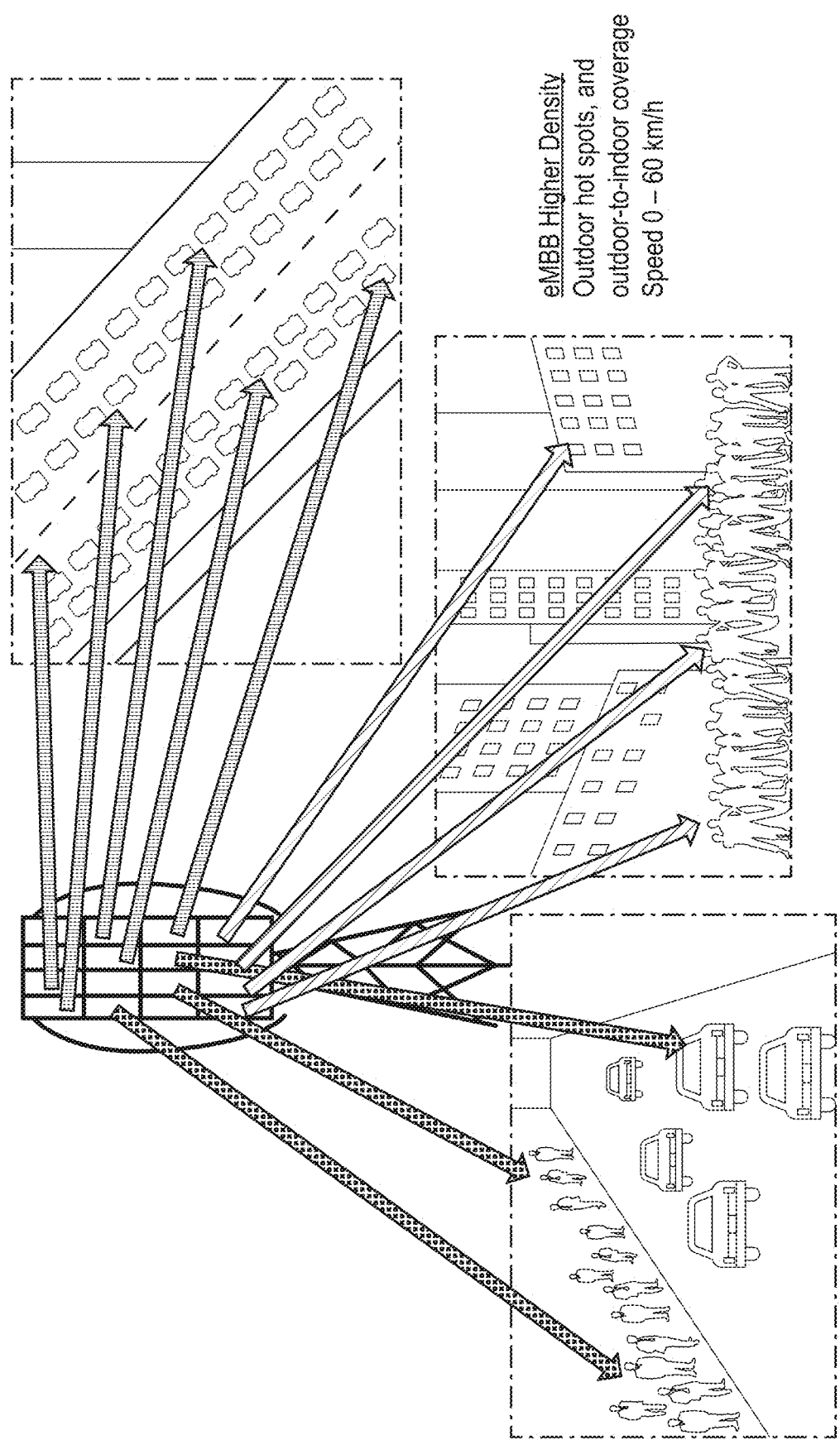
FIG. 6 depicts an example high density use case in which one or more embodiments can be implemented.

Referring also to FIG. 6, an example use case is depicted for an eMMB outdoor or outdoor-to-indoor scenario that focuses on the transport of a high volume of data traffic per area (traffic density) or on the transport of data for a high number of connections (connection density), which may require a high number of 3D MIMO beams in the deployment. Key characteristics of this deployment scenario may include high volume and high capacity upload and download data, and high user density, for example, which may depend on time (e.g., morning, evening, weekday, weekend etc.) and location (e.g., pedestrians in shopping mall, downtown street, stadium; users in buses in dense city center, etc.). This use case may include stationary objects or nomadic indoor mobility or very slow (e.g., pedestrians) mobility or outdoor mobility (e.g., of cars). Therefore, the 3D MIMO beams may be more dynamically distributed (as compared to FIG. 5) as shown in FIG. 6.

In the current 3GPP LTE system, it is recognized herein that current reference signal design creates problems for an NR system. Some of these issues are now summarized below at a high level for purposes of example. In some cases, reference signals introduced undesirable time and frequency resource overhead. Current reference signals might not support NR function requirements, such as beam sweeping and beamforming training for example. Further, it is recognized herein that existing approaches to reference signals do not support different numerologies mixed within a flexible frame structure.

With respect to time and resource overhead, current LTE has fixed periodic reference signals, such as CRS and CSI-RS for example, and no matter whether the system needs the reference signals or not, the reference signals are always ON. Further, current LTE has dedicated reference signals for a specific function such as, for example, demodulation reference signals (DM-RS) for data channel demodulation, CSI-RS for CSI measurement, etc. In some cases, current LTE has reference signals that occupy the entire frequency bandwidth, such as CRS and CSI-RS for example. Further, in some cases, the reference signals are redundant. It is also recognized herein that the above-described overhead issues may be amplified in an NR system because the NR system may support more antennas as compared to an LTE system.

Figure 7:
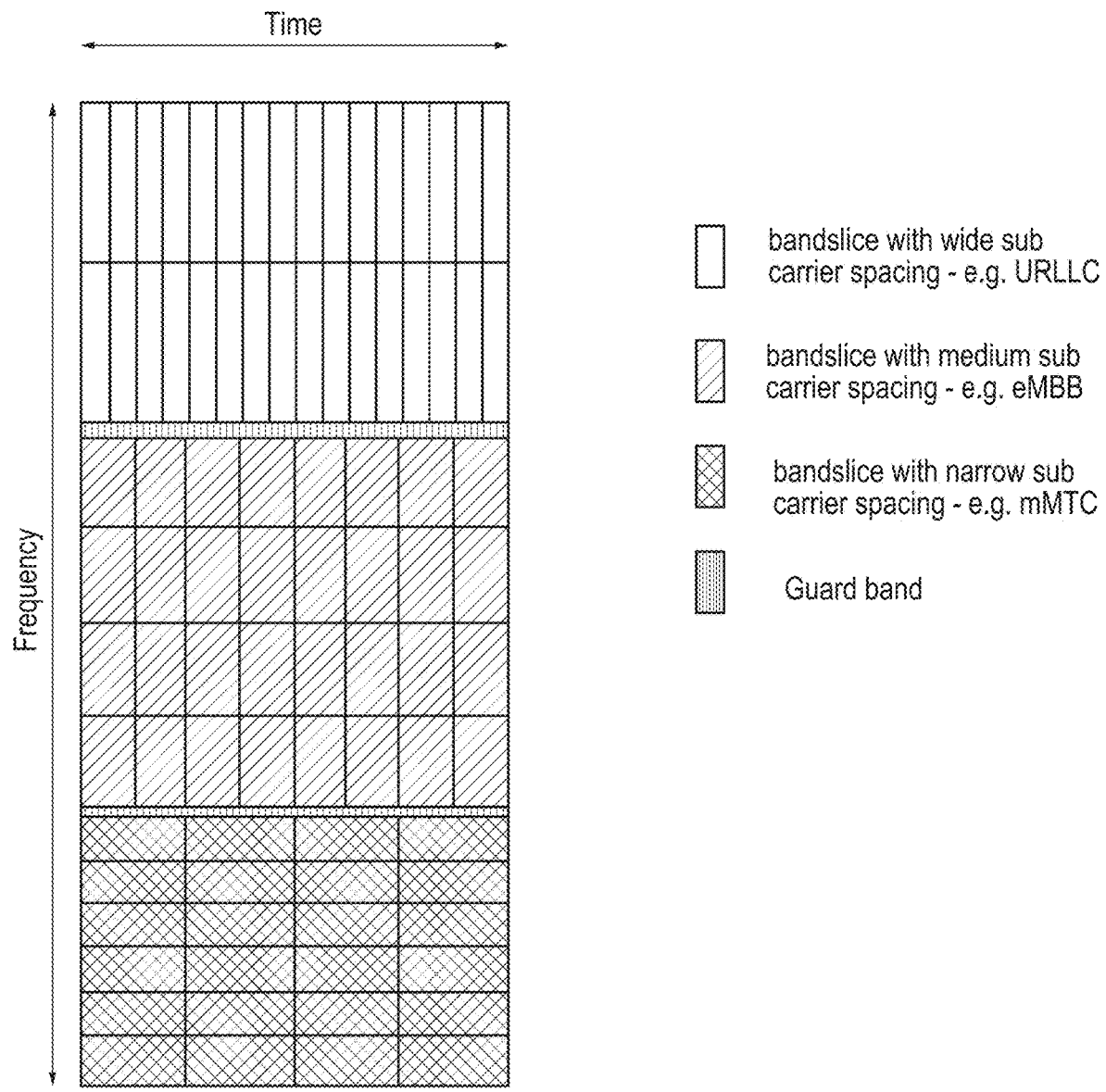
FIG. 7 illustrates different numerologies mixed with different bandslices, in accordance with an example.
Figure 8:
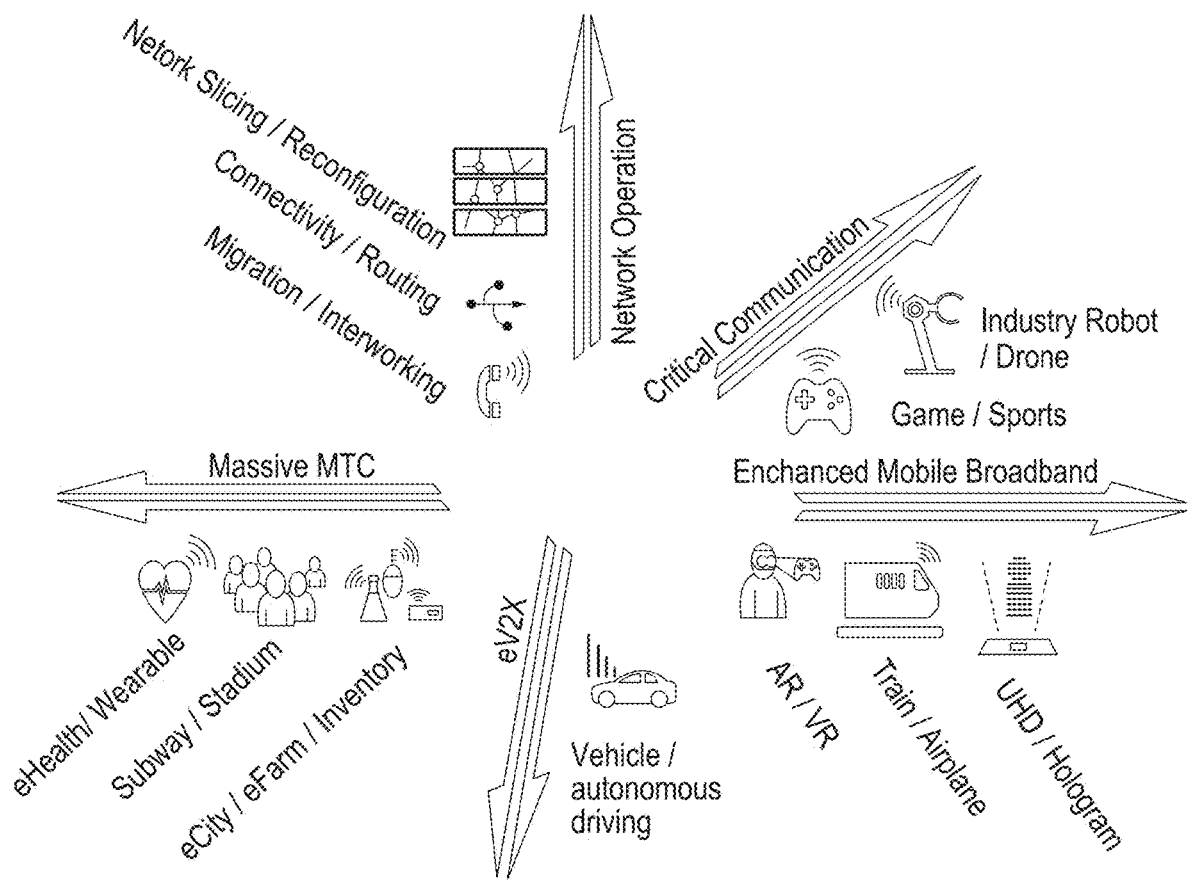
FIG. 8 depicts example use cases for embodiments described herein.

In addition, current LTE reference signal schemes do not support different numerologies for supporting different devices or services (e.g., eMBB, URLLC, and mMTC) with different band slices (e.g., numerology sub-bands), as shown in FIG. 7. For example, it is recognized herein that current LTE reference signals may fail the low latency requirement for URLLC devices, which may require very low latency in some cases (e.g., 0.5 ms of data plane latency). It is recognized herein that issues related to supporting different mixed numerologies may apply to various, for instance all, NR scenarios/use cases, such as those shown in FIG. 8.

Embodiments are now described that address issues related to providing reference signals that are configurable, such that NR systems can be more efficient and flexible. In an example embodiment, reference signals are allocated to support different numerologies and different RS functions. In an example, a reference signal configuration includes time and frequency resources for a reference signals. Example time resources associated with the reference signal may include at least one of a start time at which the reference signal is allocated, a number of time intervals during which the reference signal is allocated, a time pattern at which the reference signal is allocated, an indication of whether the reference signal is periodic, or the like. Example frequency resources associated with the reference signal may include at least one of a start frequency at which the reference signal is allocated, a number of subcarriers (or groups) in which the reference signal is allocated, a frequency pattern at which the reference signal is allocated, an indication of a frequency hopping pattern, or the like. Further, a spatial domain allocation may be configured for a beamformed RS, as discussed further below.

Figure 9:
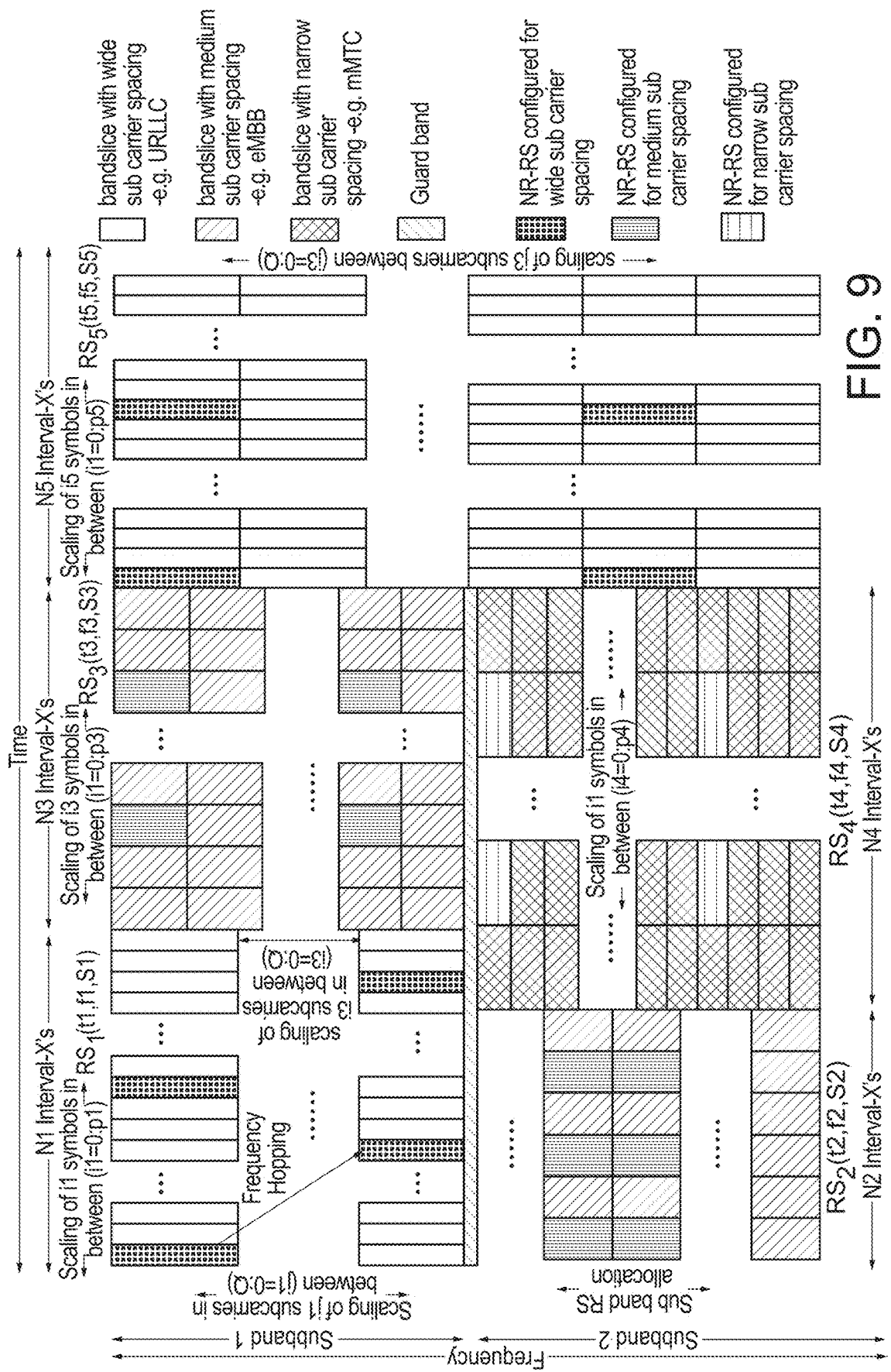
FIG. 9 depicts example reference signal (RS) configurations for different numerologies.

Referring now to FIG. 9 an example NR-RS allocation for mixed numerologies is shown. The example reference signals are allocated for different subbands, as indicated by the numbers in FIG. 9. For instance, RS1 corresponds to subband 1, and RS2 corresponds to suband 2, etc. It will be understood that five reference signals are shown for purposes of example, but embodiments are not limited to the illustrated example. As shown, each reference signal may have a corresponding configuration, which may include time (t), frequency (f), and spatial (s) resources. Further, each RS may be applicable to different numerologies with different subcarrier spacings and symbol length. In accordance with the illustrated embodiment, example subcarrier spacings include wide, medium, and narrow subcarrier spacings. For example, as shown, RS1 (t1, f1, s1) represents the configurable RS that is allocated for a wide subcarrier spacing numerology in only subband 1, which has a certain frequency hopping pattern and lasts N1 time intervals. As indicated in the FIG. 9, the allocations with respect to the time and frequency domains may be configured. For example, the scaling in the time domain between two RS resource elements (REs) may be configured as i symbols, and the scaling in the frequency domain between two RS REs may be configured as j subcarriers. In addition, in an example, an RS configuration may represent a contiguous RE configuration in time or frequency, such as, for example, RS2 (t2, f2, s2) allocated continuously within a number of subcarriers in frequency (FIG. 9).

As described herein, an NR-RS (or simply RS) may be dedicated to a numerology or common to multiple numerologies. In some cases, with respect to each numerology per subband, an RS allocation may be different, for example, in terms of frequency resources, time resources, spatial resources, time duration in number of time intervals (represented as Interval-X in FIG. 9), frequency duration, or frequency hopping pattern. In some cases, with respect to multiple numerolgies in single or multiple subbands, RS allocations may be the same as each other, for example in a common configuration for multi-numerology to serve a particular function to reduce the system overhead.

A reference signal configuration may have one or more configurable fields, such as the example fields listed in Table 6. One or more (for instance all) of the fields may be used to configure a given RS. In some cases, each configuration may include multiple RS allocations, which may be applied to different types of reference signals such as, for example, demodulation reference signals (DM-RS) or channel state information reference signals (CSI-RS). Further, the multiple RS allocations may be applied to different time and frequency resources for the same RS type. A subcarrier group, such as the physical resource block (PRB) (group of 12 subcarriers) can be used. The resource allocation in a given frequency domain may be measured by the number of j subcarriers in Table 6 below.

TABLE 6

Example Configurable NR-RS Fields

| Field Element | Meaning of each Field |
| --- | --- |
| NumRSTypes | Number of configured RS types (e.g., 2 types as shown wherein for purposes of example) |
| RSType1 | Function of RS such as DM-RS, CSI-RS |
| NumerologyIndex | Numerology type (for common RS allocation per multi-numerology, the index will be more than 1 value) |
| TransmissionDirection | DL RS or UL RS |
| StartTime | Start time of allocation |
| TimeAllocation | Number of n Interval-X's per allocation, where n >= 1 integer |
| TimeAllocationPattern | Time Allocation Pattern such as one RS RE peri (i >= 1) OFDM symbols within an Interval-X or other unevenly distributed patterns. |
| StartFreqency | Start frequency of allocation |
| FrequencyAllocation | Number of m (m >= 1) subcarrier groups per allocation |
| FreqAllocationPattern | Frequency Allocation Pattern such as one RS RE per j (j >= 1) sub carriers or other unevenly distributed patterns |
| Periodicity | trs duration if periodic allocation or 0 ms if aperiodic allocation |
| FreqHoppingPattern | Frequency hopping pattern |
| RSType2 | Function of RS such as DMRS, CSIRS |
| NumerologyIndex | Numerology type (for common RS allocation per multi-numerology, the index will be more than 1 value) |
| TransmissionDirection | DL RS or UL RS |
| StartTime | Start time of allocation |
| TimeAllocation | Number of n Interval-X's per allocation, where n >= 1 integer |
| TimeAllocationPattern | Time Allocation Pattern such as one RS RE per i (i >= 1) OFDM symbols within an Interval-X or other unevenly distributed patterns. |
| StartFreqency | Start frequency of allocation |
| FrequencyAllocation | Number of m (m >= 1) subcarrier groups per allocation |
| FreqAllocationPattern | Frequency Allocation Pattern such as one RS RE per j (j >= 1) sub carriers |
| Periodicity | trs duration if periodic allocation or 0 ms if aperiodic allocation |
| FreqHoppingPattern | Frequency hopping pattern |
| . . . | |

Figure 10:
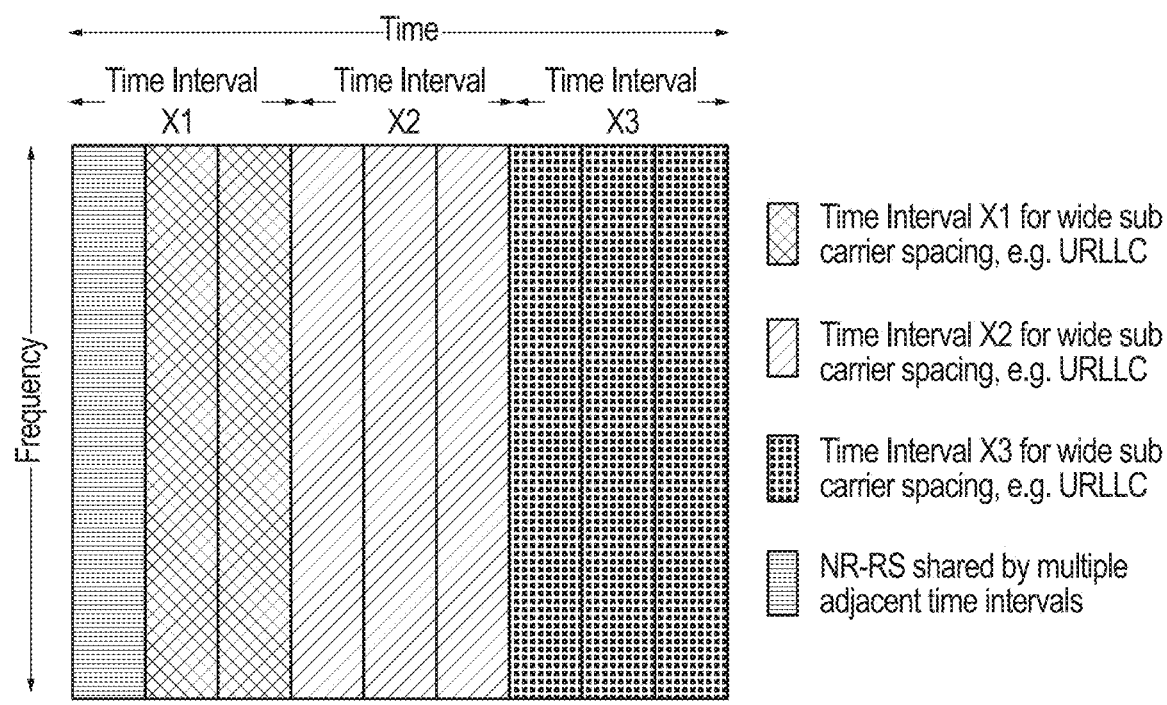
FIG. 10 depicts an example RS that is shared by multiple time intervals.
Figure 11:
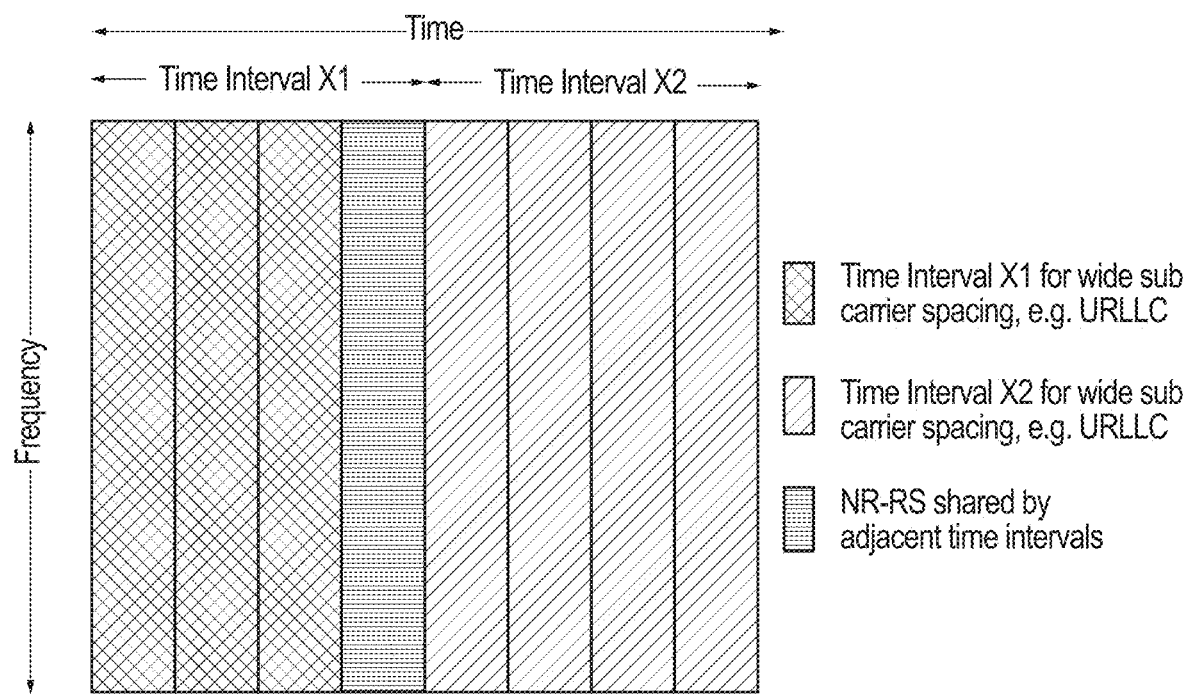
FIG. 11 depicts an example RS that is shared with adjacent time intervals.

With respect to wide subcarrier spacing numerology, to achieve low latency requirement, an RS may be allocated at the beginning of both the DL duration and UL duration per a time interval X. If frequency hopping is applied, for example, the NR-RS may be allocated at the beginning of both DL duration (e.g., DL RS) and UL duration (e.g., UL RS) per time interval X per frequency hopping pattern, as illustrated by RS1 in FIG. 9. In another example, a RS that is allocated at the beginning of a given time interval X may be shared by multiple time intervals. This may be applicable to low speed scenarios, such as shown in FIG. 10, wherein that one allocation of a RS is shared by three time intervals. It will be understood that this example is not limited to a wide subcarrier spacing numerology. Referring now to FIG. 11, in yet another example, with respect to wide subcarrier spacing numerology, an RS may be allocated to be shared among adjacent time intervals, for example, because of a short time interval X and/or a lack of symbol resources.

Figure 12:
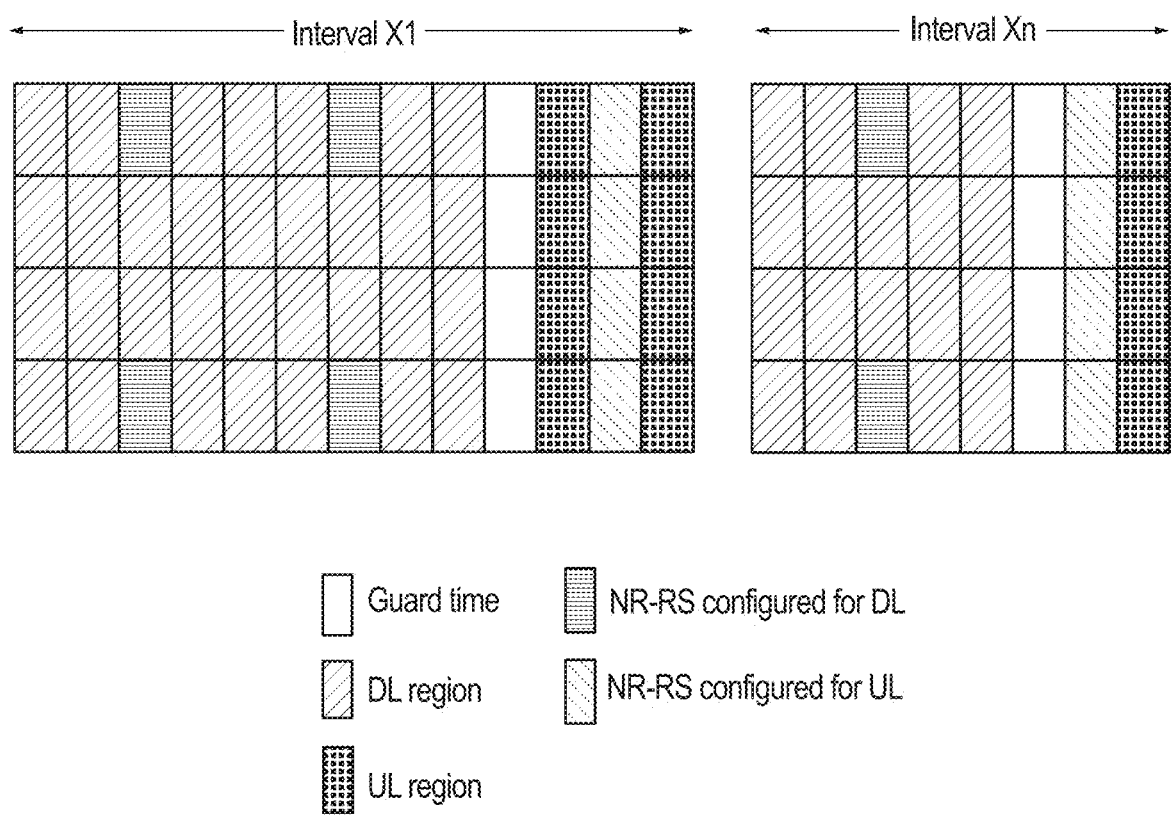
FIG. 12 depicts example RS configurations for different time intervals having different lengths.
Figure 13:
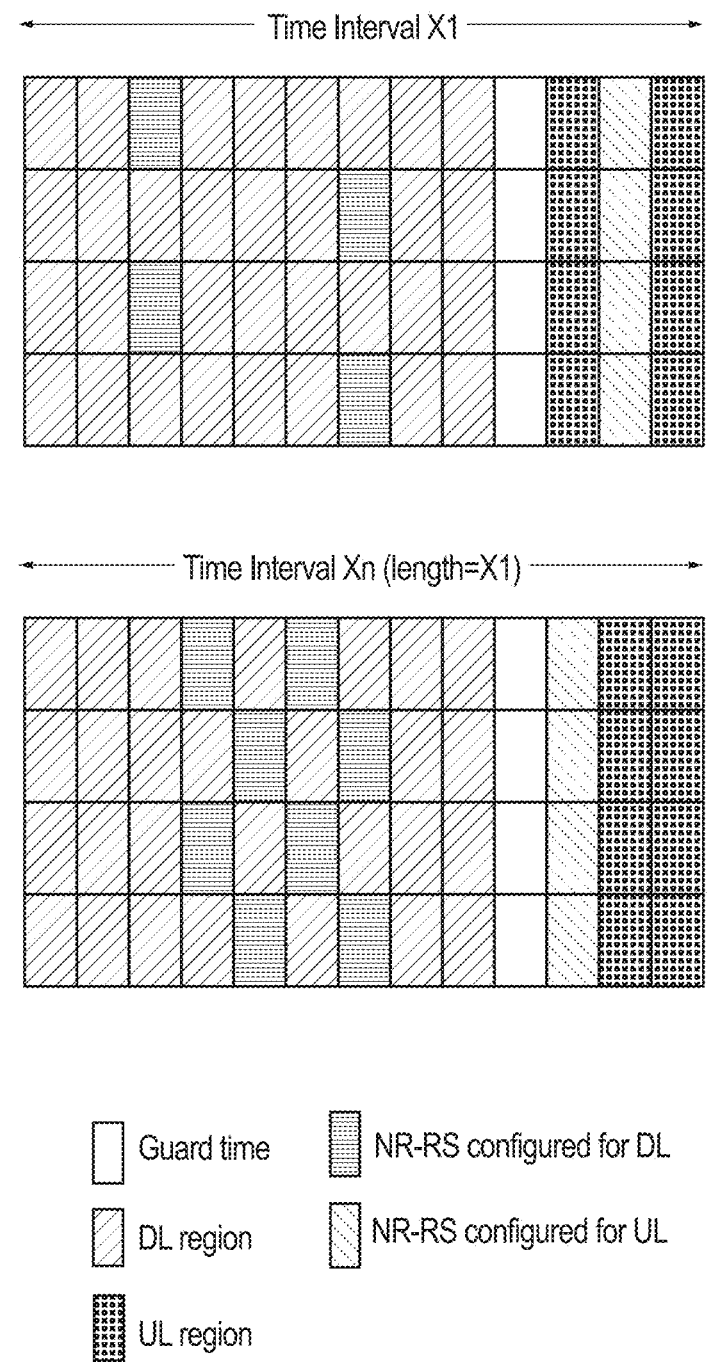
FIG. 13 depicts example RS configurations for time intervals having the same length.

The length of a given time interval X for NR may be variable, and within each time interval X, the DL and UL durations may also be varied. In some cases, even with the same length of time interval X, the contained number of symbols and sub-carriers may also be distinct. Therefore, in one embodiment, the RS may have different configurations for a different time interval X, and the configuration may be a function of the length of the time interval X, as shown in FIG. 12. In another example, an given RS may have different configurations for DL and UL durations, and the configuration may be a function of the length of DL time duration per the time interval X, or the length of UL time duration per the time interval X. In another example, a given RS configuration may be a function of the number of symbols and the number of subcarriers per a given time interval X. In some cases, an RS configuration may be varied among time intervals that are the same, as shown in FIG. 13. Thus, as described above, a reference signal configuration may be a function of one or more characteristics associated with the time intervals of the reference signal.

Reference signals may serve different functions, and thus the reference signal configurations described herein may include one or more functions performed by the respective reference signal. In some cases, regardless of whether an RS is for UL or DL, it may be configured for multiple functions such as, for example and without limitation, control channel demodulation, data channel demodulation, interference measurement, CSI measurement, radio resource management (RRM) measurement, beam sweeping, beamform training, time and frequency offset tracking, or synchronization. Thus, a given RS allocation may be statically, semi-statically, or dynamically configured to serve different functions. In one example, a given RS configuration serves a single function. In another example, a given RS configuration serves multiple functions (e.g., interference measurement and CSI measurement, or beam training and RRM measurement), for example, to enhance system resource efficiency for NR.

Figure 14:
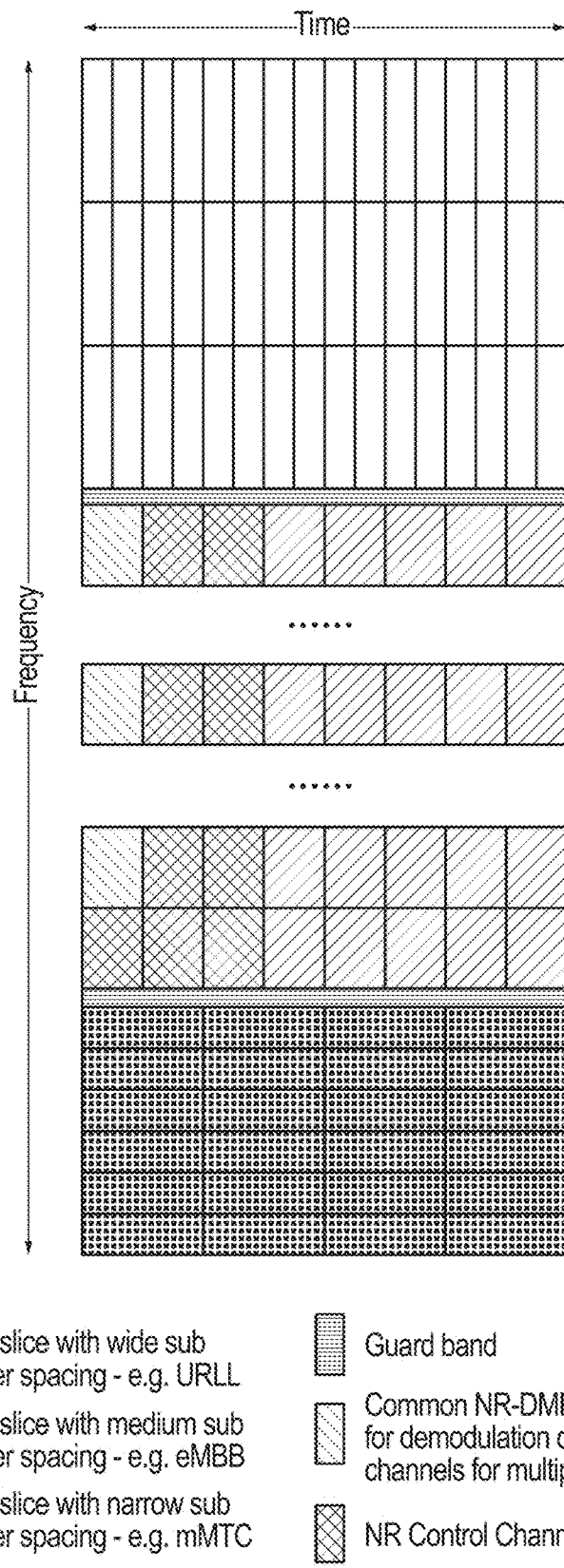
FIG. 14 illustrates an example RS configuration for the demodulation of control channel(s) for different numerologies.
Figure 15:
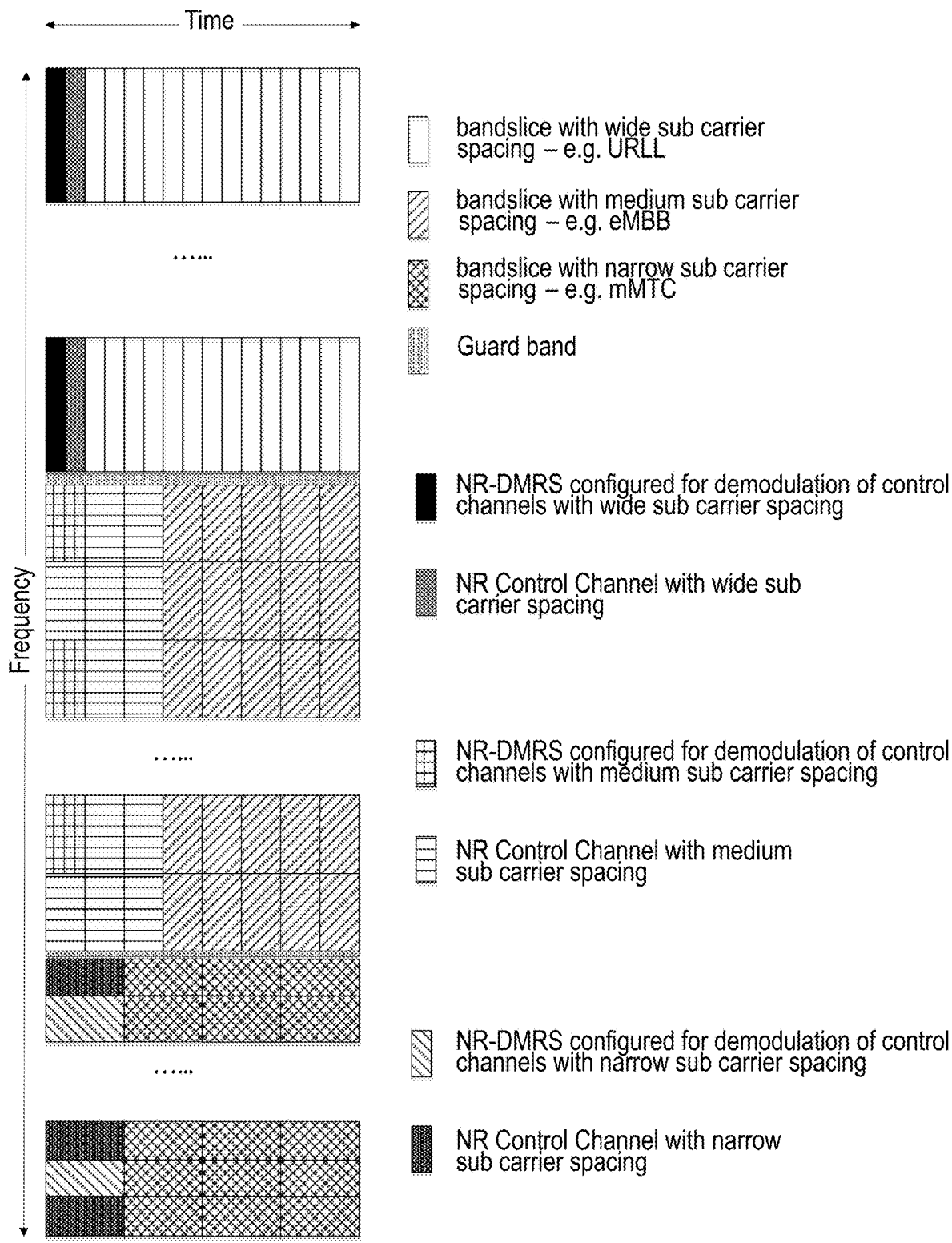
FIG. 15 illustrates an example dedicated RS configuration for the demodulation of control channels.

With respect to control channel demodulation, in an example, an RS may be configured at the leading symbols of the DL/UL duration of each time interval X for the function of demodulation of DL/UL control channels. In some cases, the RS is on-demand with DL/UL control channels only, and varies per numerology. In some cases, the RS is shared among multiple numerologies or dedicated to different numerologies. FIG. 14 depicts an example of how to configure and allocate common subband demodulation RS for control channels for mixed numerologies, in accordance with an example embodiment. As shown, the RS REs may be spaced by j subcarriers. FIG. 15 shows an example of how to configure and allocate dedicated demodulation RS for control channels for mixed numerologies, in accordance with an example embodiment.

With respect to a data channel demodulation, reference signals may have different configurations for demodulation of DL/UL data transmissions as compared to configurations for demodulation of DL/UL control channels. In an example, the RS may be on-demand with DL/UL data transmissions only, and may be different per numerology. FIG. 12 shows an example of the RS configured for demodulation of DL and UL data transmissions. It will be understood that other configurations are not excluded.

With respect to CSI measurement, the RS may be configured for CSI measurement and a CSI feedback report, which, in some cases, may require no more than one CSI-RS RE per antenna port. In some cases, on account of the large number of antenna ports in NR systems, the NR CSI-RS may be in an aperiodic mode to reduce the resource overhead. In other cases, depending on the use case, the NR CSI-RS may be configured to be in a periodic mode. A reference signal for CSI measurement may be non-precoded based and/or beamformed based. The beamformed RS may require more resource overhead as compared to the non-precoded RS. The beamformed RS may be configured in an aperiodic mode and may be more UE-specific as compared to the non-precoded RS. In an example, the non-precoded RS can be configured in a periodic mode, and the periodicity may be configurable based on different use cases, traffic loads, mobility, etc.

With respect to TDD systems, due to channel reciprocity, DL CSI measurement may use the channel estimation from UL RS information. Thus, the RS configuration for CSI measurement may be less frequently, or aperiodically, configured in this case.

Figure 16A:
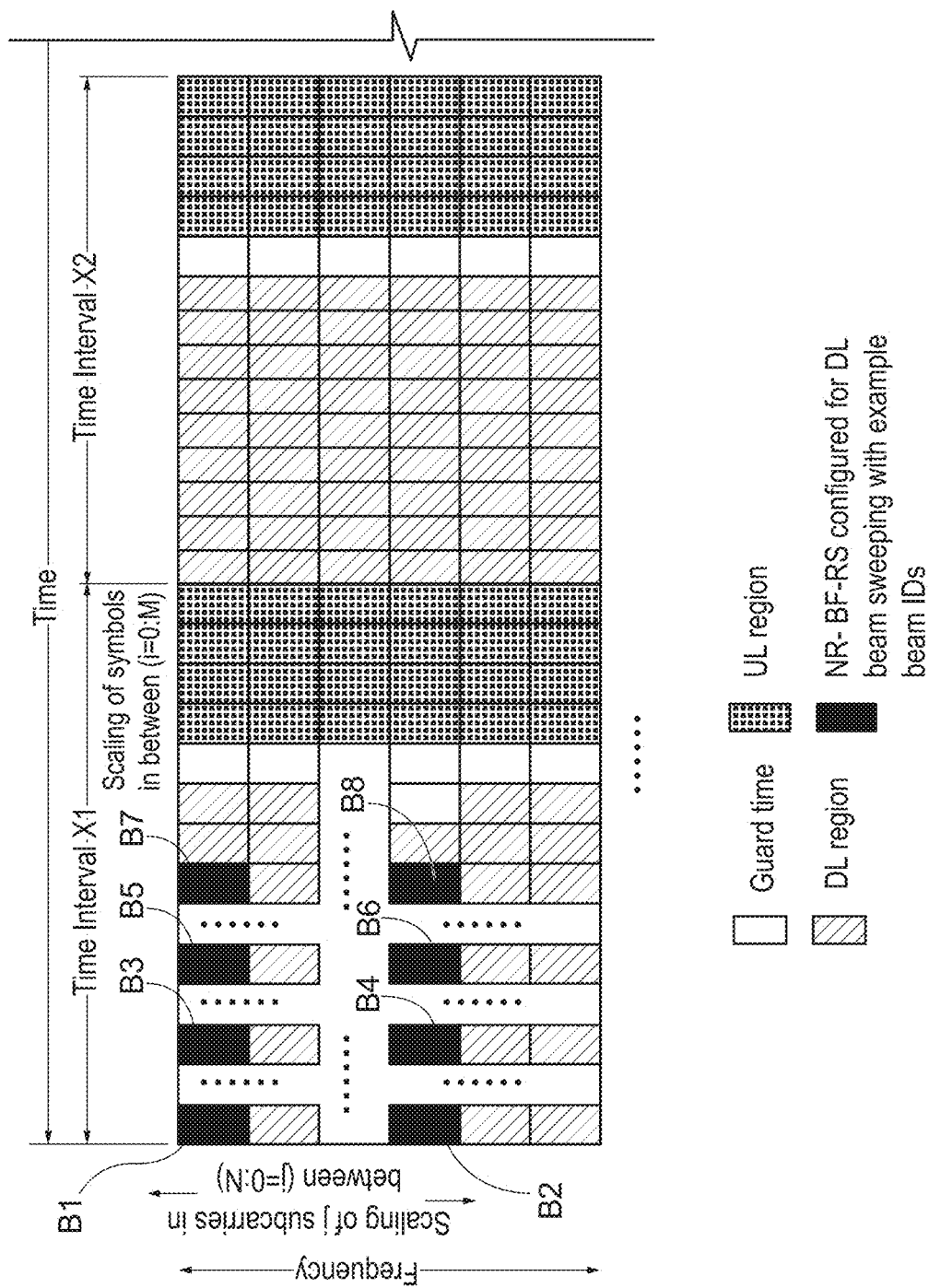

With respect to reference signals for beam sweeping, the RS may be predefined for beam sweeping for initial access, such as, for example, for physical broadcasting signals, synchronization signals, system information for downlink, and random access signals for uplink. A RS that serves for this beam sweeping function can be referred to herein as a Beam Formed RS (BF-RS). In an example, an NR node or a TRP may conduct beam sweeping over all individual transmit beams to cover the whole area. In some cases, the TRP may be the same as the Radio Resource Head (RRH) in the existing LTE architecture. FIGS. 16A and 16B show an example BF-RS configuration in which eight beams cover the entire area without resource reuse. In an example, the BF-RS may be predefined as a function of beam width, or a number of beams per NR-Node TRP, or UE. In an example with a total of 32 beams, the BF-RS may require 32 BF-RS REs (e.g., if there is no RE reuse among beams) per a beam sweeping cycle. The BF-RS may be allocated at the beginning of each beam sweeping period and distributed proportionately across the bean sweeping duration. In an example, the BF-RS may be predefined to use subband allocation. A given BF-RS RE/port may require k (where k is a fraction of a RE or one or more REs) REs (e.g., antennas) per beam. Different beams may use different antenna ports when transmitting at the same time. If different beams are transmitted at different times, the same antenna port may be used. In another example, the BF-RS may also use multiple REs/multiple antenna ports per beam. In this case, the number of REs and ports may be configured. It will be understood that FIGS. 16A and 16B show an example BF-RS allocation, but the BF-RS of a beam may be allocated with multiple REs per symbol per beam, or may be allocated with the entire subband REs per symbol per beam.

With respect to BF-RS orthogonality, for an example narrow beam configuration, especially for a higher frequency band, the BF-RS requirement for orthogonality may be reduced due to high directionality per transmitter-receiver beam pair. In this case, multiple beams may be transmitted via the same time/frequency/spatial resource to reduce the system overhead. For example, beam 1~beam m may use the same time and frequency resource, and similarly, beams (m+1)~beam 2m, beam (2m+1)~beam 3m . . . may use the same time and frequency resource. To further clarify by way of example, beam (m+1) refers to a beam number of m+1. With respect to an example wide beam configuration, BF-RS orthogonality may also be required. Thus, to achieve the BF-RS orthogonality, various mechanisms may be implemented, such as, for example, time division multiplexing, frequency division multiplexing, code division multiplexing or (orthogonal cover code) (OCC), or spatial division multiplexing. For example, if beam 1 and beam k are spatially separated from each other, the same time and frequency resource may be used to transmit beam 1 and beam k. In some cases, the BF-RS may be predefined to use either continuous or discontinuous resources/symbols in one time interval or multiple time intervals. For example, an NR node may predefine M symbols/REs per time interval, and configure N time intervals to cover one beam sweeping cycle. In this example, the total time resources used per beam sweeping cycle is M*N symbols.

In another example, the BF-RS may be predefined with dedicated resources per numerology, or configured with common resources for all numerologies. In the common resources example, the UEs with different numerologies can search a common resource region for initial access of beam sweeping. The common resources may save the system resources and reduce resource overhead. Beam sweeping may be conducted in both DL and UL directions. For TDD systems with channel reciprocity of DL and UL, the beam sweeping for uplink may be simplified or skipped. The BF-RS may include primary system information. Example of such information may include information similar to information captured in MIB/SIB1/SIB2 of an LTE system. Without the primary information, a given UE might not be able to access the system. The BF-RS may also include secondary system information, which refers to system information other than the primary system information. The BF-RS may also include synchronization signals. In an example, the configuration of the primary system information BF-RS and the configuration of the synchronization signals BF-RS may be predefined so that the UE can process this information before accessing the system. For example, the UE may be pre-provisioned with the relevant configuration parameter (e.g. using Over-the-Air provisioning) or the configuration parameters may be preloaded onto the UE. Alternatively, these configuration parameters may be specified in a specification for different modes of operations. In an example, the configuration parameters of the secondary system information BF-RS may be delivered to the UE using system information broadcasts or dedicated signaling.

Figure 17A:
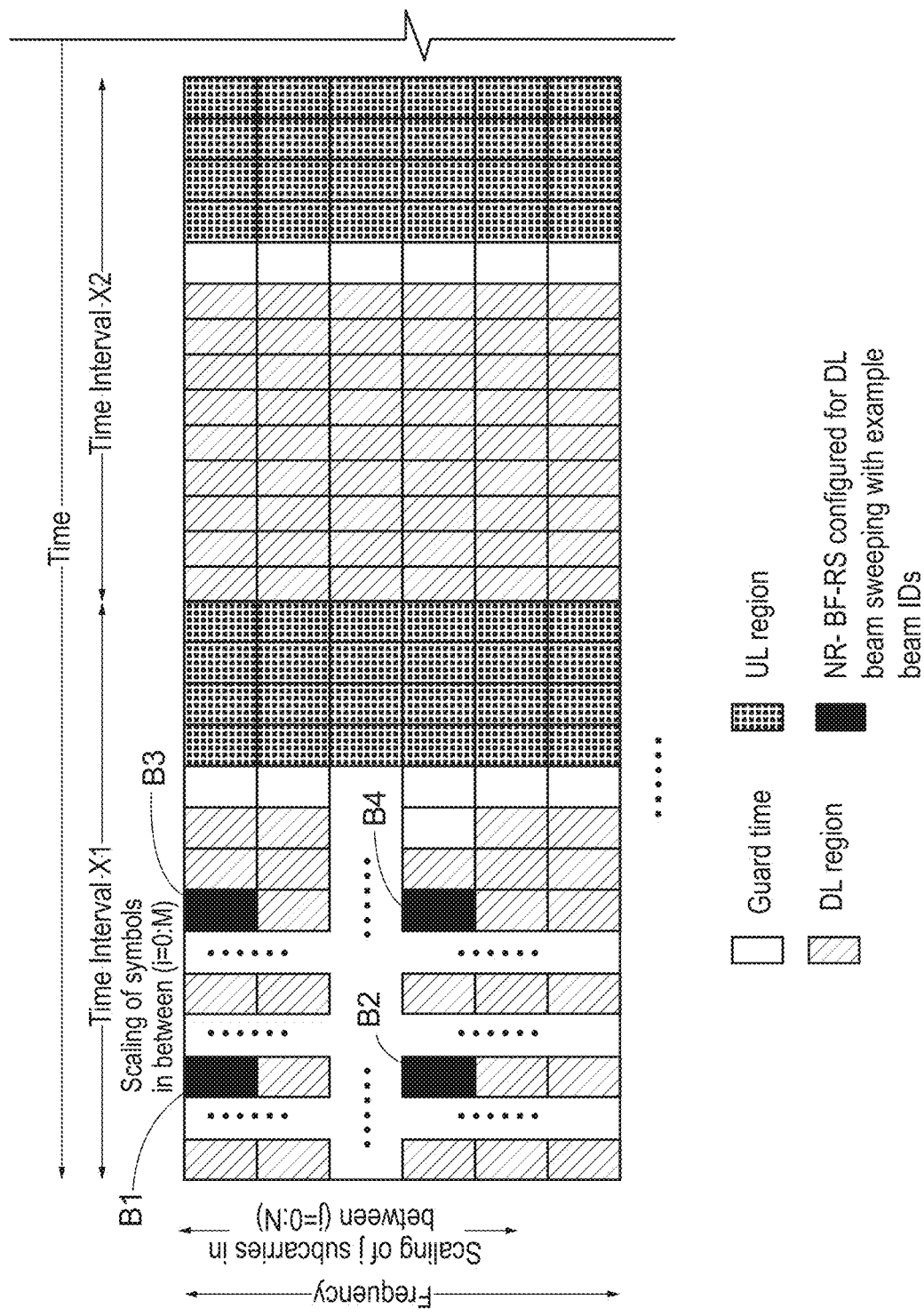
FIGS. 17A and 17B depict an example BF-RS configuration for data transmission beam pairing.
Figure 17B:
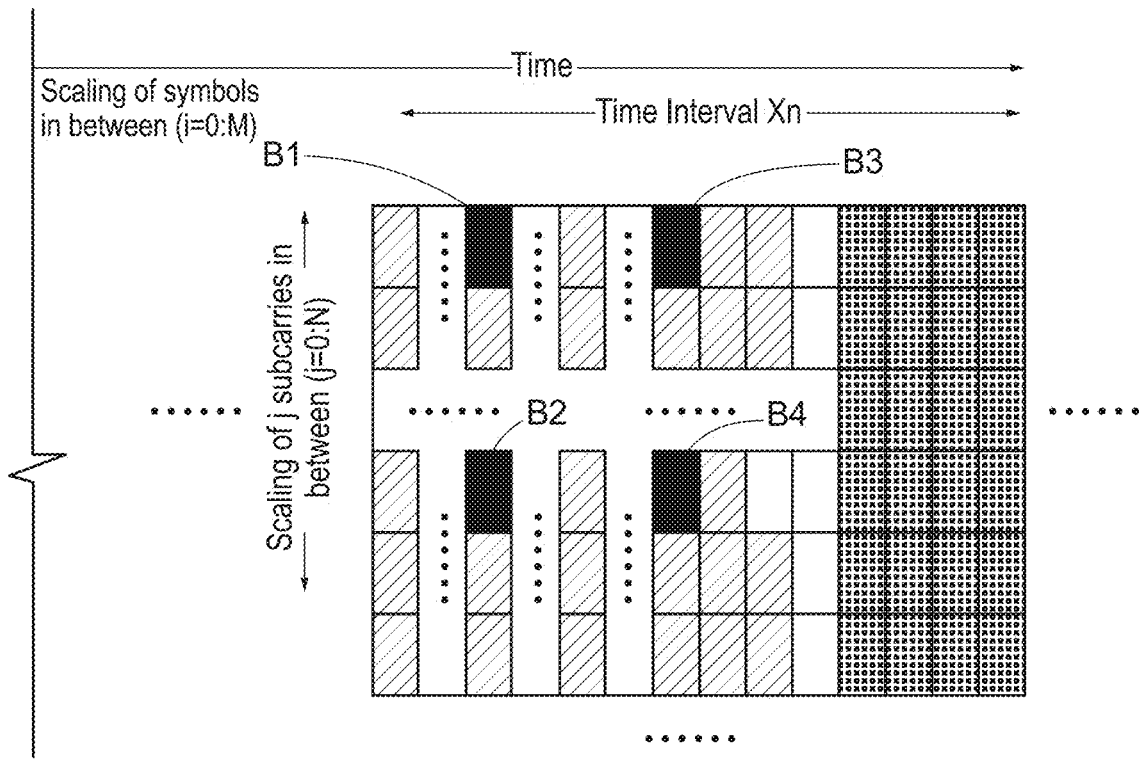

With respect to reference signals for beamforming training of data transmission beam pairings, in accordance with an example, an RS may be configured as a UE-specific RS. The RS for beamforming training may be on-demand, for example in response to UE's feedback that includes beamforming training request, in response to a UE's UL control signaling, or in response to an event trigger at an NR node or the TRP. For a particular UE, multiple beams may be used based on beamforming training measurement results. With respect to beam width for data transmissions, in some cases, the beams for data transmissions may be the same beam width as the initial access beams. Then for a particular UE or a group of UEs, the transmitter and receiver may choose a subset of beams upon which to implement beam refinement and alignment. Referring to FIGS. 17A and 17B, for example, with respect to a particular UE or a group of UEs, an NR Node or TRP may choose beams 1, 2, 3 and 4 (B1, B2, B3, B4) to do beamforming training for data transmissions. It will be understood that while FIGS. 17A and 17B show an example BF-RS allocation for beamforming training, the BF-RS of a beam may be allocated with multiple REs per symbol per beam, allocated for the entire subband of REs per symbol per beam as desired. In another example, the beam for data transmissions may have a different beam width (e.g., more narrow) as compared to the initial access beam. For a particular UE or a group of UEs, the transmitter and receiver may choose a subset of narrower beams to do beam refinement and beam selection. The narrower beams may be the beams spatially close to the initial access beam direction. For example, for a particular UE or a group of UEs, the NR-Node or TRP may choose narrower beams 11, 12, 13, and 14 to do beamforming training. Beams 11, 12, 13, 14 may be the narrower beams that spatially close to/covered by the initial access beam 1 direction.

With respect to beamformed/precoded reference signals, such as the BF-RS for beamforming training, the RS allocation may consider the spatial division as configurable parameters. One or more of the following example fields in Table 7 may be used to configure the BF-RS via one methods described herein below.

TABLE 7

Example Configurable NR Beamformed RS Fields

| Field Element | Meaning of each Field |
| --- | --- |
| NumRSTypes | Number of RS types |
| RSType1 | Function of RS such as BF-RS |
| Function | Function of RS, such as beam sweeping or CSI measurement or multiple functions |
| NumTotalBeams | Total number of beams per beam sweeping or beamforming training |
| NumBeams | Number of beams per RS configuration (e.g. may conduct beamforming training with a subset of beams) |
| BeamPattern | Beam index allocation per RE, such as beam ID y at (ti, fj) |
| BeamReuseFactor | Number of beams reused per RE |
| BeamReusePattern | How to spatially reuse the beam RE, such as beam ID y, y + 3, y + 6 using the same RE |
| NumerologyIndex | Numerology type (for common RS allocation per multi-numerology, the index will be more than 1) |
| TransmissionDirection | DL RS or UL RS |
| StartTime | Start time of allocation |
| TimeDuration | Number of time intervals per allocation |
| TimeAllocationPattern | Time Allocation Pattern such as one RS RE per M OFDM symbols |
| StartFreq | Start frequency of allocation |
| FrequencyDuration | Number of subbands/subcarriers per allocation |
| FreqAllocationPattern | Frequency Allocation Pattern such as one RS RE per j sub carriers |
| Periodicity | K ms if periodic allocation or 0 ms if aperiodic allocation |
| FreqHoppingPattern | Frequency hopping pattern (0 for no frequency hopping) |
| . . . | |

Figure 18A:
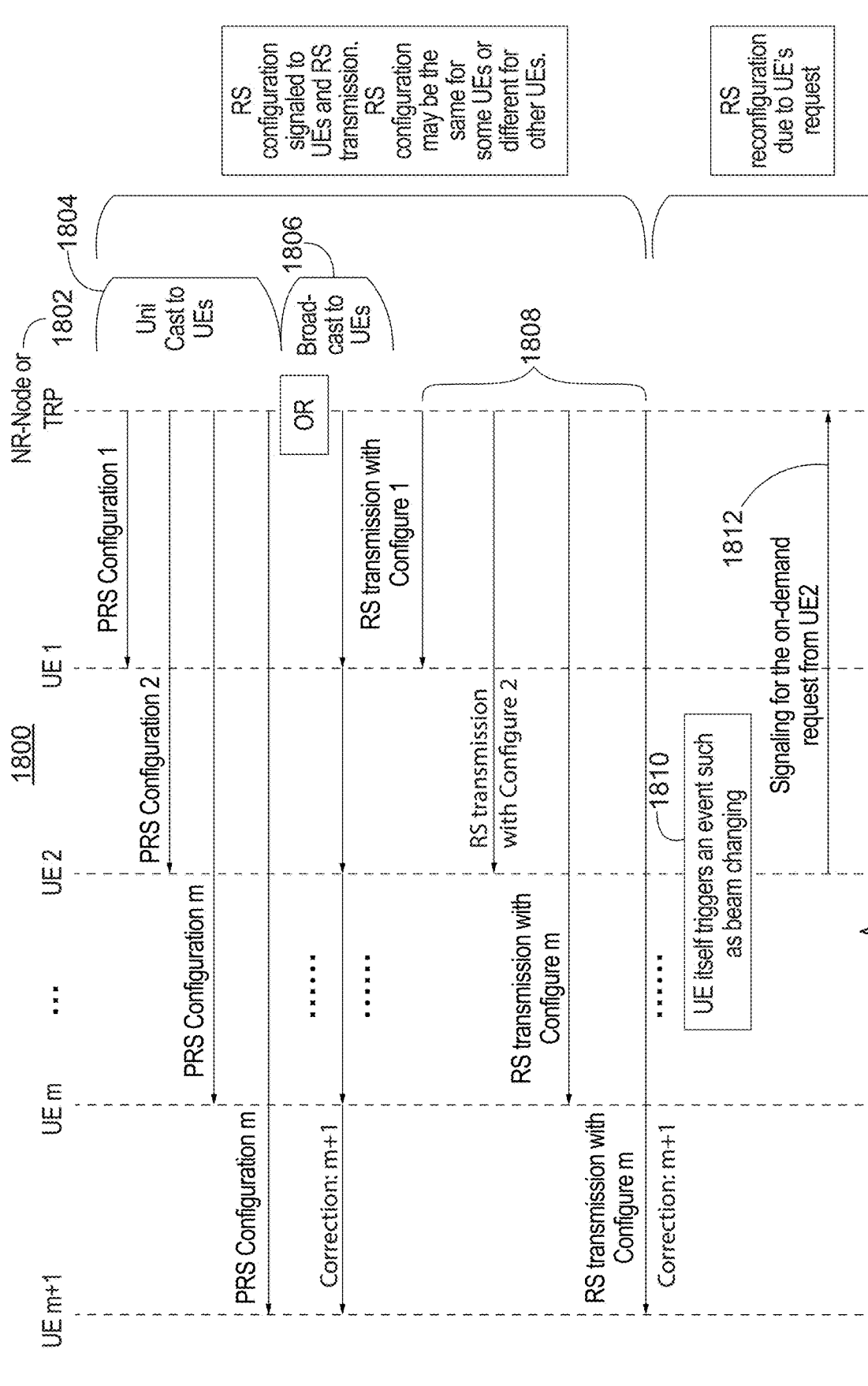
FIGS. 18A and 18B is a call flow for an example On-demand RS Configuration/Reconfiguration in accordance with an example embodiment.
Figure 18B:
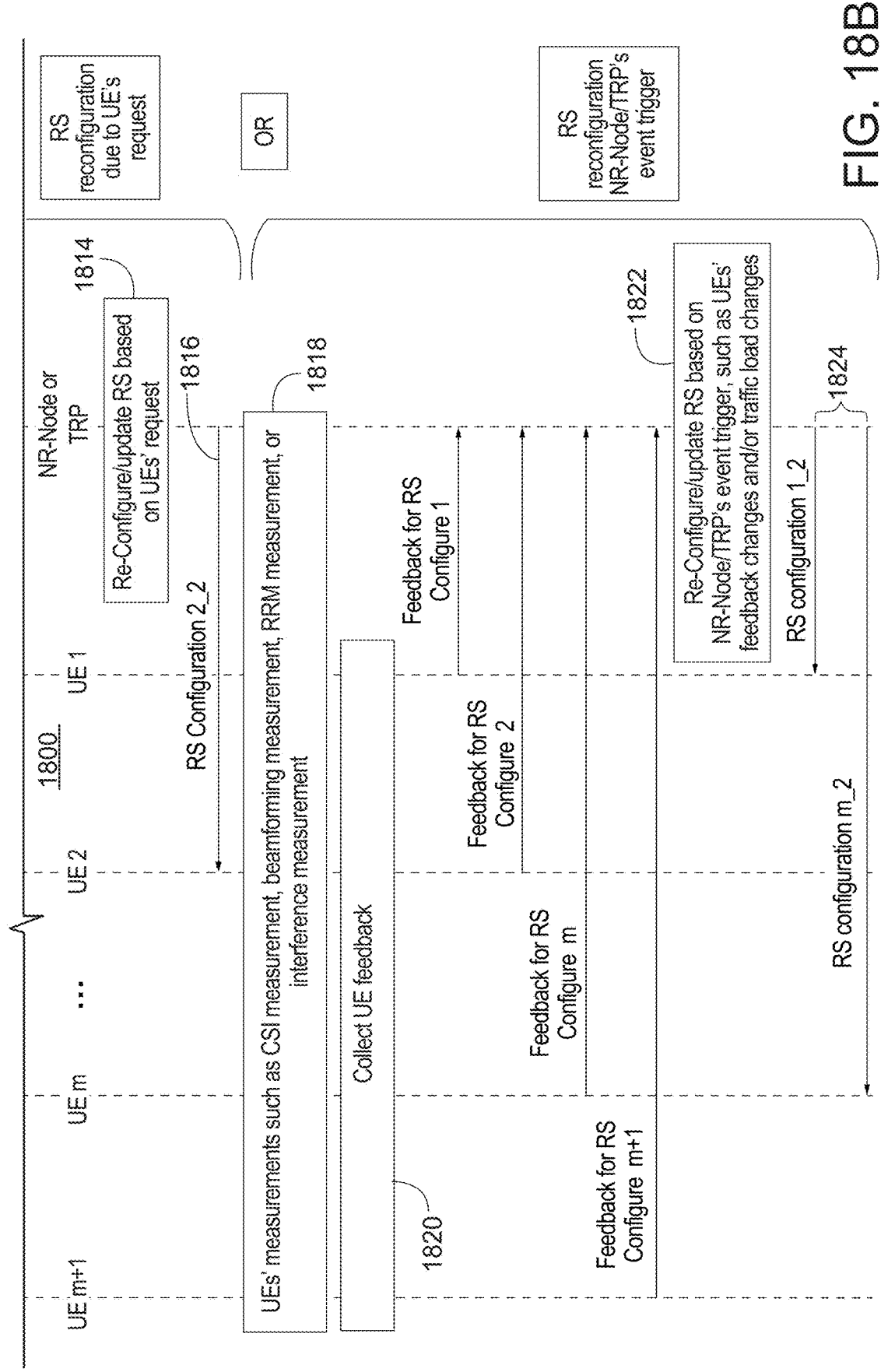

With respect to reference signals for RRM measurement, a multi-function RS can be used for RRM measurement. FIGS. 18A and 18B depict an example of a multi-function RS for RRM measurement. Referring to FIGS. 18A and 18B, an example system 1800 is shown which includes a plurality of UEs (UE1, UE2, UEm and UEm+1) and an NR node 1802 (or TRP 1802). It will be appreciated that the example system 1800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 18A and 18B and all such embodiments are contemplated as within the scope of the present disclosure.

Referring to FIG. 18A, in accordance with the illustrated embodiment, at 1804, the node 1802 unicasts a respective RS configuration to each of the UEs. Alternatively, at 1806, the node 1802 can broadcast an RS configuration to the UEs. The RS configuration may be the same for a plurality of the UEs. The RS configuration may also be different for a plurality of UEs. Thus, the RS configuration may be the same for some UEs and different for other UEs. At 1808, in accordance with the illustrated example, the node 1802 transmits the reference signals in accordance with the respective reference signal configuration, such that at least UE (device) obtains information from the reference signal. At 1810, in accordance with the illustrated embodiment, the UE2 triggers an event, such as beam changing for example. In response to the event, at 1812, the UE2 sends an on-demand request to the node 1802. The request may include a request for a new RS configuration. At 1814, the node 1802 reconfigures or updates an RS for the UE2, based on the request from the UE2. At 1816, the new RS configuration is sent to the UE2, in response to the on-demand request.

Alternatively, referring to FIG. 18B, at 1818, one or more UEs may monitor, for example, a CSI measurement, a beamforming measurement, an RRM measurement, or an interference measurement. At 1820, UEs may collect respective measurements. At 1822, in accordance with the illustrated example, the node 1802 may reconfigure or update one or more of the reference signal configurations. The reconfigurations of the reference signals may be based on, for example, a trigger or an event at the node 1802, a given UE's feedback from its measurements, or changes to traffic load. Thus, a reference signal configuration or reconfiguration may be obtained in response to a trigger from at least one device or the network, one or more measurements associated with at least one device, or a traffic load on the network. The new RS configuration may be sent to one or more of the UEs based on the feedback from 1820. In accordance with the illustrated example, at 1824, a new RS configuration is sent to the UE1 and the UEm. Unless otherwise specified, a reference signal configuration may be a reconfiguration.

As mentioned above, with respect to reference signals for interference measurements, a multi-function CSI-RS or a BF-RS may be configured for the interference measurement function. Similarly, a multi-function RS (e.g., BF-RS or a CRS-like RS) may be configured for frequency and time tracking, or synchronization function.

As described above, a RS may serve as single function RS or a multi-function RS to reduce the system resource overhead. A given RS may be configured differently for different functions. The RS configuration may be dynamically changed as well as based on the function it performs, different numerologies, or different time intervals, for example.

Further, an RS may be configured for a specific UE or in a non-UE-specific mode. In a non-UE-specific mode, the RS may serve multiple, for instance all, UEs in a cell or in a coverage area of one or more beams. Non-precoded CSI-RS and BF-RS for beam sweeping of initial access are examples of a possible multi-beam coverage scenario. Alternatively, an RS may be configured in a UE-specific mode with UE-specific allocation, such as, for example, a beamforming training RS for data transmission beam pairing, or a beamformed CSI RS for CSI measurement. Thus, a reference signal configuration may be allocated for multiple devices, such that a plurality of devices obtain information from the reference signal, or a reference signal configuration may be allocated for a specific device, such that only one device obtains information from the reference signal.

Further, in accordance with another example embodiment, reference signals may be configured across levels (multi-level). For example, a RS may be configured as level 1 with non-precoded CSI RS, and level 2 with beamformed/precoded CSI RS for CSI measurement. By way of further example, a RS may be configured as level 1 with wider beam RS for initial access, and level 2 with narrower beam RS for data transmission beam pairing. Also, wider beam RS may be used, for example, for primary system information, while narrower beam RS may be used for the secondary system information. Each level may serve a distinct function. Each level may have different configurations, such as, for example, different periodicities or different allocations in time and frequency domain with different durations.

As described above with reference to FIGS. 18A and 18B, a reference signal may be configured on-demand. An on-demand RS may be triggered by an explicit UE request or autonomously by the network. The triggers in the UE or the network may be one or more of the following, presented by way of example and without limitation:

Data in buffer with buffer report may trigger NR DMRS configuration.

Service switching may trigger NR-RS reconfiguration to support the changed service type/numerology more efficiently.

With UE movement, UE may request beamforming training procedures with BF-RS reconfiguration to refine/realign the beam pair between UE and NR-Node or TRP.

Increased/decreased data traffic loads may trigger NR-RS reconfiguration with changed NR-RS density. For example, UEs with less or no data traffic loads for a duration of time may trigger the reconfiguration with less RS density to reduce resource overhead and also to reduce the interference for neighbor UEs and cells.

Based on various UE measurements.

Example UE measurements that may trigger an on-demand request for a new RS configuration include, CSI measurement and feedback, RRM measurement and feedback, Beamforming measurement and feedback, and Interference measurement and feedback. Further, if a value changes within a UE's feedback report that corresponds to any of the above-mentioned measurements, a RS reconfiguration may be triggered. For example, CQI in the CSI feedback report may change by K levels due to UE's movement or other reasons, which may trigger an RS reconfiguration for beam repairing.

Referring again to FIGS. 18A and 18B, examples of on-demand RS reconfiguration are shown. In accordance with the illustrated example, decisions such as RS configuration, beamforming, and beam changing are made by the node 1802 that is directly connected to the UEs. The node 1802 can also connected to the UEs via a TRP/RRH, which can be referred to as a TRP controlled architecture or a distributed architecture.

Figure 19A:
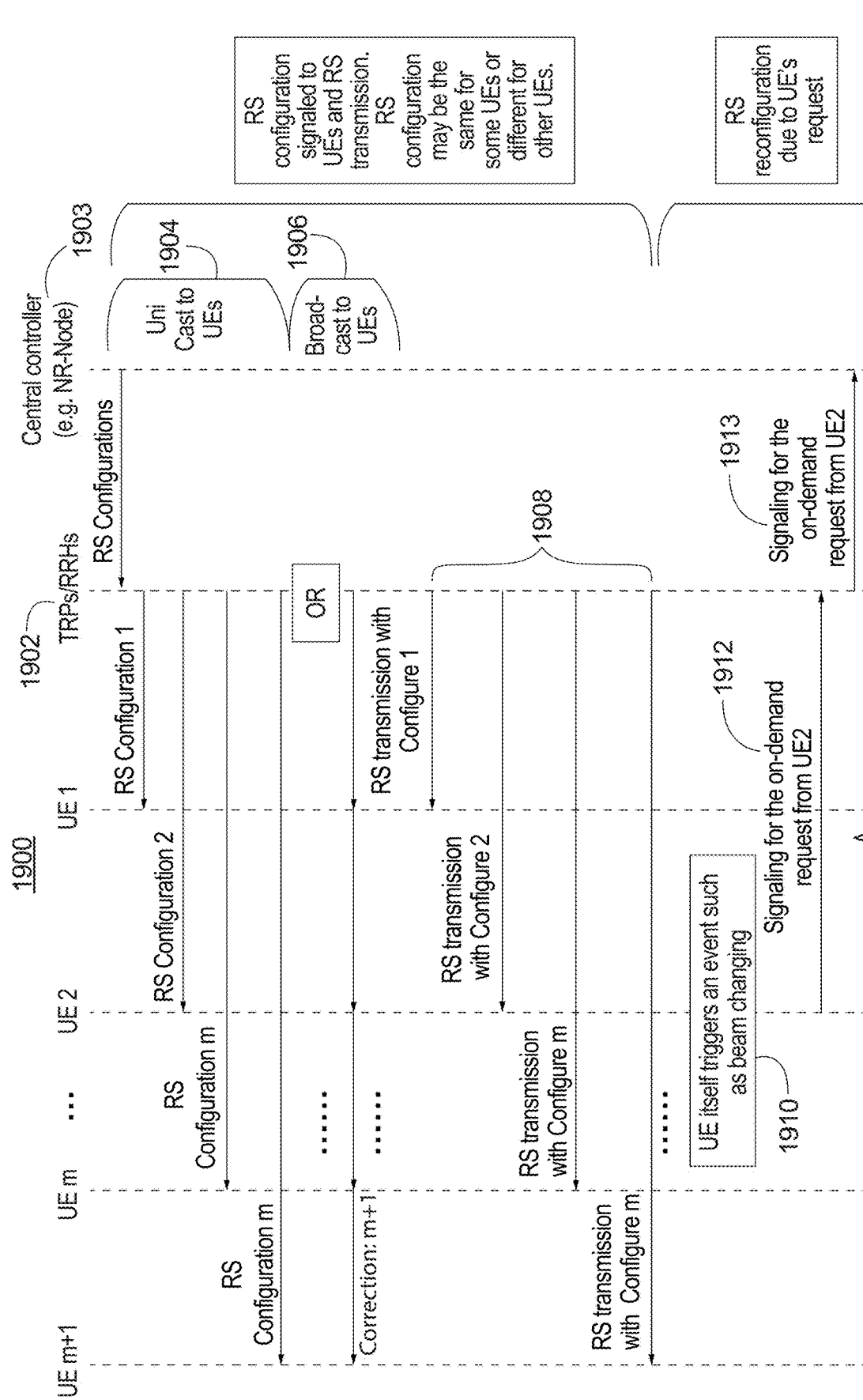
FIGS. 19A and 19B is a call flow for an example On-demand RS Configuration/Reconfiguration implemented within a centralized architecture in accordance with another example embodiment.
Figure 19B:
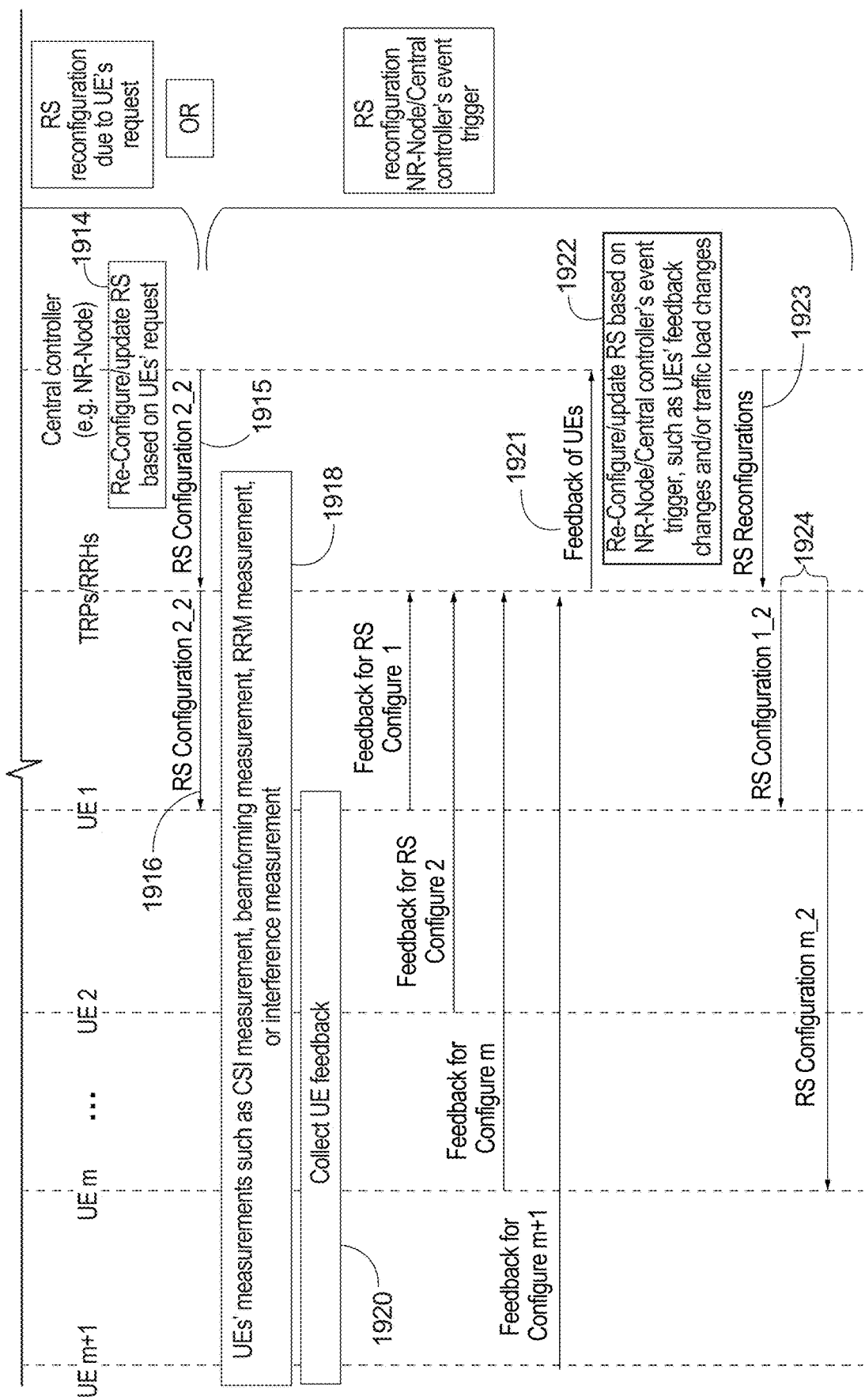

Referring now to FIGS. 19A and 19B, an example centralized control architecture 1900 is shown for on-demand RS reconfigurations. In this example, the UEs connect to the TPRs/RRHs 1902, but the TPRs/RRHs 1904 do not have control capability. Thus, the information and the decisions, such as RS configuration, beamforming, and beam changing, are signaled through the TRPs/RRHs 1904 from/to a NR-Node/Central controller 1903 to/from the UEs. It will be appreciated that the example architecture 1900 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 19A and 19B, and all such embodiments are contemplated as within the scope of the present disclosure.

Still referring to FIGS. 19A and 19B, in accordance with the illustrated embodiment, at 1904, the node 1903 unicasts a respective RS configuration to each of the UEs through the TRPs/RRHs 1902. Alternatively, at 1906, the node 1903 can broadcast an RS configuration to the UEs through the TRPs/RRHs 1902. The RS configuration may be the same for a plurality of the UEs. The RS configuration may also be different for a plurality of UEs. Thus, the RS configuration may be the same for some UEs and different for other UEs. At 1908, in accordance with the illustrated example, the TRPs/RRHs transmit the reference signals in accordance with the respective reference signal configuration, such that at least UE (device) obtains information from the reference signal. At 1910, in accordance with the illustrated embodiment, the UE2 triggers an event, such as beam changing for example. In response to the event, at 1912, the UE2 sends an on-demand request to the node TRPs/RRHs 1902, which forwards the request to the node 1903, at 1913. The request may include a request for a new RS. At 1914, the node 1903 reconfigures or updates an RS for the UE2, based on the request from the UE2. At 1915, the new RS configuration is sent to TRPs/RRHs 1902, which sends the new RS configuration to the UE2 (at 1916), in response to the on-demand request.

Alternatively, still referring to FIG. 19, at 1918, one or more of the UEs may monitor, for example, a CSI measurement, a beamforming measurement, an RRM measurement, or an interference measurement. The TRPs/RRHs 1902, at 1921, may collect the respective measurements from the UEs and send the feedback to the node 1903. At 1922, in accordance with the illustrated example, the node 1903 may reconfigure or update one or more of the reference signal configurations. The reconfigurations of the reference signals may be based on, for example, a trigger or an event at the node 1903, a given UE's feedback from its measurements, or changes to traffic load. The new RS configuration may be sent to one or more of the UEs based on the feedback from 1920. In accordance with the illustrated example, at 1923, the new RS configurations are sent from the node 1903 to the TRPs/RRHs 1902, which sends the respective RS configurations to the UE1 and the UEm (at 1924).

Figure 53A:
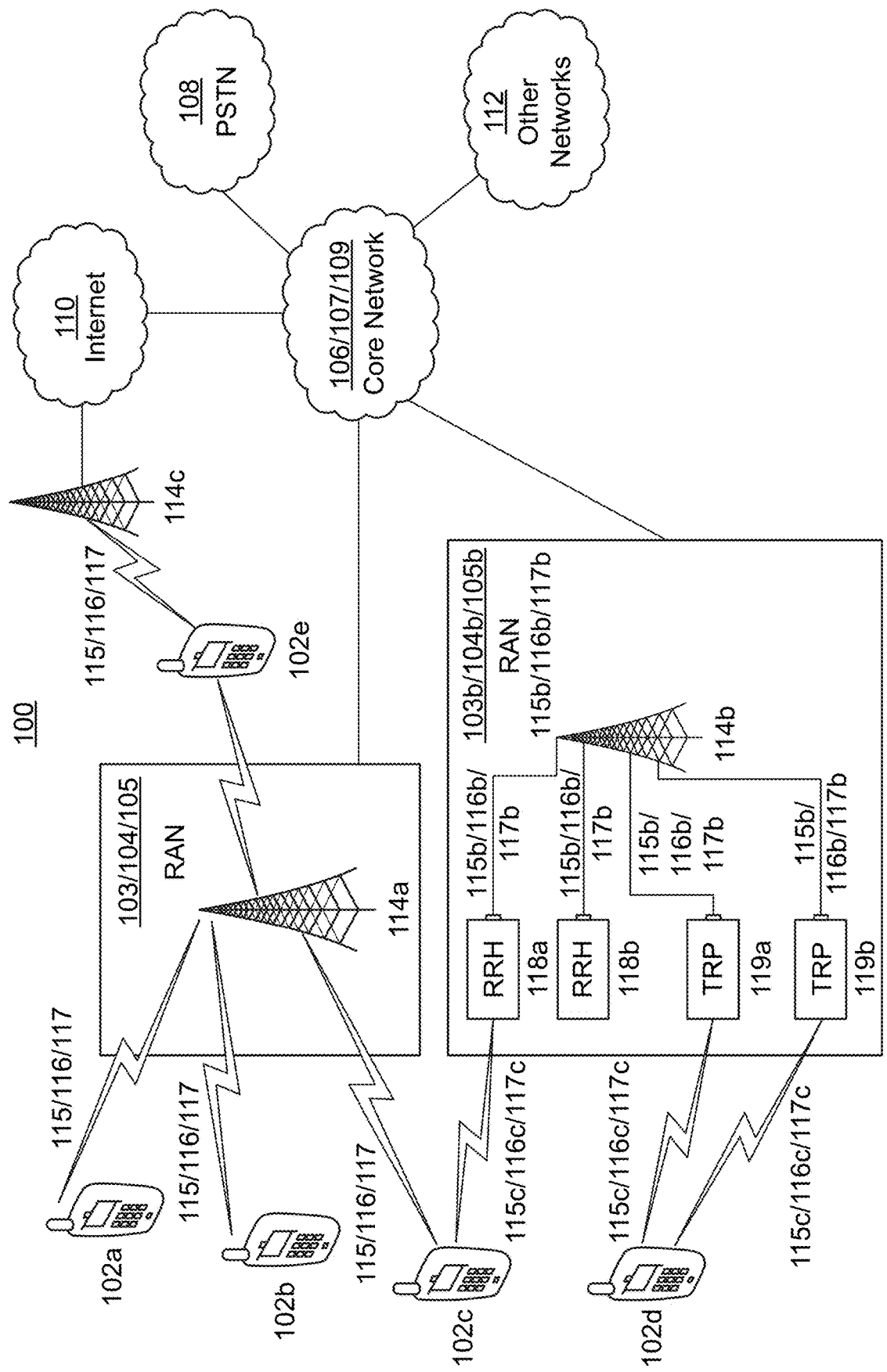
FIG. 53A illustrates one embodiment of an example communications system in which the methods and apparatuses described and claimed herein may be embodied.
Figure 53B:
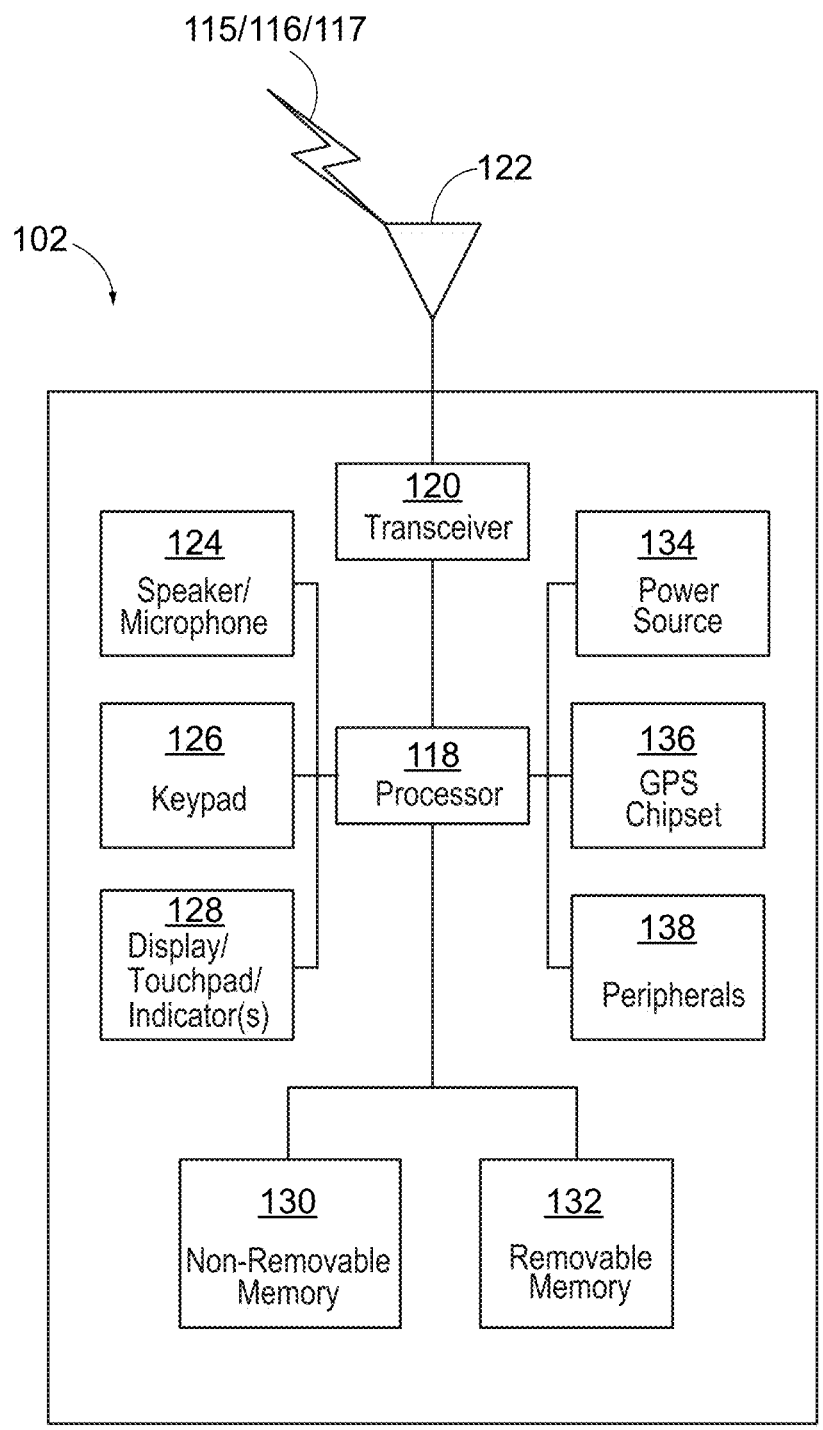
FIG. 53B is a block diagram of an example apparatus or device configured for wireless communications in accordance with the embodiments illustrated herein.
Figure 53C:
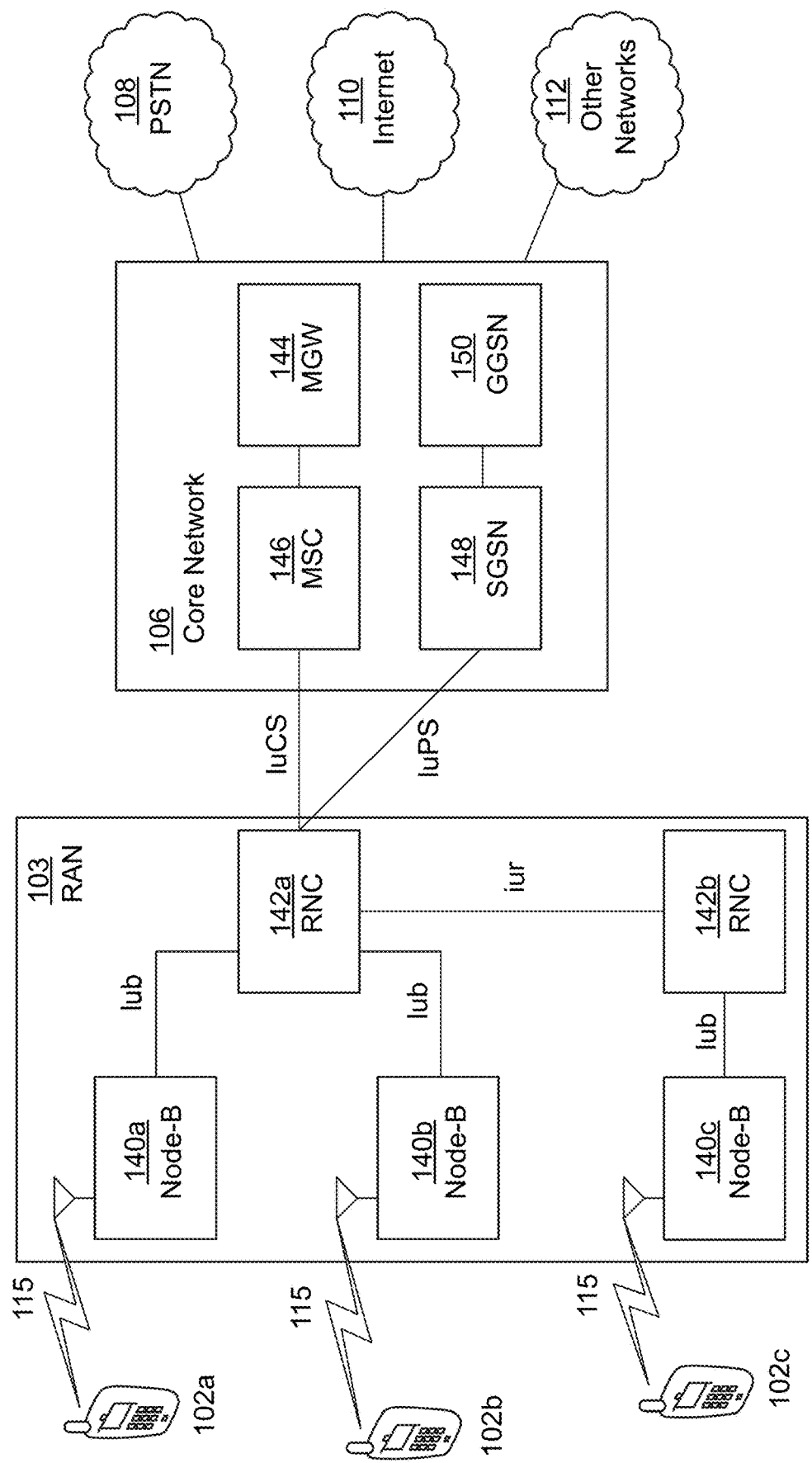
FIG. 53C is a system diagram of an example radio access network (RAN) and core network in accordance with an example embodiment.
Figure 53D:
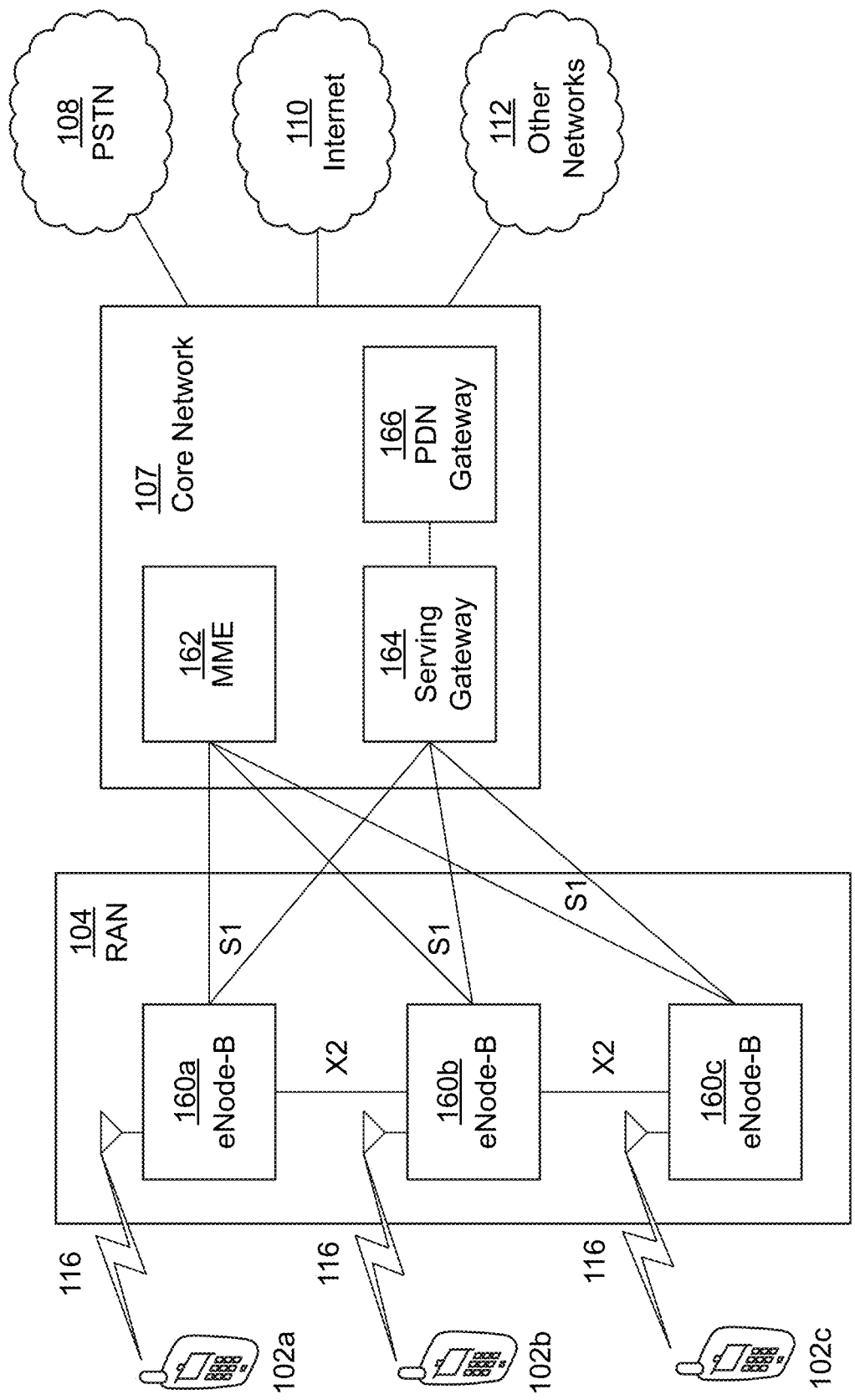
FIG. 53D is another system diagram of a RAN and core network according to another embodiment.
Figure 53E:
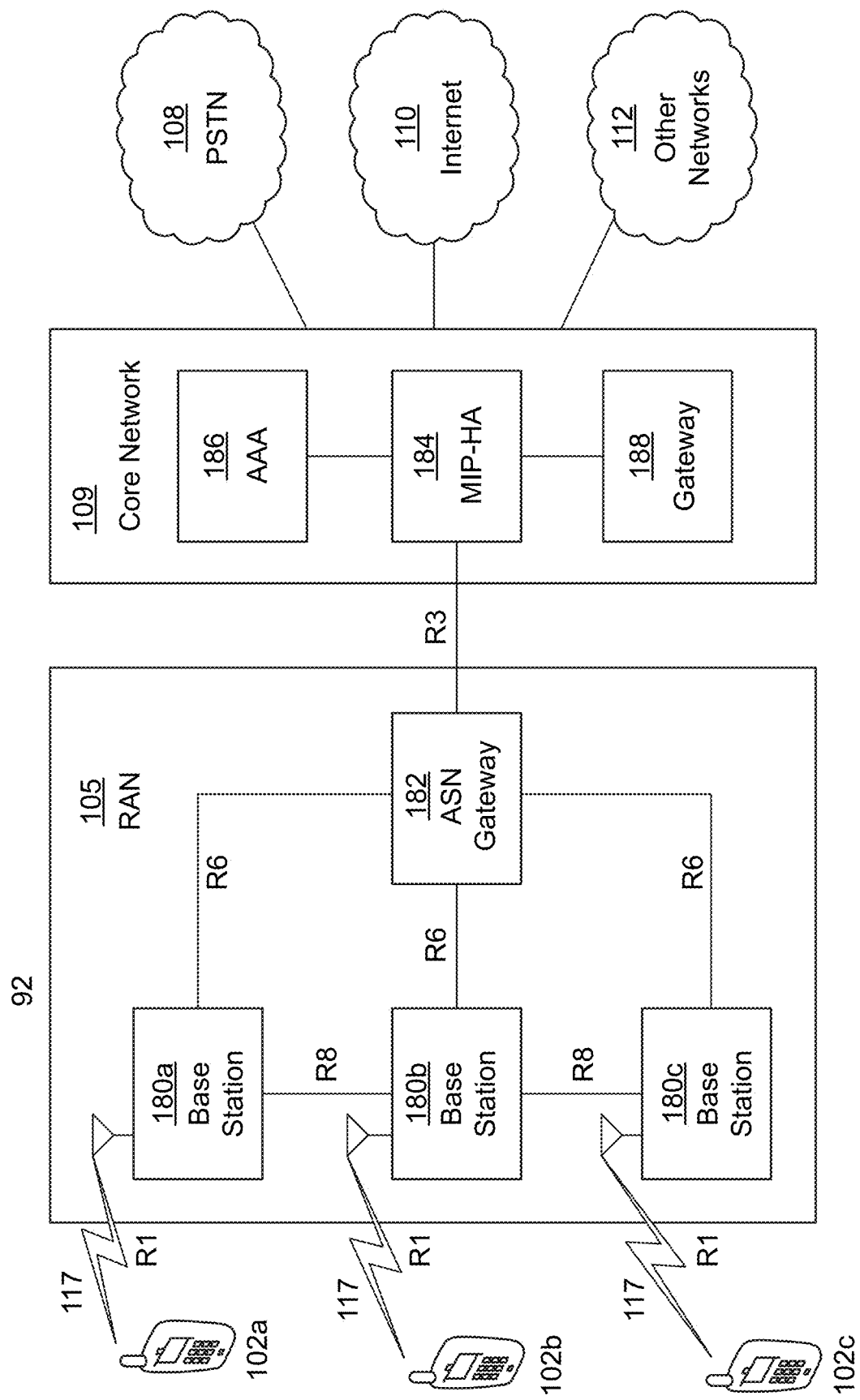
FIG. 53E is another system diagram of a RAN and core network according to another embodiment.
Figure 53F:
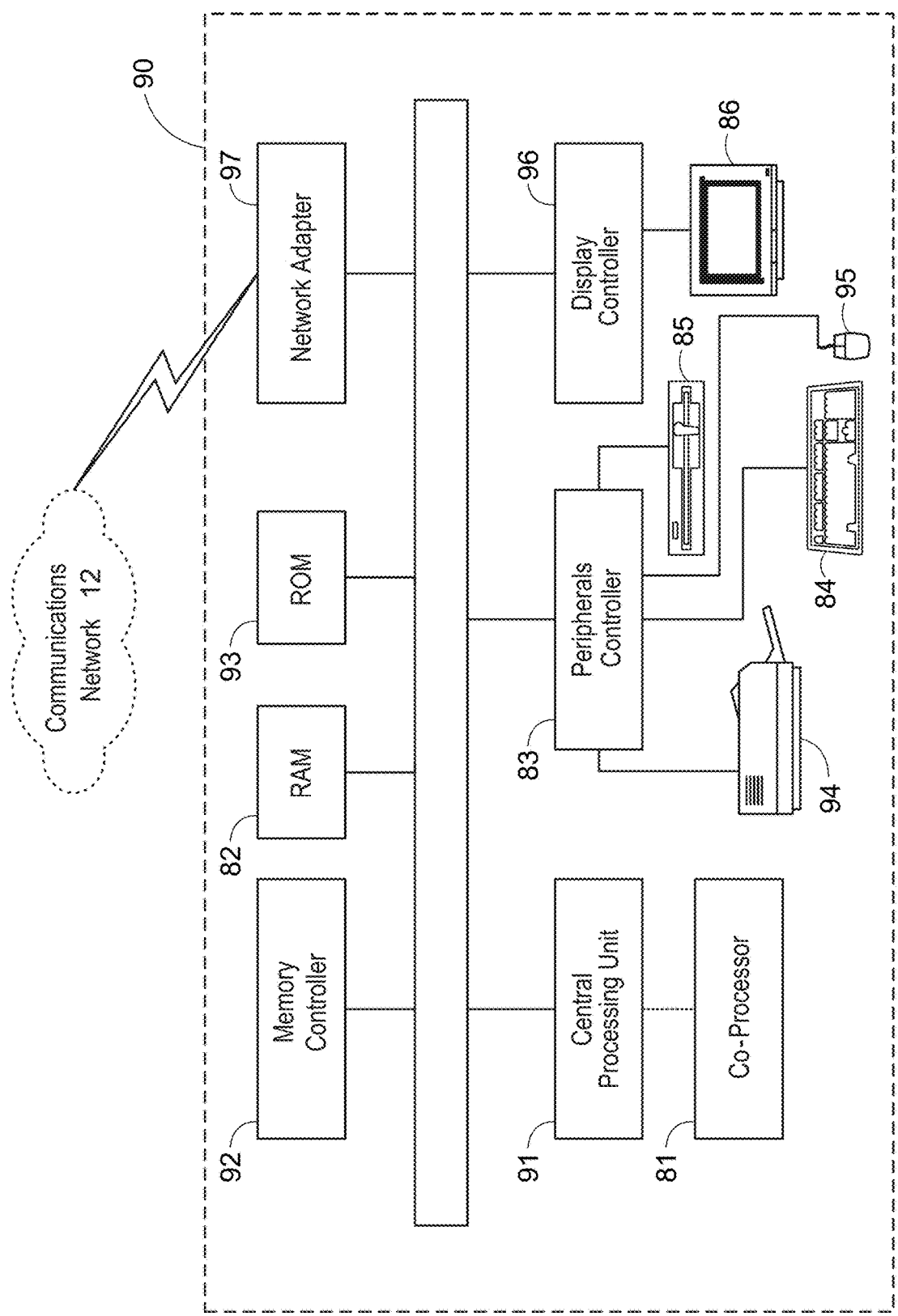
FIG. 53F is a block diagram of an exemplary computing system 90 in which one or more apparatuses of the communications networks illustrated in FIGS. 53A, 53C, 53D and 53E may be embodied.

It is understood that the entities performing the steps illustrated in FIGS. 18 and 19 may be logical entities that may be implemented in the form of software (i.e., computer-executable instructions) stored in a memory of, and executing on a processor of, an apparatus configured for wireless and/or network communications or a computer system such as those illustrated in FIGS. 53B and 53F. That is, the method(s) illustrated in FIGS. 18 and 19 may be implemented in the form of software (e.g., computer-executable instructions) stored in a memory of an apparatus, such as the apparatus or computer system illustrated in FIGS. 53B and 53F, which computer executable instructions, when executed by a processor of the apparatus, perform the steps illustrated in FIGS. 18 and 19. It is also understood that any transmitting and receiving steps illustrated in FIGS. 18 and 19 may be performed by communication circuitry of the apparatus under control of the processor of the apparatus and the computer-executable instructions (e.g., software) that it executes.

As described above, the configurable RS field elements may be configured statically, semi-statically, or dynamically. Also, as now described in further detail, in accordance with various embodiments, reference signal configurations may be received: in system information via a broadcast channel, via radio resource control signaling, in a medium access control (MAC) control element, or via a downlink control channel. BF-RS configurations may be predefined or pre-provisioned.

In an example, an RS configuration may be indicated by a System Information Block (SIB). In an example, the supported time scale for RS reconfiguration may be every 640 ms or longer. UEs, for instance all UEs connected to the NR-Node or TRP, may receive the system information. Thus, this method may be applicable to the static or semi-static scenarios, and to a non-UE-specific RS configuration. Example RS configuration fields, shown below, can be carried by extending the current SIB1, though it will be understood that the implementation of signaling RS configuration fields in the NR system is not limited to this example.

SystemInformationBlockType1 Message

```
-- ASN1START
SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity         OPTIONAL -- Need OR
    };
    cellSelectionInfo                  SEQUENCE {
        q-RxLevMin                         Q-RxLevMin,
        q-RxLevMinOffset                   INTEGER (1..8)       OPTIONAL -- Need
OP
    },
```

```
p-Max                    P-Max                         OPTIONAL, -- Need OP
freqBandIndicator        FreqBandIndicator,
schedulingInfoList       SchedulingInfoList,
tdd-Config               TDD-Config                    OPTIONAL, -- Cond
                                                                    TDD
si-WindowLength          ENUMERATED {
                         ms1, ms2, ms5, ms10, ms15, ms20,
                         ms40},
systemInfoValueTag       INTEGER (0..31),
......
NR-RS-Config-r1 ::=  SEQUENCE {
RSType,
NumerologyIndex,
StartTime,
TimeDuration,
StartFreq,
FreqDuration,
Periodicity,
NumBeams,
BeamPattern,
BeamReuseFactor,
......
}
```

In another example, RS configuration/reconfiguration may be performed via Radio Resource Control (RRC) signaling. The corresponding time scale supported by this example may depend on how fast the reconfiguration can be performed. In some cases, an example time scale is about 200 ms. In an example, there is one reconfiguration message per RRC connected user, unless a broadcast or a multicast approach is specified. The RRCConnectionReconfiguration-NB message is the command to modify an RRC connection. It may convey information for resource configuration (including RBs, MAC main configuration and physical channel configuration). The RS configuration fields can be carried by extending the current RRCConnectionReconfiguration-NB message as an example (example fields are shown below). However, the implementation of signaling RS configuration fields in the NR system is not limited to this example below.

RRCConnectionReconfiguration-NB Message

```
-- ASN1START
RRCConnectionReconfiguration-NB ::=      SEQUENCE {
    rrc-TransactionIdentifier            RRC-TransactionIdentifier,
    criticalExtensions                   CHOICE {
        c1                               CHOICE{
            rrcConnectionReconfiguration-r13
RRCConnectionReconfiguration-NB-r13-IEs,
            spare1 NULL
        },
        criticalExtensionsFuture         SEQUENCE { }
    }
}
RRCConnectionReconfiguration-NB-r13-IEs ::= SEQUENCE {
    dedicatedInfoNASList-r13             SEQUENCE (SIZE(1..maxDRB-NB-r13)) OF
                                             DedicatedInfoNAS
    OPTIONAL, -- Need ON
    radioResourceConfigDedicated-r13     RadioResourceConfigDedicated-NB-
    r13 OPTIONAL, -- Need ON
    fullConfig-r13                       ENUMERATED {true}
    OPTIONAL, -- Cond Reestab
    lateNonCriticalExtension             OCTET STRING
    OPTIONAL,
    nonCriticalExtension                 SEQUENCE { } OPTIONAL
}
NR-RS-Config-r1 ::=  SEQUENCE {
    RSType,
    NumerologyIndex,
    StartTime,
    TimeDuration,
    StartFreq,
    FreqDuration,
    Periodicity,
    NumBeams,
    BeamPattern,
    BeamReuseFactor,
    ......
}
-- ASN1STOP
```

In another example, a RS configuration/reconfiguration may be indicated by Medium Access Control (MAC) Control Element (CE) signaling in the MAC header, with time scale of adaptation on the order of a few tens of ms for example. The RS configuration fields can be carried by extending the current MAC CE as an example (example fields are shown below in Table 8). However, the implementation of signaling RS configuration fields in the NR system is not limited to this example.

TABLE 8

Example RS configuration fields in a MAC CE
MAC CE Field Name

MAC header
Buffer size 1
Buffer size 2
. . .
. . .
RS type 1
Numerology index 1
Start time 1
Time duration 1
Start frequency 1
Frequency duration 1
Periodicity 1
Num beams 1
Beam pattern 1
Beam reuse factor 1
. . .

In yet another example, an RS configuration/reconfiguration may be indicated via a DL control channel. This example NR-RS supports configuration/reconfiguration by physical layer design, with time scale of adaptation on the order of N time intervals (time interval is defined as x ms in the NR). The NR-RS configuration can be explicitly indicated by physical DL control channel or signal. In some cases, this example may provide the best flexibility and adaptation capability, given the support of smaller time scale for NR RS reconfiguration as compared to the above-described examples. The RS configuration fields can be carried by NR DL control channels as an example (example fields are shown below in Table 9). It will be understood, however, that the implementation of signaling RS configuration fields in the NR system is not limited to this example below.

TABLE 9

Example RS configuration fields DL control channels
DCI Field Name

MCS
PMI confirmation for precoding
. . .
RS type 1
Numerology index 1
Start time 1
Time duration 1
Start frequency 1
Frequency duration 1
Periodicity 1
Num beams 1
Beam pattern 1
Beam reuse factor 1
. . .

Turning now to configurable reference signals to support beam sweeping and beamforming training, beamforming is a mechanism that is used by a transmitter and receiver to achieve necessary link budget for subsequent communication. Beam sweeping in NR may be suitable for the transmission of common control signaling, physical broadcast channel, and RRM measurement. Here, the common control signaling may include the synchronization signals, system information for downlink, and random access channels for uplink.

With respect to conducting DL beam sweeping and beamforming training, beam sweeping may send a BF-RS with wider transmit beams or narrower transmit beams. For example, if wider beams are used for beam sweeping, then beamforming training may form narrower beams and send the BF-RS with a subset of narrower beams (e.g., the narrower beams within the region of the wider beam for beam sweeping may be a good candidate of subset beams) to further train/refine the narrower beams for data transmissions. Subsets of beams may be adjusted/reconfigured based on movement of the UE. In an example, if narrower beams are used for beam sweeping, then beamforming training may be used for beam pair alignment and adjustment for data transmissions.

In an example in which beam sweeping sends the BF-RS with narrower transmit beams, the NR-Node or TRP may sweep through the transmit beams or choose a subset of beams. For example, assuming there are 36 transmit beams (beams 1-36), then for beam sweeping, the NR-Node or TRP may choose beams ID with 1+k*m, where k is configurable and m=0, 1, 2, 3, . . . , (36/k)−1. In an example in which a subset of narrower beams are used for beam sweeping, then beamforming training may be conducted to sweep through the beams adjacent to the best sweeping beam. For example, if beam 4 is the best transmit sweeping beam, the beams 2-6 or 3-5 may be used for beamforming training.

In an example, the receiver/UE beam sweeping is optional/configurable, and it may use quasi-omni-directional beams or wider beams for receiver beam sweeping/training. In an example in which quasi-omni-directional beams are used as receiver beams, the sweeping cycle time may be reduced. During beamforming training, a subset of wider beams or narrower beams may be used to choose the best receiver beam for data transmissions. In an example in which wider beams are used as receiver beams, during beam training, a subset of wider beams may be used for further beam alignment or a subset of narrower beams may be used for beamforming training. In an example in which narrower beams are used as receiver beams, during beamforming training, a subset of narrower beams may be used for further beam alignment. Alternatively, the beamforming training may be skipped.

With respect to UL beam sweeping and beam training, in light of channel reciprocity in TDD systems, it is recognized herein that UL beam sweeping and beamforming training may be skipped or simplified to reduce the resource overhead, in some cases. In some cases, in can be assumed that the NR-Node or TRP has the same transmit and receive beams, and the same assumption can be made for respective UEs. In FDD systems, the UL beam sweeping and beamforming training may be optional. When beam sweeping and beamforming training are in an ON mode, based on the DL beam sweeping procedure results, the UL beam sweeping might not need to do full beam sweeping using all beams. In another example, the UL beam sweeping can perform whole coverage beam sweeping.

Beam sweeping may send the BF-RS with wider transmit beams or narrower transmit beams. In an example in which wider beams are used for beam sweeping, then beamforming training may form narrower beams and sweep through a subset of the narrower beams to further train the narrower beams for data transmission. If narrower beams are used for beam sweeping, then beamforming training procedure is mainly for beam alignment for data transmissions. If beam sweeping uses narrower transmit beams, a given UE may sweep through all the transmit beams or choose a subset of beams. For example, assuming there are 16 transmit beams (Beams 1-16), then for beam sweeping, the NR-Node or TRP may choose beams ID with 1+k*m, where k is configurable and m=1, 2, 3, . . . , (16/k)−1. If a subset of narrower beams is used for beam sweeping, then beamforming training may be conducted to sweep through the beams adjacent to the best sweeping beam. For example, if beam 4 is the best transmit sweeping beam, the beams 2-6 or 3-5 may be used for beam training. The receiver/NR-Node or TRP beam sweeping may be optional, and it may use quasi-omni-directional beams or wider beams or narrower beams for receiver beam sweeping. If quasi-omni-directional beams are used as receiver beams, the sweeping cycle time may be reduced. During beamforming training, a subset of wider beams or narrower beams may be used to choose the best receiver beam for data transmissions. If wider beams are used as receiver beams, during beamforming training, a subset of wider beams may be used to further beam alignment, or a subset of narrower beams may be used to further beamforming training. If narrower beams are used as receiver beams, during beamforming training, a subset of narrower beams may be used for further beam alignment, or the beamforming training may be skipped.

Figure 20:
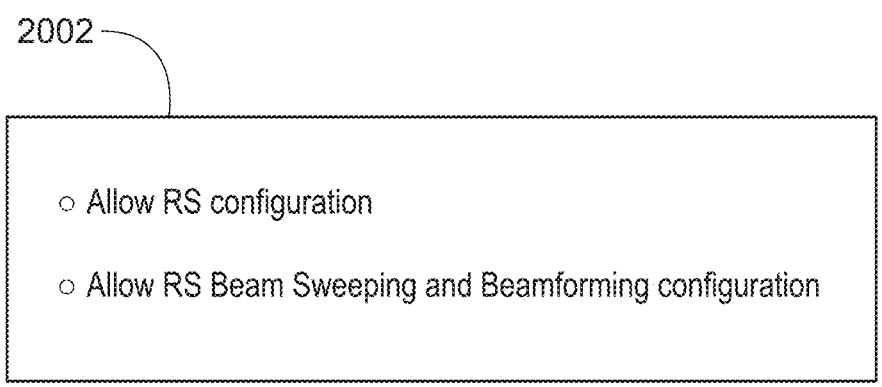
FIG. 20 is a diagram of an example Graphical User Interface (GUI) in accordance with an example embodiment.

Interfaces, such as Graphical User Interfaces (GUIs), can be used to assist users to control and/or configure functionalities related to configurable reference signals described herein. FIG. 20 is a diagram that illustrates an interface 2002 that enables a user to permit (or disallow) RS configuration. The interface 2002 also enables a user to permit (or disallow) RS Beam Sweeping and Beamforming configurations. It will be understood that interface 2002 can be rendered using displays such as those shown in FIGS. 53B and 53F described below. Further, it will be understood that the interface 2002 can vary as desired.

Figure 21:
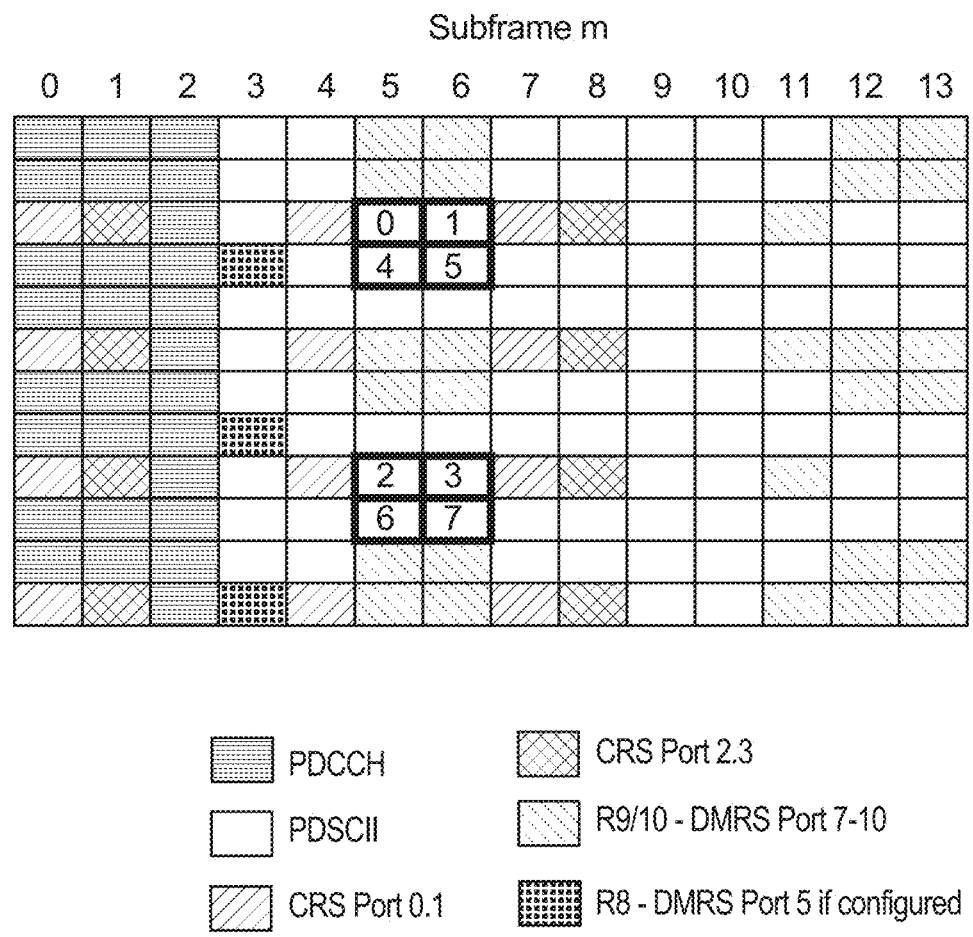
FIG. 21 depicts an example CSI-RS allocation per subframe.

Turning now to CSI-RS designs in particular for 3D MIMO, in the current 3GPP system, a given user equipment (UE) performs the downlink (DL) channel quality estimation using the CSI-RS transmitted from the base station. In LTE, an antenna port is defined in conjunction with a reference signal. Up to release 12, each CSI-RS port is assigned to one antenna element and the system can support up to 8 antenna ports as shown in the boxes numbered 0-7 in FIG. 21.

Because reference signals are assigned in an orthogonal manner, with a straightforward approach, it is recognized herein that CSI-RS overhead will grow linearly with the number of antenna ports to control the quantization error. With respect to NR systems that may include a massive number of antennas, the antenna ports may include more than 16 ports. For example, there may be 32, 64, 128, 256, etc. ports. Accordingly, it is recognized herein that the CSI-RS overhead/density may be very large. To illustrate, by way of example, with respect to the straightforward approach (orthogonal approach using current 4G numerology), one CSI-RS port is assigned to one antenna element. If the number of transmit antennas is 64, then approximately 48% of resource element (RE) resources may be used per the resource block (RB) that transmits the CSI-RS symbols, as illustrated in table 10. Using normalization, 9.6% of DL RE resources on average may be used for CSI-RS, which is a large overhead for the system. Therefore, it is recognized herein that this straightforward approach might not be practical in 5G (NR) systems, particularly in view of a potentially massive number of antennas used at the base station.

With respect to a KP-based CSI-RS scheme, if the number of transmit antennas is 64, then approximately 11.5% of RE resources will be used per the RB that transmits the CSI-RS symbols, as illustrated in Table 10. By normalization, 2.3% of DL RE resources on average will be used for CSI-RS. It is also recognized herein that as the number of transmit antennas in 5G systems increase, the RS overhead may increase.

With respect to an example beamformed approach to CSI-RS, if the number of transmit antennas is 64, then approximately 36.4% of RE resources will be used per the RB that transmits the CSI-RS symbols, as illustrated in table 10. Using normalization, 7.3% of DL RE resources on average will be used for CSI-RS. As the number of transmit antennas in 5G systems increase, it is recognized herein that the RS overhead may increase, which may create problems for 5G 3D MIMO systems, among others.

As the analysis above and in table 10 indicates, the CSI-RS overhead may be large and unacceptable with massive 3D MIMO deployed in a system such as a NR system illustrated in FIGS. 5 and 6. As described above, the CSI-RS may take out the DL resources for the data transmission (particularly for the beamformed CSI-RS approach), which may lead to a substantial loss in the maximum data throughput. Thus, systems may fail to meet eMBB data rate and density requirements, among others.

Embodiments described herein provide an enhanced and more efficient design for CSI-RS as compared to current approaches. For example, good channel estimation can be achieved while keeping the CSI-RS overhead and density reasonably low, which may be desired in 5G systems (among others) in which a large number of antenna ports might be used.

TABLE 10

CSI-RS Overhead Calculation Summary

| CSI-RS scheme | $N_h$ | $N_v$ | # of Beams | # of CSI-RS REs per RB | Total available REs per RB | CSI-RS Overhead Rate | Normalized Overhead Rate (5 ms periodicity) |
|---|---|---|---|---|---|---|---|
| Orthogonal scheme | 8 | 8 | None | 64 | 132 | 48% | 9.6% |
| KP-based scheme | 8 | 8 | None | 15 | 132 | 11.5% | 2.3% |
| Beamformed scheme | 8 | 8 | 6 | 48 | 132 | 36.4% | 7.3% |

It is recognized herein that as the number of transmit antennas in systems (e.g., 5G systems) increase, the reference signal (RS) overhead may increase to unacceptable levels. Embodiments described herein provide an enhanced and more efficient design for Channel State Information Reference Signals (CSI-RS) as compared to current approaches.

For example, in one embodiment, as described in detail below, CSI-RS ports are reused for non-adjacent 3D beams in a fixed 3D beam system. A fixed 3D beam system can refer to a system in which: (1) each 3D beam direction is semi-persistently or persistently fixed; and (2) each fixed 3D beam does not emit to the same direction. In an example, fixed 3D beams are configured to optimize a radio access network's operations and resource allocations. In some cases, or each 3D beam, one CSI-RS port is assigned to the transmit antenna elements in one column. The CSI-RS symbols transmitted on the transmit antenna elements in one column can be precoded with a weighting vector forming the desired 3D beam. In some cases, each horizontal antenna may use one antenna port and one CSI-RS RE. Further, in some cases, each 3D beam may use all $N_h$ horizontal antenna ports and use $N_h$ REs per RB that transmits the CSI-RS symbols. Thus, based on the above, the CSI-RS ports/REs can be reused by non-adjacent 3D beams in accordance with an example embodiment. The UE may select an optimal 3D beam as, for example, the one with the maximum CQI. The UE may report the selected 3D beam to an eNB, such as by using CQI and/or PMI and RI.

Thus, in accordance with an example embodiment, a given fixed 3D beam system can maximize the reuse rate for the CSI-RS ports of at least some, for instance all, of the non-adjacent beams, which will reduce the beamformed CSI-RS overhead. This may apply to various uses cases, such as the high data rate eMBB described above, as applied to stationary or nomadic scenarios (e.g., offices, apartment buildings).

In accordance with another embodiment, as described in detail below, CSI-RS ports are reused for non-adjacent 3D beam spots in a dynamic beam spot system. A dynamic 3D beam system can refer to a system in which: (1) each 3D beam direction is dynamic and irregular; and (2) each dynamic 3D beam does not emit to the same direction. With respect to irregular and dynamic 3D beams, beam spots can be defined based on the UEs' geographical location information (e.g., see spots (S)1, S2, S3, etc. in FIG. 27). A beam spot refers to the service area wherein one or more beams cover.

In some cases, uplink (UL) sounding reference signal (SRS) information is read and full channel reciprocity (e.g., for TDD systems) or partial channel reciprocity (e.g., for FDD systems) is used for DL channel estimation (e.g., Angle of Departure (AoD), Angle or Arrival (AoA) per UE). Based on the aforementioned information, an eNB can assign one or more 3D beams per beam spot. Each beam spot may have its own CSI-RS configuration based on the chosen 3D beam(s). For non-adjacent beam spots, in accordance with an embodiment, the same CSI-RS ports/REs may be reused for reference signaling. Thus, in some cases, in the CSI feedback report, the UEs might not need to report the beam index to the eNB because the beam spots have already been formed based on the SRS information at the eNB.

Thus, in accordance with the aforementioned embodiment, a dynamic 3D beam system may reuse the CSI-RS ports of all the non-adjacent beam spots, which will greatly reduce the beamformed CSI-RS overhead with massive antennas in NR cellular systems.

Figure 22:
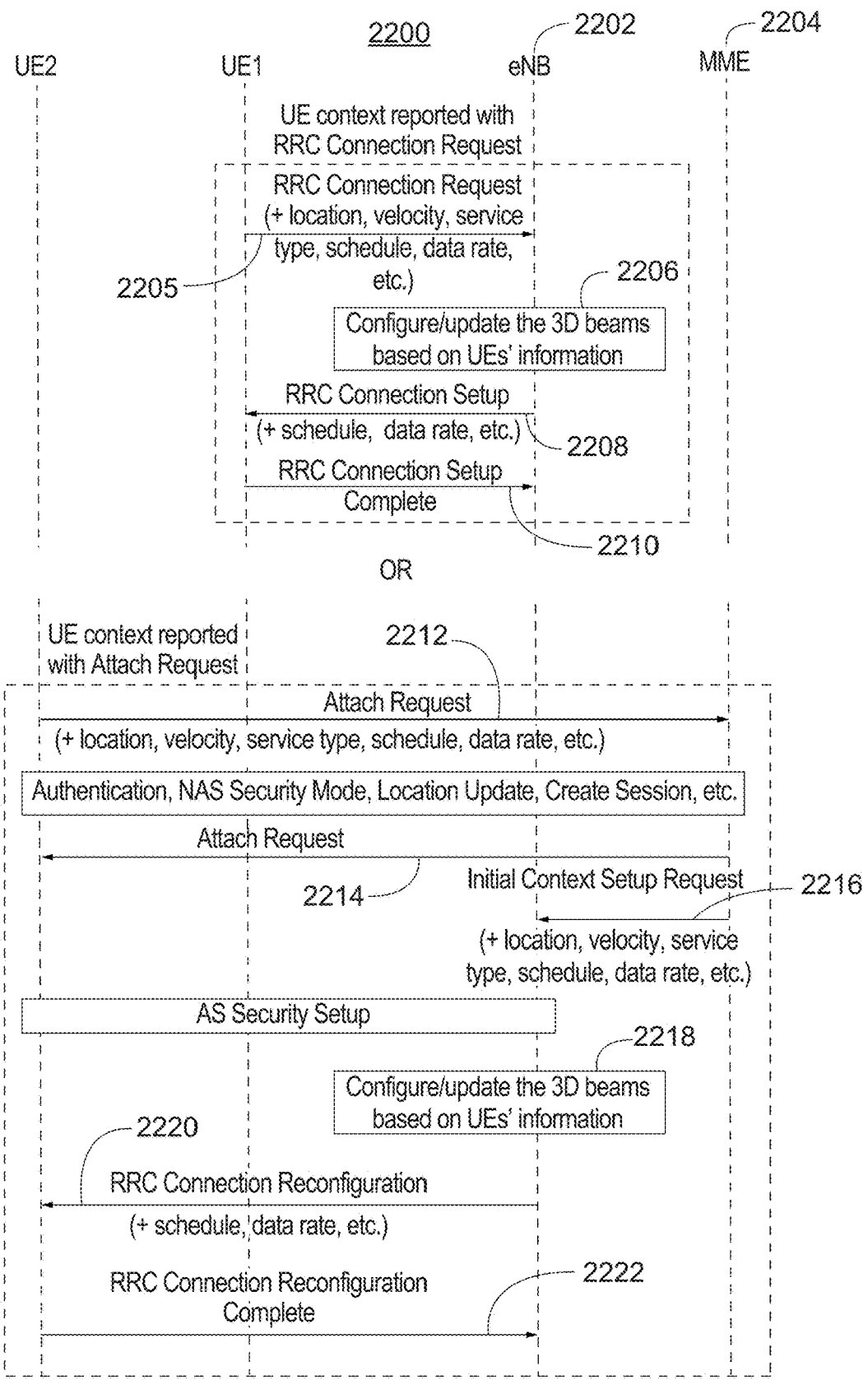
FIG. 22 is a call flow that shows an example fixed beam forming using context associated with a user equipment (UE) in accordance with an example embodiment.
Figure 23:
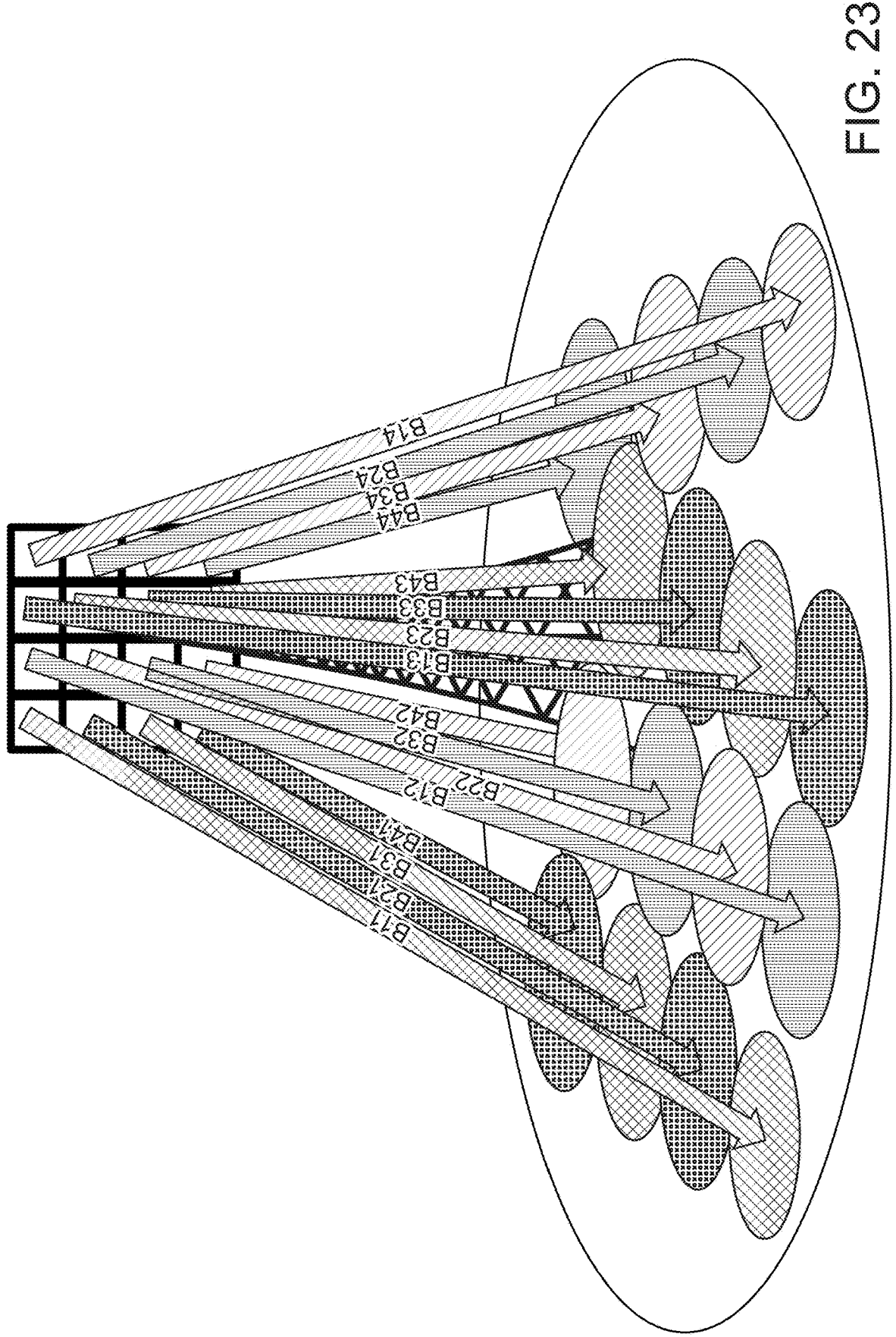
FIG. 23 shows an example of non-adjacent 3D beams that can be formed by the call flow of FIG. 22.

Referring now to FIG. 22, in accordance with an example embodiment, CSI-RS Port Reuse may be implemented in a fixed 3D beam system, such as a system 2200 illustrated in FIGS. 22 and 23. As shown in FIG. 22, the example system 2200 includes an eNB 2202, a MME 2204, and a plurality of UEs, in particular UE1 and UE2. It will be appreciated that the example system 2200 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 22, and all such embodiments are contemplated as within the scope of the present disclosure. It will further be appreciated that reference numbers may be repeated in various figures to indicate the same or similar features in the figures.

In some cases, context information, for example, velocity, service type, schedule, data rate, etc., which is associated with a UE, may be used for configuring the fixed 3D beams (shown in FIG. 23) to optimize a radio access network's operations and resource allocations. As shown in FIG. 22, at 2205, a UE (UE1) may add context information through a radio connection request to the eNB 2202. For example, a Radio Resource Control (RRC) Connection may be used to report the context information to the eNB 2202. Alternatively, as shown at 2212, a UE (UE2) may add context information through a network connection request to the Mobility Management Entity (MME) 2202. The eNB 2202 may also include the agreed-upon parameters, such as schedule or data rate, via its RRC Connection Setup to the UE1, at 2208. Based on the context information that is received from the UE1, the radio access network, for instance the eNB 2202, may configure its 3D beams (at 2206). In accordance with the illustrated example, the UE1 sends an RRC Connection Setup Complete message at 2210.

With continuing reference to FIG. 23, in accordance with the alternative example, the MME 2204 sends an Attach Accept message to the UE2, at 2214. At 2216, the MME 2204 sends the UE context information to the eNB 2202. At 2218, based on the context information that is received from the UE2, the radio access network, for instance the eNB 2202, may configure its 3D beams. The eNB 2202 may also include the agreed-upon parameters, such as schedule or data rate, via its RRC Connection Reconfiguration message to the UE2, at 2210. In response, at 2222, the UE2 sends an RRC Connection Reconfiguration Complete message to the eNB 2202.

Figure 24:
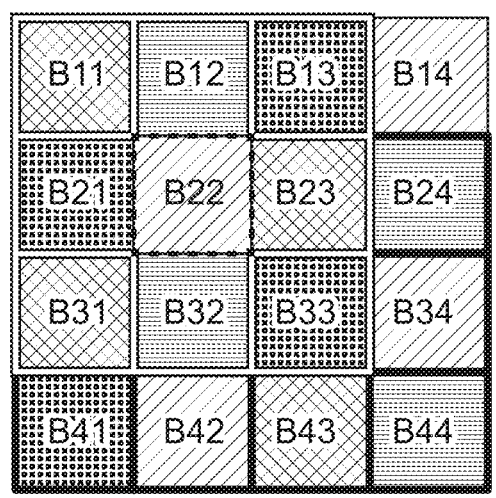
FIG. 24 is a 2D grid table of the non-adjacent 3D beams shown in FIG. 23.

In NR, it is recognized herein that a large number of beamformed CSI-RS may be targeted for energy-efficient small areas, as shown in FIG. 23 that depicts fixed 3D beams. Referring to FIG. 23, beams B21, B41, B13, and B33 are non-adjacent beams with respect one another; beams B11, B31, B23, and B43 are non-adjacent beams with respect to one another; beams B12, B32, B24, and B44 are non-adjacent beams with respect to one another; and beams B22, B42, B14, B34 are non-adjacent beams with respect to one another. In an example, these non-adjacent beams can reuse the same CSI-RS ports/REs per RB that transmits CSI-RS symbols. In some cases, the total power may be equally shared by the overlapping CSI-RS symbols per RE. FIG. 24 is a two-dimensional grid that depicts the grouping of the beams of FIG. 23. As shown, beams that are next to each other define adjacent beams. For example, beam B22 has adjacent beams of B11, B12, B13, B21, B23, B31, B32, and B33. As described above, two beams that have another beam in between them define non-adjacent beams with respect to each other. For example, beams B11 and B31 are non-adjacent beams with respect to each other, and beams B21 and B13 are non-adjacent beams with respect to each other.

In an example, adjacent beams, for instance all adjacent beams that form CSI-RS reuse groups use different CSI-RS ports for CSI-RS signaling. Non-adjacent beams, which are spaced apart from each other, can use the same CSI-RS ports for CSI-RS signaling, to reduce the CSI-RS overhead. FIG. 24 depicts one example reuse pattern, though it will be understood that more or less beams may be used as desired.

Figure 25:
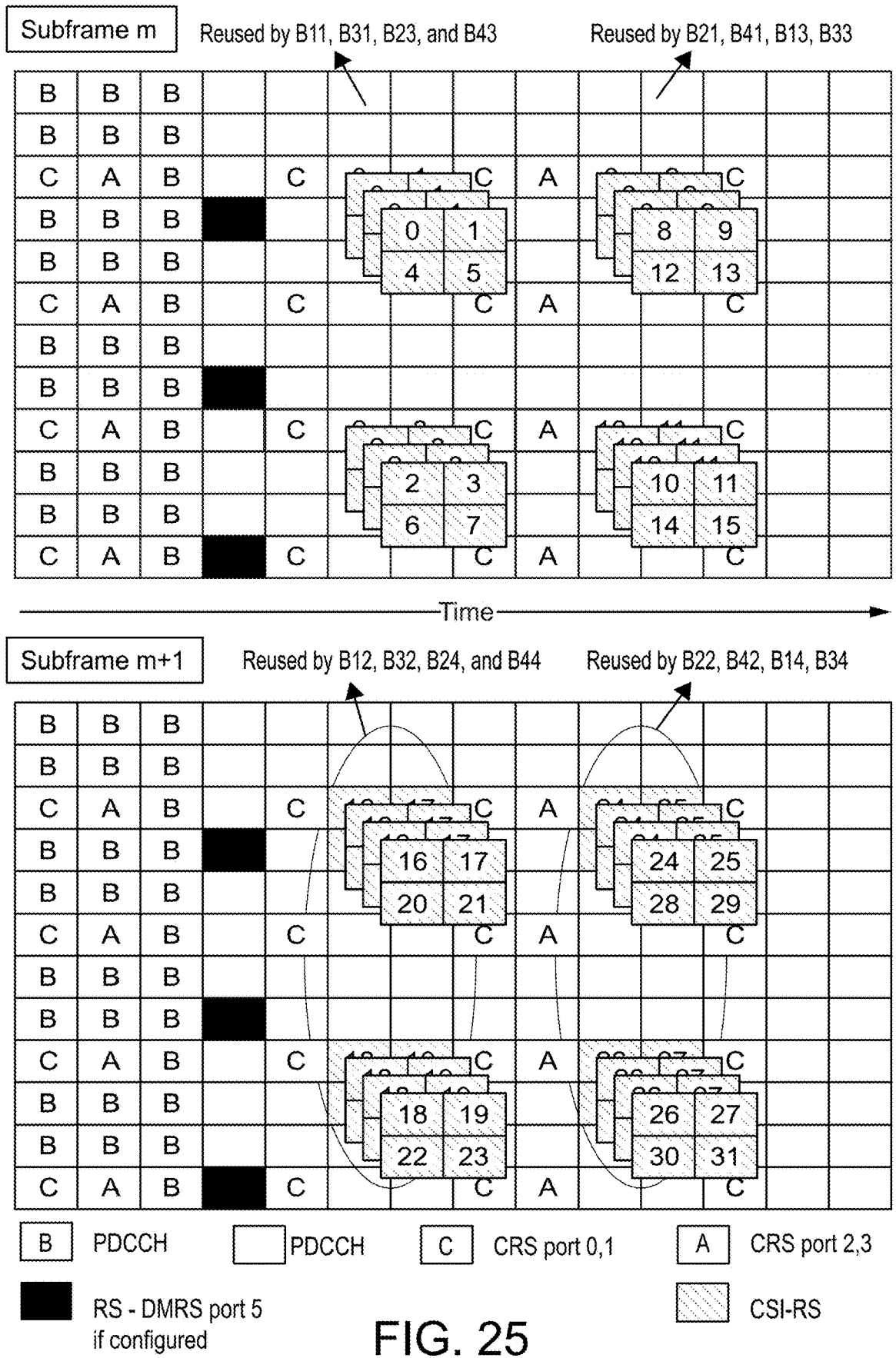
FIG. 25 shows an example of CSI-RS port reuse resource allocation that is time division based in accordance with an example embodiment.
Figure 26:
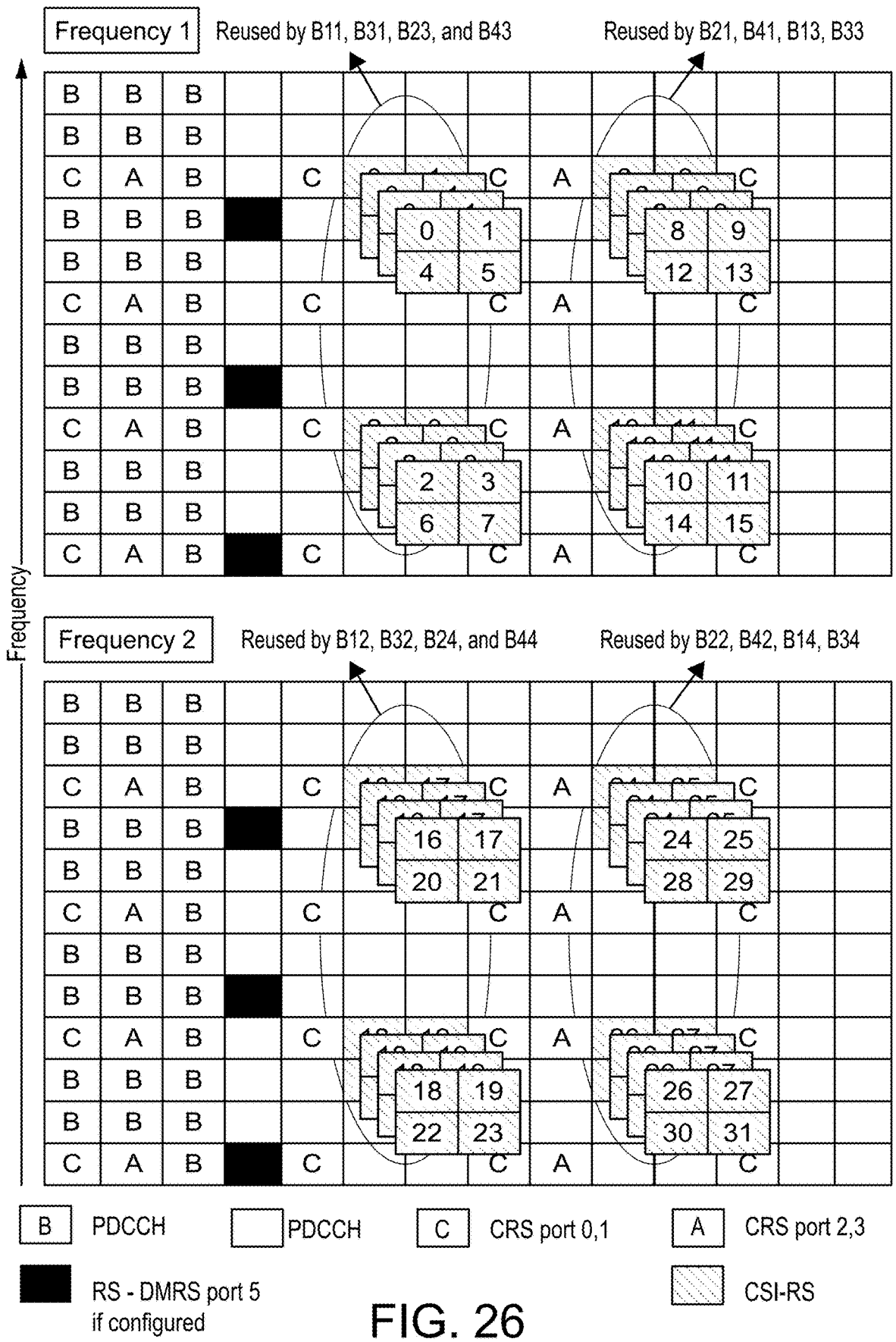
FIG. 26 shows an example of CSI-RS port reuse resource allocation that is frequency division based in accordance with an example embodiment.

By way of example, assume there are 8 horizontal antenna ports, the RB diagram in FIG. 25 shows an example of how to reuse and allocate the CSI-RS ports/REs for non-adjacent beams per RB. As shown, 8 horizontal antenna ports are used per beam. In accordance with the illustrated embodiment, non-adjacent beams (e.g., group 1: B11, B31, B23 and B43) are all reusing the same 8 CSI-RS REs, which are showing as four overlapping instances in FIG. 25, to efficiently enhance the current CSI-RS design to reduce the CSI-RS overhead. Similarly, the other non-adjacent beam groups: (B21, B41, B13, B33); (B12, B32, B24, B44); and (B22, B42, B14, B34), may reuse the same 8 CSE-RS Res. Note that FIG. 25 assumes that a total of 16 CSI-RS ports are used for subframe m and the next 16 CSI-RS ports are allocated in the next subframe, which is a time division based allocation approach. FIG. 26 shows a frequency division based CSI-RS allocation approach, in which the first 16 CSI-RS ports are allocated in sub-frequency 1 and the next 16 CSI-RS ports are allocated in sub-frequency 2. It will be appreciated that other allocation methods (e.g. aggregating all 32 ports in the same subframe) may be utilized as desired.

It is recognized herein that, in some cases, no matter how large the antenna array grows for NR MIMO systems, the number of non-adjacent beam groups will not increase above 4 groups, which means that the number of REs used for transmitting CSI-RS will not increase with the number of antenna beams. It is further recognized herein that the number of beams in each group may increase as the number of 3D beams grows, but that may only affect the number of overlapping port instances per RE. Therefore, by using the CSI-RS design described above, the CSI-RS ports/REs may be reused at a maximum rate in the most efficient way, thereby limiting CSI-RS overhead.

Figure 27:
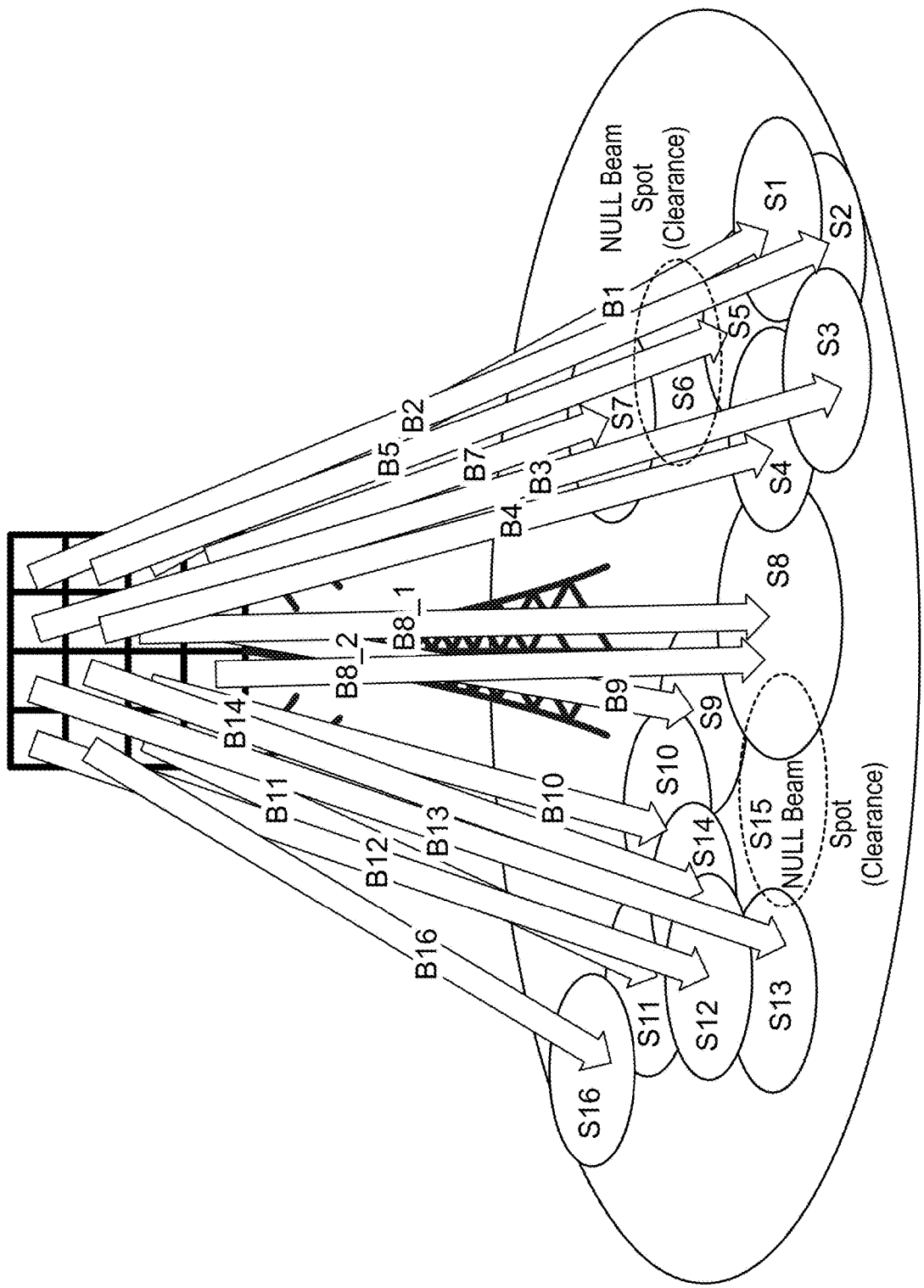
FIG. 27 is an example of non-adjacent (dynamic) 3D beam spots that can be formed in accordance with an example embodiment.

Turning now to CSI-RS Port Reuse for a Dynamic 3D Beam Spot System, FIG. 27 depicts an example of dynamic 3D beam spots. As used herein, a beam spot refers to a service coverage area under one or more beams (most are under one beam as shown in FIG. 27) and the beam spot areas may overlap. As shown, beams B16, B10, B7, and B5 are non-adjacent with respect to one another; beams B11 and B1 are non-adjacent with respect to one another; beams B13, B9, and B4 are non-adjacent with respect to one another; beams B12 and B3 are non-adjacent with respect to one another; and beams B14 and B2 are non-adjacent with respect to one another. The non-adjacent beams can reuse the same CSI-RS ports/REs per RB that transmits CSI-RS symbols.

FIG. 27 also includes NULL beam spots S15 and S6. NULL beam spots refers to imagined beam spots which do not physically exist. That is, no UEs need service in that spot area and no CSI-RS ports need to be transmitted to create the beam spots. Adjacent beam spots refer to beam spots that are next to each other. Adjacent beam spots may include overlapping coverage area with one another. As shown, beam spots S1, S2, S3, S4 and S5 are examples of adjacent beam spots. Non-adjacent beam spots refer to two or more beam spots that have another beam spot or a NULL beam spot in between one another. As shown in FIG. 27, beams spots S2 and S8 are non-adjacent beam spots with respect to each other, and S5 and S7 are non-adjacent beam spots with respect to each other.

Figure 28:
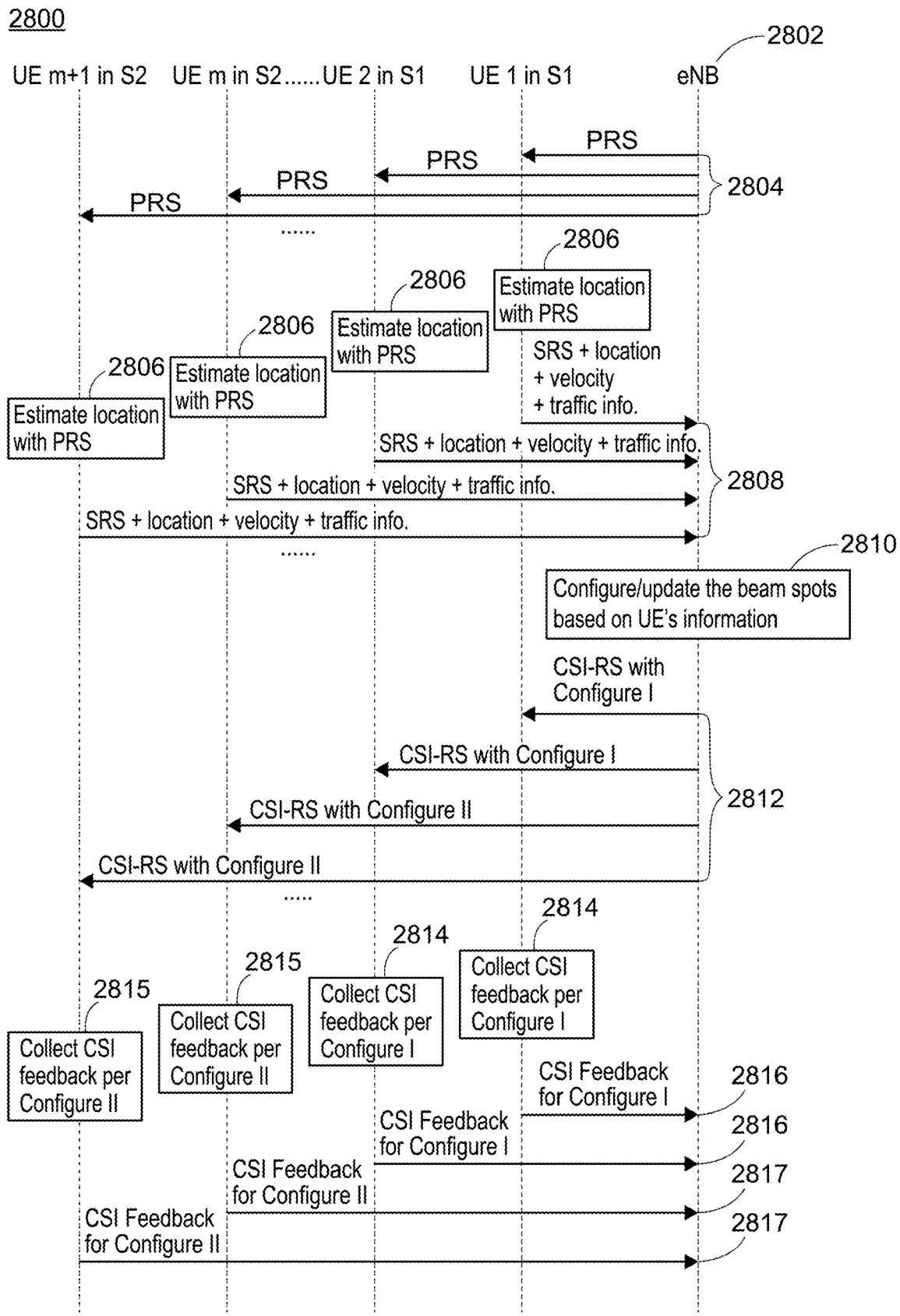
FIG. 28 is a call flow that illustrates an example of beam spot allocation that can form the beam spots illustrated in FIG. 27.

Referring also to FIG. 28, an example system 2800 includes an eNB 2802 and a plurality of UEs, in particular a UE1 in beam spot S1, a UE2 in beam spot S1, a UEm in beam spot S2, and a UEm+1 in beam spot S2. As shown, to form the beam spots in a cell with irregular and dynamic 3D beams, the terminals (e.g., UEs in FIG. 28) may report their geographical location information to the NR node or TRP (e.g., eNB 2802) periodically. It will be appreciated that the example system 2800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 27 and 28, and all such embodiments are contemplated as within the scope of the present disclosure. For example, the illustrated eNB 2802, and generally any eNB referred to herein, may be implemented alternatively by an eNB-like entity (e.g., NR node, TRP, RRH, etc.), an apparatus that is part of a radio access network, or the like.

Still referring to FIG. 28, in accordance with the illustrated example, at 2804, the eNB 2802 sends a positioning reference signal (PRS) to each of the UEs. At 2806, each UE estimates its location using the PRS. In some cases, as shown at 2806, the UEs can use the DL RS to report their location information. The PRS can support the use of terminal measurements on multiple NR cells to estimate the geographical location of the terminal. It will be understood that location information of a UE can be obtained by the eNB 2802 as desired. For example, location information can be obtained using GPS (by a UE) or UL control channels or signaling. Thus, the illustrated PRS message is used as an example, and is not limiting. In addition, other context information associated with a given UE, such as user type (e.g., static or mobile), velocity (x km/h), traffic/service type (e.g., video conferencing, gaming/entertainment, web browsing), traffic/service scheduling (e.g., day time traffic, night time), etc., may be piggybacked in the UL messages to help 3D beam formation and reference signal and data scheduling at the eNB 2802.

Based on the information associated with the UEs, at 2810, the eNB 2802 can define the spot areas as illustrated in FIG. 27. In some cases, if no terminals are measured in a spot area, such as S6 and S15 in FIG. 27, that area is defined as a NULL beam spot. To illustrate, as shown in the example of FIG. 27, most of the beam spot areas are covered by one beam, such as S1 and S2; some are covered by more than one beam, such as S8; and some do not need coverage, such as S6. After the spot areas are defined, then eNB may use full channel reciprocity feature (e.g., for TDD systems) or partial channel reciprocity (e.g., for FDD systems) to read UL SRS information for DL channel estimation. Based on the above information, the eNB can get full or partial channel information for a DL channel (e.g., Angle of Departure (AoD) and Angle or Arrival (AoA)) per UE. In an example, the eNB performs joint elevation and azimuth beamforming per beam spot. The eNB can assign one or more 3D beams per beam spot. Each beam spot may have its own CSI-RS configuration based on the chosen 3D beam(s).

Continuing with the example, for non-adjacent beam spots, the same CSI-RS ports/REs can be reused for sending reference signals at 2812. In an example, adjacent beam spots, for instance all adjacent beam spots, use different CSI-RS ports for sending reference signals 2812. Further, non-adjacent beam spots can use the same spots for sending reference signals, as shown in FIG. 27. In some cases, regarding the CSI feedback reports collected at 2814 and 2815 and sent to the eNB 2802 at 2816 and 2817, the UEs do not need to report the beam index to the eNB 2802 because the beam spots have already been formed based on the RPS and SRS information at the eNB 2802. It is recognized herein that the beam index field exists in the current beamformed CSI-RS scheme, and the CSI feedback overhead for NR MIMO systems can be reduced.

Thus, as described above, an apparatus can obtain context information corresponding to one or more terminals. Based on the context information, the apparatus can define spot areas for covering by one or more 3D beams. The apparatus can assign one or more 3D beams to respective spot areas. Based on the assignment of the one or more 3D beams, the apparatus can identify 3D beams that are non-adjacent with respect to one other, and the apparatus can send the 3D beams that are identified as non-adjacent to one another to the respective spot areas via the same antenna port. More than one group of 3D beams may be identified, wherein each group is comprised of 3D beams that are non-adjacent to one another, and each 3D beam within a group is sent to respective spot areas via the same antenna port. Further, based on the context information, the apparatus can define at least one null spot area within which no terminal is present, and the apparatus can assign no beam to the null spot area. In one example, based on the assignment of the one or more 3D beams, the apparatus identifies 3D beams that are adjacent to one another, and sends the 3D beams that are identified as adjacent to each other via different antenna ports. The apparatus may obtain context information corresponding to one or more terminals by periodically receiving geographic data from the one or more terminals. The geographic data may be indicative of a physical location of the respective terminal, such that the one or more 3D beams are assigned to respective spot areas that correspond to the respective physical locations of the one or more terminals. Thus, the at least one null spot area within which no terminal is present can be defined based on the geographic data, and accordingly, no beam might be assigned to the null spot area. The 3D beams may comprise Channel State Information Reference Signals (CSI-RS), and the antenna ports may comprise CSI-RS ports. Further, the apparatus described above may be part of a radio access network. For example, the apparatus may be part of an eNodeB or an eNodeB like entity, or a variation thereof.

Figure 29:
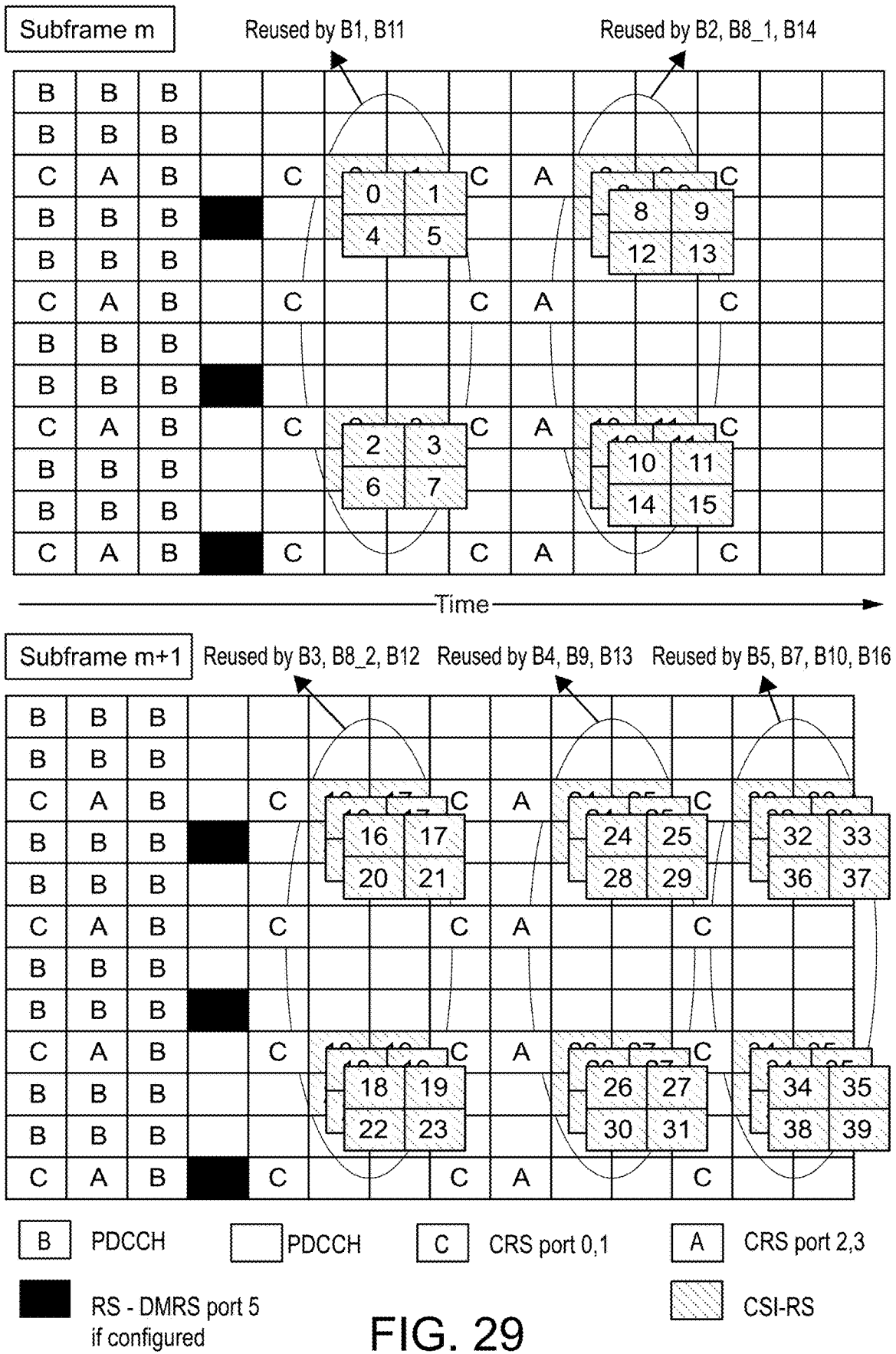
FIG. 29 shows an example of CSI-RS port reuse resource allocation that is time division based in accordance with an example embodiment.
Figure 30:
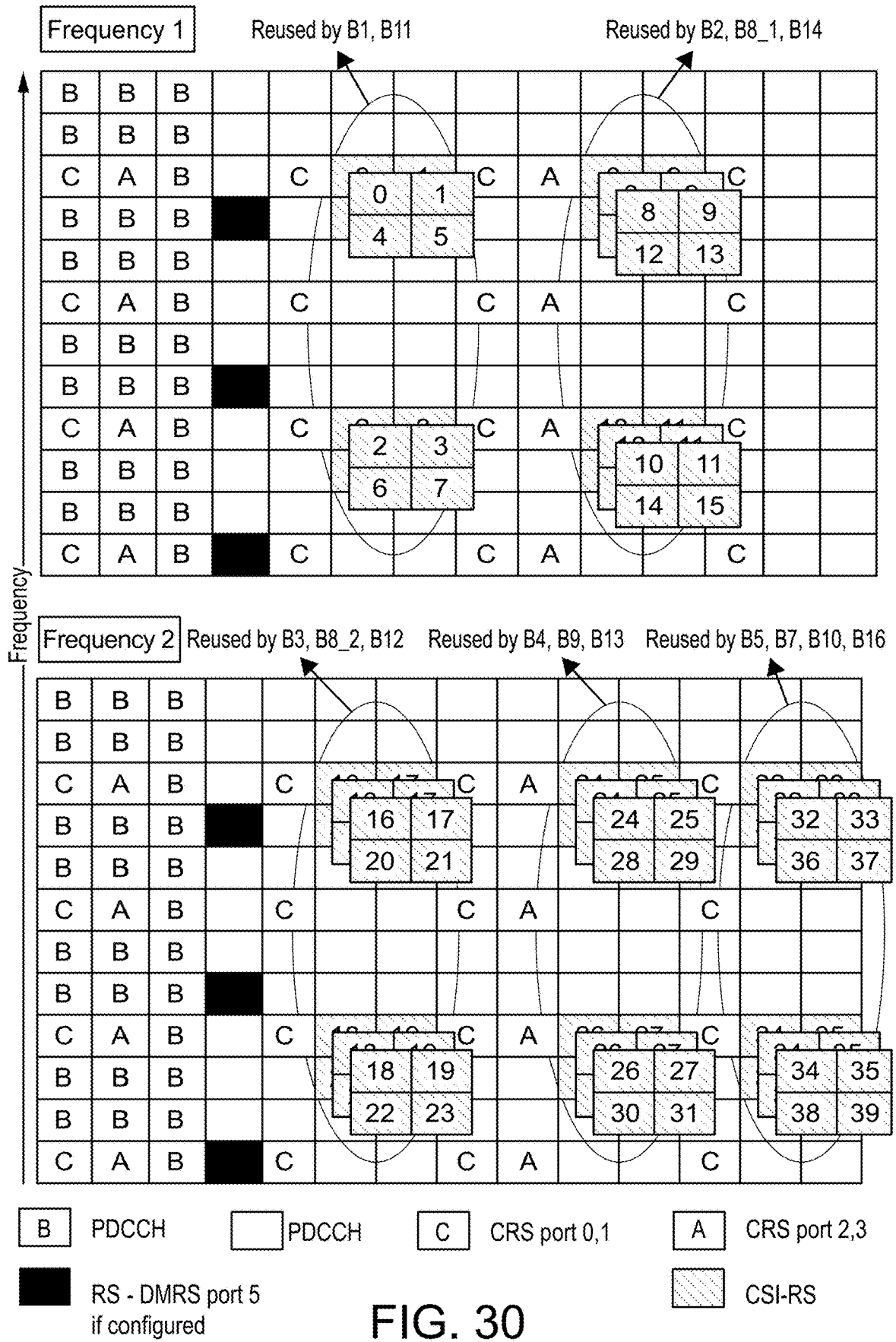
FIG. 30 shows an example of CSI-RS port reuse resource allocation that is frequency division based in accordance with an example embodiment.

By way of example, assume there are 8 horizontal antenna ports. The RB diagram in FIG. 29 shows an example of how to reuse and allocate the CSI-RS ports/REs for non-adjacent beam spots per RB. As shown, 8 horizontal antenna ports are used per 3D beam. In accordance with the illustrated example, non-adjacent beam spots (e.g., group 1: B1 and B11 shown FIG. 27) are all using the same 8 CSI-RS REs, which are shown as two overlapping port instances in FIG. 29, to efficiently enhance the current CSI-RS design to reduce the CSI-RS overhead. Similarly, the other non-adjacent beam groups in FIG. 29 can re-use the same REs. For example, still referring to FIG. 29, beams B2, B8_1 and B14 show three overlapping instances; beams B3, B8_2 and B12 show three overlapping instances; beams B4, B9 and B13 show three overlapping instances; and beams B5, B7, B10 and B16 show four overlapping instances. Note that in FIG. 29 it is assumed that a total of 16 CSI-RS ports are used for subframe m and the next 24 CSI-RS ports are allocated in the next subframe, which is a time division based allocation approach. FIG. 30 shows an example of a frequency division based CSI-RS allocation approach in which the first 16 CSI-RS ports are allocated in sub-frequency 1 and the next 24 CSI-RS ports are allocated in sub-frequency 2. It will be understood that other allocation techniques may be implemented as desired (e.g., aggregating all ports in the same subframe).

It is recognized herein that the above-described embodiments allow the 3D beam spots to be more dynamically formed based on the geographical location, velocity, and traffic information when a UE has low mobility. Further, the NULL beam spots can be formed to save the CSI-RS resources by avoiding sending any reference signals to the NULL beam spots. It is further recognized herein that, in some cases, no matter how large the number of antenna beams for 5G MIMO systems, the number of non-adjacent beam groups might not vary much, which means that the number of REs used for transmitting CSI-RS might not increase. Therefore, by using the CSI-RS design described above that includes dynamic and irregular 3D antenna beams, the CSI-RS ports/REs may be reused at a maximum rate in the most efficient way, thereby limiting CSI-RS overhead.

Figure 31:
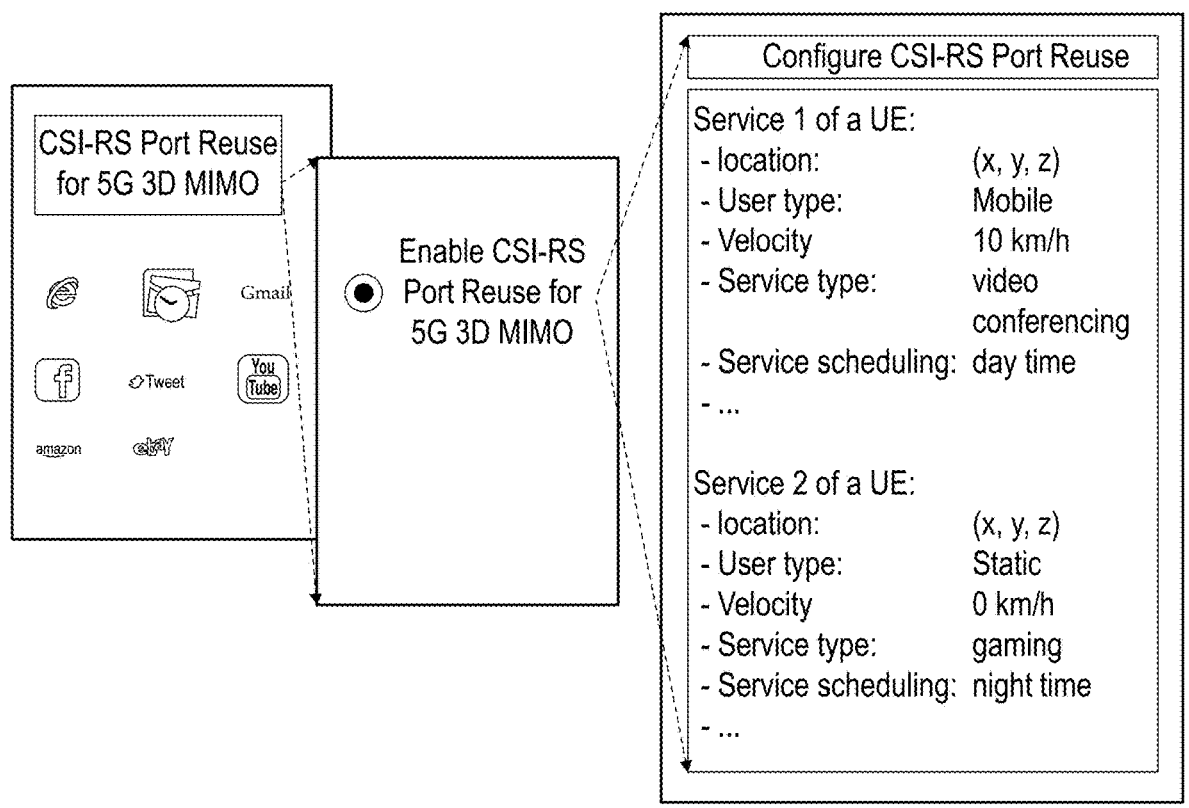
FIG. 31 shows an example graphical user interface that is associated with a UE in accordance with an example embodiment.

Referring now to FIG. 31, an example graphical user interface (GUI) is shown. A UE may include the GUI shown in FIG. 31. As described above, there are one or more parameters that may be pre-configured by a user to enable the enhanced CS-RS design for NR 3D MIMO described above. Example parameters include, location, user type, velocity, traffic/service type, traffic/service scheduling, etc. A user of the UE can use the illustrated GUI to pre-configure the parameters that will be sent to a network node, for instance an eNB. It will be understood that the GUI can be used to monitor, configure, and query alternative parameters as desired. It will be further understood that the GUIs can provide a user with various information in which the user is interested via a variety of charts or alternative visual depictions.

Figure 32:
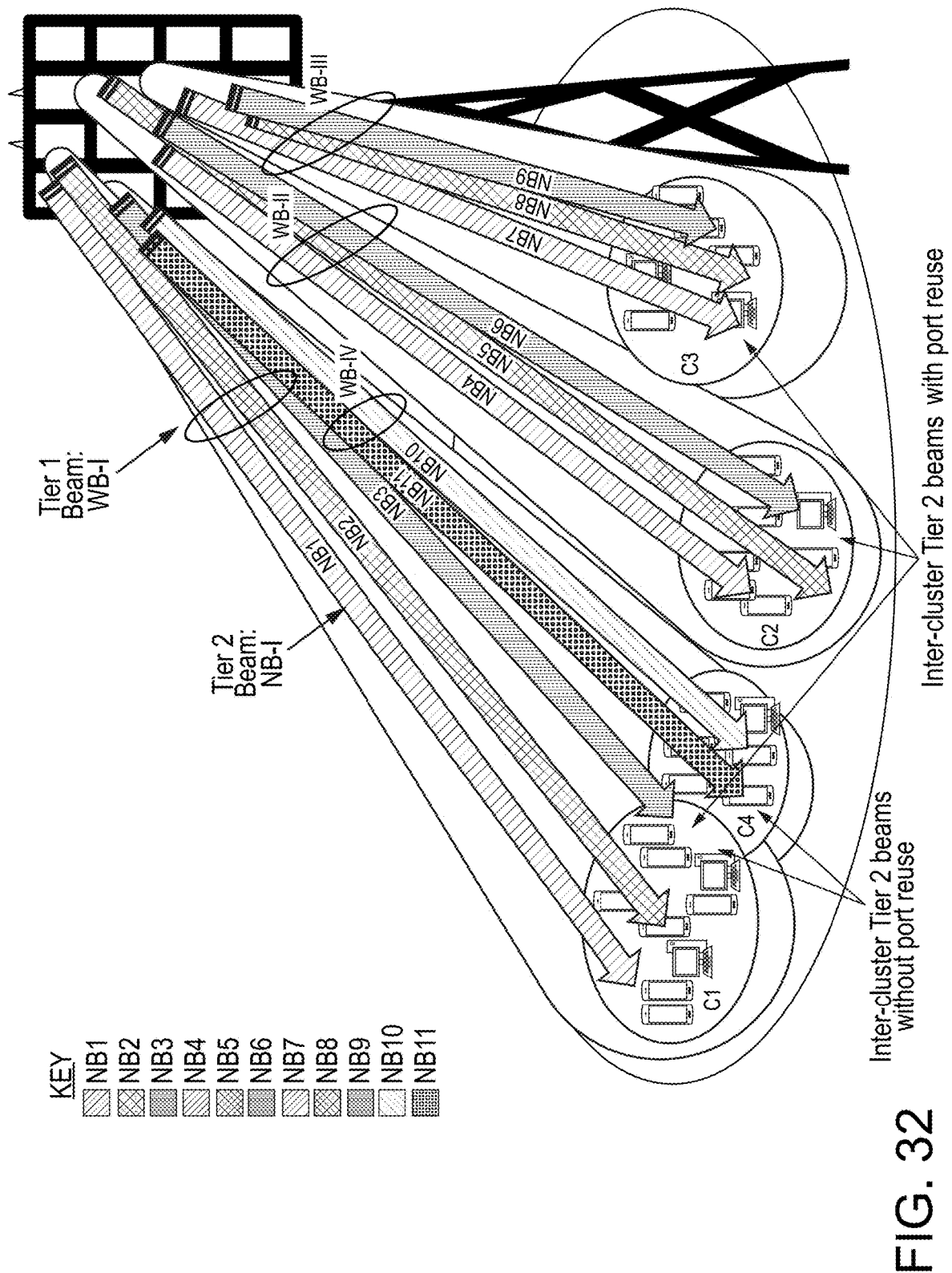
FIG. 32 shows an example system in which there are wide beams as Tier 1 beams and narrow beams as Tier 2 beams in accordance with an example embodiment.
Figure 33:
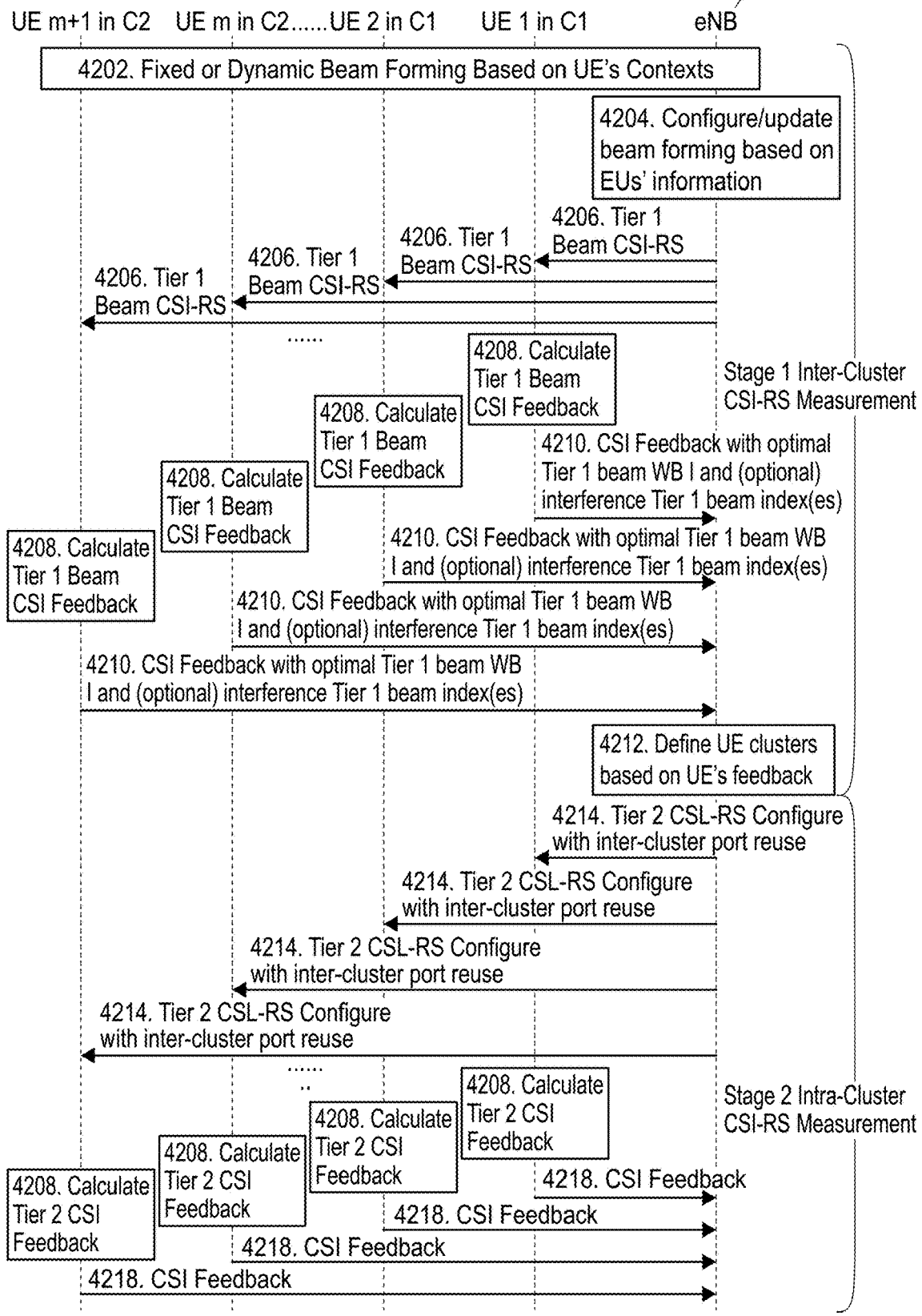
FIG. 33 is a call flow that shows an example of how inter-cluster CSI-RS beams and intra-cluster CSI-RS beams can be formed in accordance with an example embodiment.

Referring now to FIG. 32, another example is shown in which fixed 3D beams and dynamic 3D beams may be configured based on context information associated with various UEs. Example context information includes location, velocity, and traffic information. The beams can be configured to optimize a radio access network's operations and resource allocations. FIG. 32 illustrates an example procedure for configuring the fixed 3D beams and depicts two exemplary mechanisms to add a UE's context. In one example, context is added through a radio connection request to the eNB (e.g., Radio Resource Control (RRC)). In another example, context is added through a network connection request to the Mobility Management Entity (MME) (e.g., Attach). FIG. 33 shows an example method for configuring the dynamic 3D beams, and the CSI-RS mechanism is also shown.

In another example embodiment, described in detail below, beamformed CSI-RS is improved with cluster specific features. It is recognized herein that a cluster-specific CSI-RS transmission scheme with inter-cluster port reuse can improve the design of beamformed CSI-RS in future cellular systems. An eNB or alternative radio access apparatus can form Tier 1 Wide Beams (WBs) based on various UEs or mobile devices geographical location information. While the term eNB is often used for purposes of example herein, it will be understood that embodiments are not limited to an eNB, and alternative nodes, including nodes or apparatus that will assume new names in the future, may implement various embodiments described herein. In an example, an eNB may also use full channel reciprocity feature (for TDD systems) or partial channel reciprocity (for FDD systems) to read UL SRS information for DL channel estimation. Then eNB can perform elevation and azimuth beamforming measurement per Tier 1 beam.

In another example described below, multiple Tier 1 beams may be received or detected by respective UEs. Each UE may calculate the channel state information for multiple beams and, in some cases, select the optimal beam as the one with the maximum CQI. Each UE can report its optimal Tier 1 beam to the eNB, such as beam index, CQI and/or PMI and RI. The UEs that report the same optimal Tier 1 beam can be defined in a cluster. In an example, only one Tier 1 beam is assigned to one cluster. In another example, also based on the channel state information, if given UE detects a plurality of wide beams, the UE may identify at least one of the plurality of wide beams that it detected as an interference beam. The UE may also report the one or more interference beams to a radio access node (e.g., the eNB) if a given interference beam's received power is larger than a pre-defined threshold. These reports can help determine inter-cluster interference at the eNB.

As described below, CSI-RS ports/REs can be reused for sending reference signals of Tier 1 beams. For example, with respect to inter-cluster Tier 1 beams, if interference Tier 1 beams are reported, which implies that there is high inter-cluster beam interference, the inter-cluster Tier 1 beams cannot use the same CSI-RS ports. For inter-cluster Tier 1 beams, in some cases, all Tier 1 beams except the Tier 1 beams reported as the interference Tier 1 beams may reuse the same CSI-RS ports for sending reference signals. The eNB may then conduct beamformed CSI-RS for Tier 2 Narrow Beams (NBs) within the assigned Tier 1 beam per cluster. This is referred to herein as cluster-specific CSI-RS. For inter-cluster beams, the same CSI-RS ports/REs can be reused for sending reference signals of Tier 2 beams. In an example, all intra-cluster Tier 2 beams use different CSI-RS ports for sending reference signals. For inter-cluster Tier 2 beams, if interference Tier 1 beam are reported, the corresponding inter-cluster Tier 2 beams cannot use the same CSI-RS ports in accordance with an example embodiment. For inter-cluster Tier 2 beams, all Tier 2 beams except the Tier 2 beams within the reported interference Tier 1 beams may reuse the same CSI-RS ports for sending reference signals in accordance with one example. Thus, inter-cluster CSI-RS ports may be reused, which can greatly reduce the beamformed CSI-RS overhead with massive antennas in NR cellular systems, among others.

In another embodiment described in detail below, neighbor port reduction based CSI-RS improves both KP-based and beamformed CSI-RS in a given cellular system. For example, an antenna port class can be defined with size M as a group containing M neighbor antenna ports. In some cases, antenna port class formats with size M are defined as the methods of how the M neighboring antennas form a class in a large two-dimensional antenna array. With the same port class size, different port class formats are formed by partitioning different ports into port classes.

In an example, an eNB may select the port class size M and format pattern index from at least some or up to all available port class formats, with the maximum size which guarantees the minimum acceptable quantization error among all UEs not to exceed a given threshold δ, for instance a predetermined threshold. The selection may be based on the full channel estimation, which can be obtained by the channel reciprocity feature (for TDD systems) or the legacy orthogonal CSI-RS (for FDD systems). For antenna elements in the same class, in an example, only one CSI-RS port and the same REs per class are used to send reference signals. The CSI-RS symbols transmitted on the antenna elements in one class may be precoded by a normalized vector with the same weights on all antenna elements.

The port class format selection mechanism for a given eNB may be based on received CSI reports from UEs, as described below. An eNB may calculate the quantization error between the reported PMI and the full channel PMI obtained from SRS (TDD) or the legacy CSI-RS (FDD). If the quantization error is less than a given threshold, the eNB may keep using the same port class format. Otherwise, it may select a port class format with a smaller size.

Thus, neighbor antenna elements in the same class may be assigned with the same CSI-RS port, which may greatly reduce the CSI-RS overhead by a factor of M with massive antennas in NR cellular systems. This is compatible with KP-based CSI-RS scheme and beamformed based CSI-RS scheme as well as the legacy orthogonal CSI-RS scheme in LTE.

Referring now to FIGS. 32 and 33, an improved Beamformed CSI-RS with a Cluster-Specific feature, in accordance with an example embodiment, is now discussed. In an example, two tiers of 3D antenna beams are formed. For example, wide beams are referred to herein as Tier 1 beams and narrow beams (as compared to the wide beams) are referred to herein as Tier 2 beams. FIG. 32 shows an example of how a Tier 1 beam covers a larger service area as compared to Tier 2 beams. As shown, a Tier 1 beam contains multiple small areas covered by Tier 2 beams.

Referring in particular to FIG. 33, an example system 3300 is shown that includes an eNB 3302 and plurality of mobile devices (e.g., UEs), which communicate in a network. As shown, a UE1 and a UE 2 are in cluster 1 (C1), and $UE_m$ and $UE_{m+1}$ are in cluster 2 (C2). It will be appreciated that the example system 3300 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 33, and all such embodiments are contemplated as within the scope of the present disclosure. For example, the illustrated eNB may be implemented alternatively by an eNB-like entity, an apparatus that is part of a radio access network, or the like.

Inter-cluster CSI-RS measurement is now described, which can be referred to as stage 1. At 4202, in accordance with the illustrated example, the eNB 3302 forms the Tier 1 beams based on the UEs' geographical location information. The UEs may report their geographical location information to the eNB 3302 periodically, such as from GPS, PRS, or WiFi based measurement. It will be understood that other methods can also be applied to obtain the location information. Tier 1 beams' accuracy requirements may be satisfied by the available methods. In addition, other UE context information, such as, for example user type (static or mobile), velocity (x km/h), traffic/service type (e.g. video conferencing, gaming/entertainment, web browsing), traffic/service scheduling (e.g. day time traffic, night time), etc., may be piggybacked in the UL messages to help 3D fixed or dynamic beam formation at the eNB 3302. At 4204, the eNB 3302 may conduct beamformed CSI-RS with Tier 1 beams. Because the Tier 1 beams have a wider beamwidth as compared to the Tier 2 beams for example, the Tier 1 beams can be referred to as wide beams, and the total number of Tier 1 beams to cover a cell is relatively small, which reduces the overhead for CSI-RS ports. For example, based on the location information associated with each of the plurality of UEs, the eNB 3302 can form a wide beam, for instance a first wide beam, that is sent to an area within a cell. Multiple Tier 1 beams may be received by each of the UEs. Stated another way, each UE may receive or detect a plurality of wide beams. At 4206, each UE calculate the channel state information associated with each of these beams (the detected wide beams). Based on the channel state information, the UE may select an optimal Tier 1 (wide) beam from the plurality of wide beams. The optimal wide beam may be the beam with the maximum channel quality indication (CQI) as compared to the other detected Tier 1 beams. As used herein, the terms wide beam and Tier 1 beam may be used interchangeably, without limitation. Similarly, as used herein, the terms narrow beam and Tier 2 beam may be used interchangeably, without limitation.

At 4208, in accordance with the illustrated example, each of the plurality of UEs calculates Tier 1 Beam CSI feedback. For example, if there exists more than one Tier 1 beam with the maximum CQI for a given UE, the UE may select one of those beams as the optimal Tier 1 beam using a secondary metric. The secondary metric may include at least one of, for example and without limitation, the maximum reference signal strength/quality (e.g., Reference Signal Received Quality (RSRQ), Reference Signal Received Power (RSRP), or the maximum Received Signal Strength Indicator (RSSI)). In some cases, if there is still more than one optimal Tier 1 beam after breaking the tie with the secondary beam evaluation metric, the UE may randomly select one of these beams as the optimal Tier 1 beam. Under this case, the other beam(s) with the same maximum CQI will be reported as interference Tier 1 beam(s) at 4208. At 1108, the UE may then report the optimal Tier 1 beam index to the eNB with related CQI, PMI, RI, etc. The number of digits needed to report this Tier 1 beam index field may be reduced as compared to the current beamformed CSI-RS scheme because the Tier 1 has a wider beamwidth and the total number of Tier 1 beams to cover a cell is relatively small, which reduces the overhead for CSI feedback report for NR MIMO systems.

Still referring to FIG. 33, at 4212, in accordance with the illustrated example, based on the received reports from the UEs, the eNB 3302 may group select UEs of the one or more mobile devices into a first cluster. For example, as shown, UE1 and U2 is grouped into a first cluster (C1), and UE$_m$ and UE$_{m+1}$ are grouped into a second cluster (C2). Based on the reported optimal beam information from UEs, the eNB 3302 can define UE clusters. In some cases, all the UEs that report the same optimal Tier 1 beam are grouped into one cluster. Thus, in an example, each Tier 1 beam covers only one UE cluster, and each cluster is associated with only one Tier 1 beam. Thus, the eNB can send the first wide beam (WB I) to the first cluster. As shown in FIG. 32, in accordance with the illustrated example, one cluster may be covered by one Tier 1 beam. In accordance with the illustrated example, WB I covers the service area of C1 and WB II covers the service area of C2. In addition, one cluster may be covered by multiple Tier 2 beams. For example, as shown, narrow beams (NBs) 1, 2 and 3 cover the service area of C1 and NBs 4, 5 and 6 cover the service area of C2.

At 4210, each UE may also identify one or more interference Tier 1 beams. Thus, the eNB 3302 may receive an indication, from one or more of the mobile devices in the first cluster, of a second wide beam that is associated with a second cluster of mobile devices. The indication may identify the second wide beam as an interference beam. For example, UEs may identify interference beams based on the calculated channel state information. In some cases, if a Tier 1 beam has a received power that is greater than a predefined threshold, or if a Tier 1 beam has a received power which is greater than the received power level of the optimal Tier 1 beam minus a predefined threshold, or if a Tier 1 beam has a received power lower than a predefined threshold or lower than the received power level of the optimal Tier 1 beam minus a predefined threshold but it has been detected as a Tier 1 beam with the same maximum CQI as the optimal Tier 1 beam identified in the previous step, then the UE reports its one or more beam indices to the eNB.

The predefined threshold may be an absolute threshold or a threshold that is defined relative to the received power (e.g., RSRP) value of the optimal Tier 1 beam at a given UE. In either case, the thresholds can be configured by eNB. The threshold may be UE-specific, beam-specific, cell-specific, or common to the UEs. The eNB may signal the threshold value to the UE via common RRC signaling (e.g., system information broadcast) or dedicated signaling, for instance RRC dedicated signaling. In the latter example, a given UE may be allowed to use a threshold value received while the UE was previously connected to the network. The CQI, PMI and RI might not need to be reported with the interference Tier 1 beam(s) in some cases. The interference Tier 1 beam information may be used by eNB to decide the inter-cluster interference in the stage 2 process shown in FIG. 35. For example, as shown in FIG. 32, some UEs in the edge of cluster 1 (C1) (overlapping with cluster 4 (C4)) may report Tier 1 WB I as the optimal beam and also report Tier 1 WB IV as the interference Tier 1 beam to the eNB.

Figure 34:
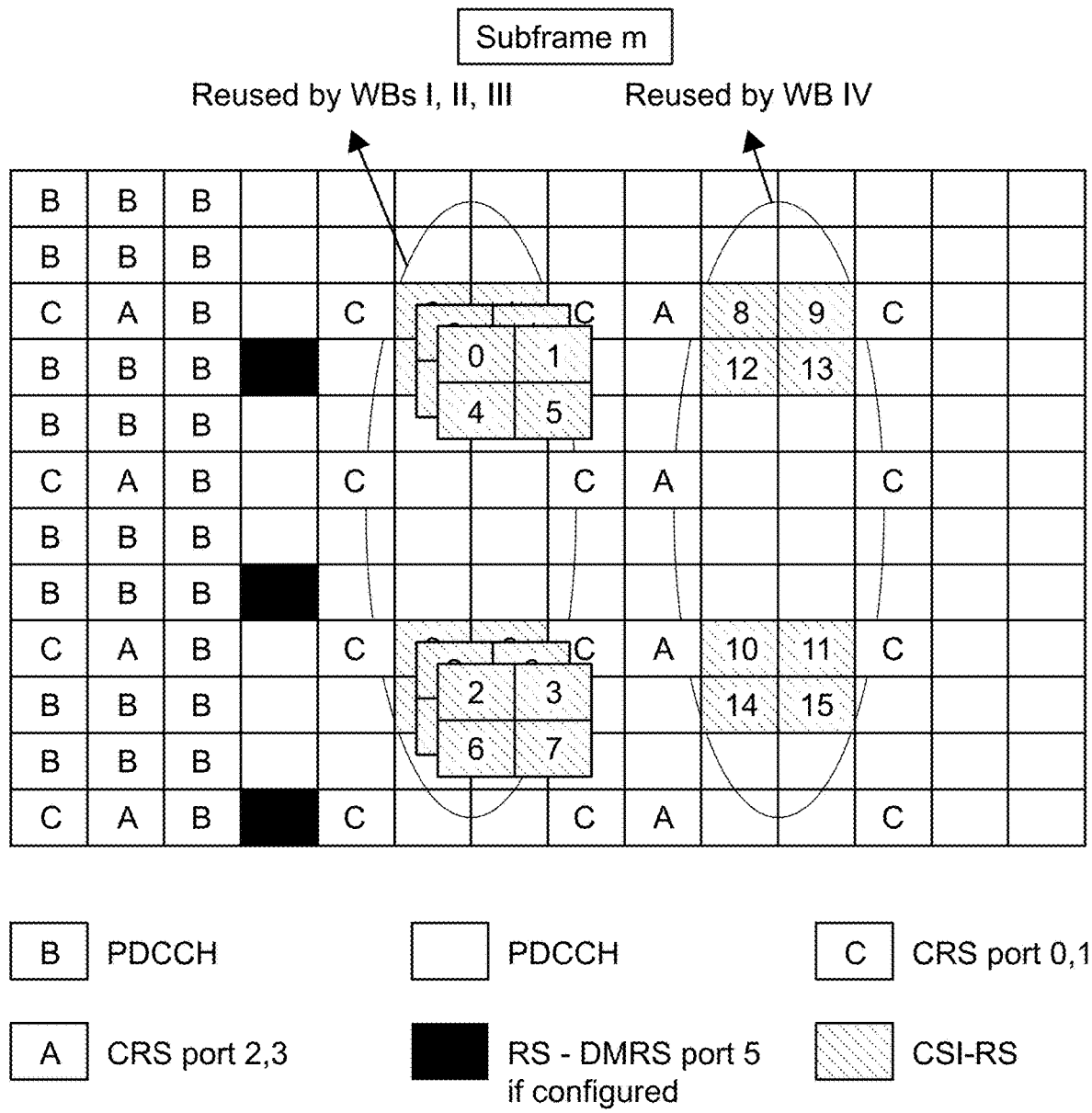
FIG. 34 shows an example of a widebeam (WB) CSI-RS resource allocation in accordance with an example embodiment.

In an example, if the interference Tier 1 beam has a received power which is lower than a predefined threshold or a received power which is a predefined threshold lower than the received power level of the optimal Tier 1 beam, and it has not been detected to have the same maximum signal strength/quality in the previous step, then there might be no need to report the CQI of the interference Tier 1 beam to the eNB 3302. In this example, inter-cluster interference can be low and ignored. For example, as shown in FIG. 34, UEs in C2 or C3 (no overlapping with other clusters) might not report any interference Tier 1 beam.

For inter-cluster beams, the same CSI-RS ports/REs for sending reference signals for Tier 1 beams may be reused in the next period. In one example, if an interference Tier 1 beam is reported, which implies that there is high intercluster beam interference, the inter-cluster Tier 1 beams cannot use the same CSI-RS ports (e.g., WB I and WB IV as shown in FIG. 34). For inter-cluster Tier 1 beams, in accordance with an example embodiment, all Tier 1 beams except the Tier 1 beams reported as the interference Tier 1 beam may reuse the same CSI-RS ports for sending reference signals (e.g., WBI and WB II as shown in FIG. 32). The Tier 1 beams for CSI-RS measurements may be periodic with low frequency or aperiodic.

Still referring to FIG. 33, at 4214, per each cluster, in accordance with the illustrated example, the eNB 3302 only needs to send beamformed CSI-RS for the Tier 2 beams within the assigned Tier 1 beam. For example, if cluster 1 is assigned to use Tier 1 beam WB I based on the stage 1 process, then eNB only needs to send Tier 2 beam NB1, NB2, and NB3 for cluster 1. This is referred to as intracluster CSI-RS measurement as compared to the intercluster CSI-RS measurement conducted in Stage 1, which is also referred to herein as cluster-specific CSI-RS.

In accordance with an example embodiment, all intracluster Tier 2 beams use different CSI-RS ports for sending reference signals, e.g., (NBs 1, 2, 3), (NBs, 4, 5, 6) and (NBs 7, 8, 9) as shown in FIG. 32. For inter-cluster Tier 2 beams, if interference Tier 1 beams are reported at 4210, which implies that there is high inter-cluster beam interference, the corresponding inter-cluster Tier 2 beams, in particular the corresponding inter-cluster Tier 2 beams of that interference Tier 1 beams, cannot use the same CSI-RS ports. For example, NBs 1, 2, 3 and NBs, 10, 11 shown in FIG. 32 cannot use the same antenna ports as each other. For inter-cluster Tier 2 beams, in accordance with an example, all Tier 2 beams except the Tier 2 beams within the reported interference Tier 1 beams from stage 1, can reuse the same CSI-RS ports for sending reference signals, e.g. (NBs 1, 4, 7), (NBs 2, 5, 8) and (NBs 3, 6, 9) as shown in FIG. 32.

Thus, in accordance with an example, regardless of how many UE clusters are defined per cell and regardless of how many Tier 1 and 2 beams are formed per cell, the number of required CSI-RS ports are only tied to the maximum number of Tier 2 beams within a cluster and to the reported interference beams, which less than the number of total beams. In some cases, the periodicity of the Tier 2 beam CSI-RS measurement (at 4216 and 4218) may be more frequent than Tier 1 beam CSI-RS measurement in stage 1.

By way of example, assume there are 8 antenna ports (assuming all in the horizontal dimension) and 4 wider beams, the RB diagram in FIG. 34 shows how the Tier 1 beam and CSI-RS ports/REs can be allocated per RB with elevation beamforming. The CSI-RS can be reused with spatial separation. For example, WBs I, II and III use the same CSI-RS ports/REs, with overlapping CSI-RS allocation.

In some cases, to efficiently enhance the current CSI-RS design to reduce the CSI-RS overhead, the illustrated stage 2 process can be conducted more frequently than that of the illustrated stage 1 process. Thus, inter-cluster Tier 2 beams (e.g., group 1: NB 1, NB 4, NB 7; group 2: NB 2, NB 5, NB 8; group 3: NB 3, NB 6, NB 9) can reuse the same 8 CSI-RS REs, which are shown as three overlapping instances in FIG. 35. As stated above, with respect to beamformed CSI-RS, each beam may use all 8 horizontal ports/REs with its weighting vector applied. Additionally, each group may use 8 REs with spatial reuse. The total power may be equally shared by the overlapping CSI-RS symbols per RE. In some cases, the overlapping clusters do not reuse the same ports (e.g., NB 10, NB 11 as shown in FIG. 35). It will be understood that other allocation methods (e.g., the frequency division based CSI-RS allocation) may be utilized as desired and as appropriate.

Turning now to CSI-RS sequence design to generate cluster-specific CSI-RS sequences based on the existing sequence generation methodology, different random sequences can be generated per cluster to reduce the interference among the reused inter-cluster CSI-RS Tier 2 beams at the receiver, for example, when the RE carries CSI-RS symbols for more than one Tier 2 beam as shown in FIG. 35. In accordance with an example embodiment, a cluster ID can be included in the sequence generation to ensure that each cluster has its own CSI-RS sequence per cell. Then the equation (7) applies:

$$c_{init}=2^{10} \cdot (7 \cdot (n_s'+1)+l+1) \cdot (2 \cdot N_{ID}^{CSI}+2N_{ID}^{Cluster}+1)+ 2 \cdot N_{ID}^{CSI}+N_{CP} \quad (7)$$

where $N_{ID}^{Cluster}$ is the cluster identification per cell. Also, in some cases, the eNB needs to signal $N_{ID}^{Cluster}$ to the UEs, so that each UE can generate the defined CSI-RS sequence. The signaling of $N_{ID}^{Cluster}$ can be carried out in multiple ways, for example and without limitation:

It can be added to other DCI formats as a new field or a new special DCI format can be created and sent from eNB to UE via PDCCH or ePDCCH.

It can be added in any future NR downlink control channels because NR cellular systems may have new designs of control channels other than PDCCH and ePDCCH.

The new Cluster ID field proposed herein can be in a new or reused DCI format, as illustrated herein. The information can be periodically or aperiodically transmitted via PDCCH or ePDCCH or any future NR control channels based on, for example, a given UE's location, speed, or other context information. With static or very-low-mobility scenario, it can be less frequently transmitted as compared to a high mobility scenario.

TABLE 11

Example of Cluster ID field in an example DCI Format

| Field Name | Length (Bits) |
|---|---|
| Cluster ID | 5 |
| MCS | 5 |
| PMI confirmation for precoding | 1 |
| ... | ... |

As described above, in some cases, no matter how many UE clusters are defined per cell and no matter how many Tier 1 and Tier 2 beams are formed per cell, the number of REs used for transmitting CSI-RS will not increase with the increasing number of antenna beams. The number of REs might only be related to the number of Tier 2 beams per cluster (spatial separation) and the reported interference beams, which might only affect the number of overlapping port instances per RE. Thus, the CSI-RS overhead can be greatly reduced by the proposed two-stage procedure and the inter-cluster port reuse mechanisms described above.

In an example embodiment in which Tier 1 and Tier 2 beams are formed, the Tier 1 beams may be used for downlink coverage in the cell, for example, to support full initial access to the NR downlink common channels, such as synchronization, broadcasting, or the like. The Tier 1 beams may also be used to support the uplink reception coverage in the cell for NR uplink initial accessing channels, such as, for example, the random accessing channel, non-orthogonal grant-less accessing channel, etc. The Tier 2 beams may be used for UE-specific downlink data transmissions, such as, for example, NR downlink control and data channels for improving the system capacity.

Turning now to an improved KP-Based CSI-RS and Beamformed CSI-RS with Neighbor Port Reduction Feature, as described below, the KP-based CSI-RS and beamformed CSI-RS schemes in a large antenna array can reduce CSI-RS overhead.

By way of example, an antenna port class with size M is defined as a group containing M neighbor antenna ports. A port class format with size M is a particular way in which every M neighbor antenna ports form an antenna port class. The port class format with size M=1 is equivalent to the original antenna port format without any reduction. With size M>1, the CSI-RS port will be reduced by a factor of M. With the same class size, it may have different patterns to form the class with different neighbors.

The port class formats can be pre-defined, and the eNB and UEs can share the knowledge of the available port class formats. The eNB can dynamically select the port class format based on the UEs' feedback and the calculated quantization error at the eNB.

Figure 36:
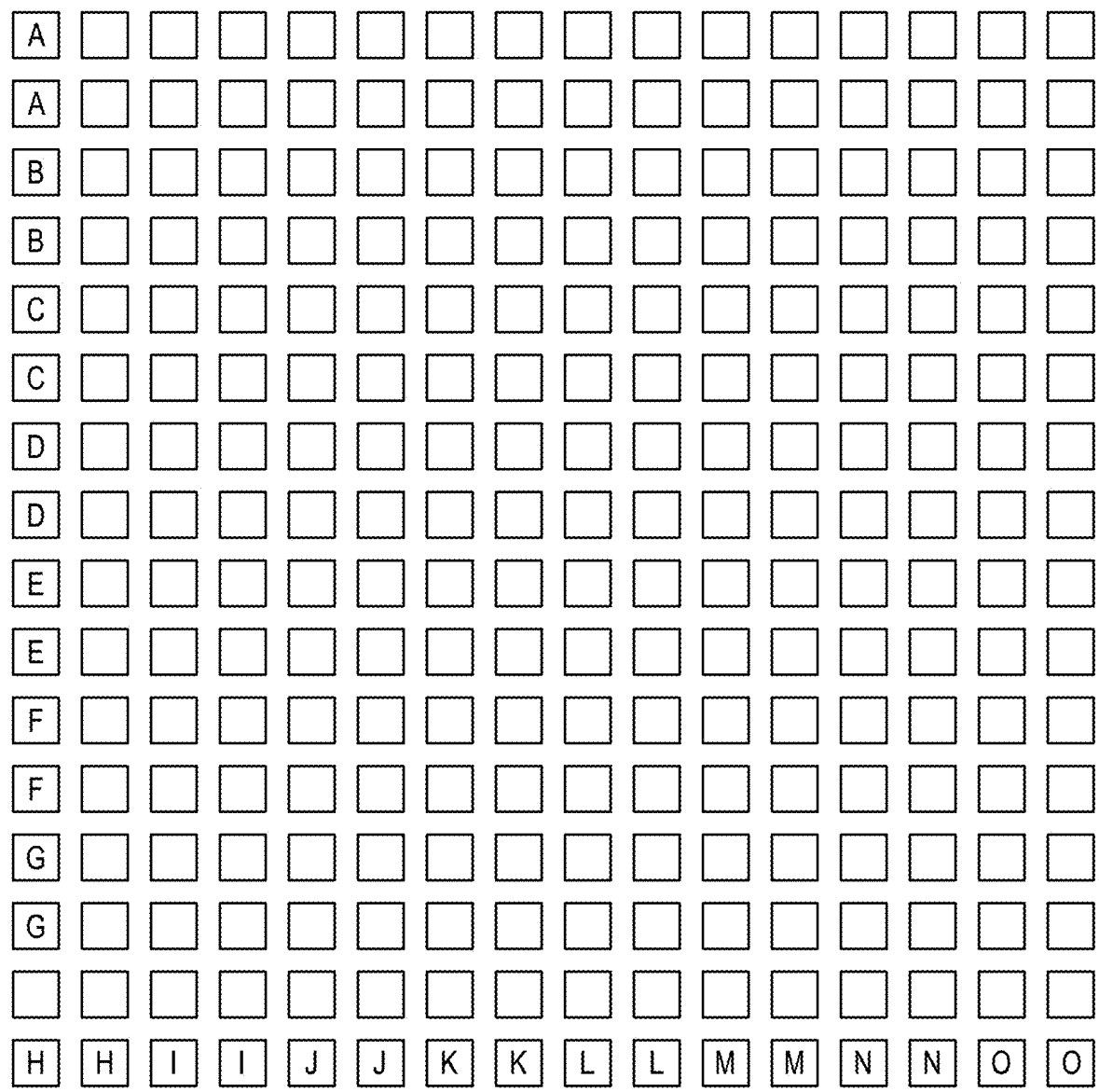
FIG. 36 shows an example of port class formats for KP-based CSI-RS with size 2 in accordance with an example embodiment.
Figure 37:
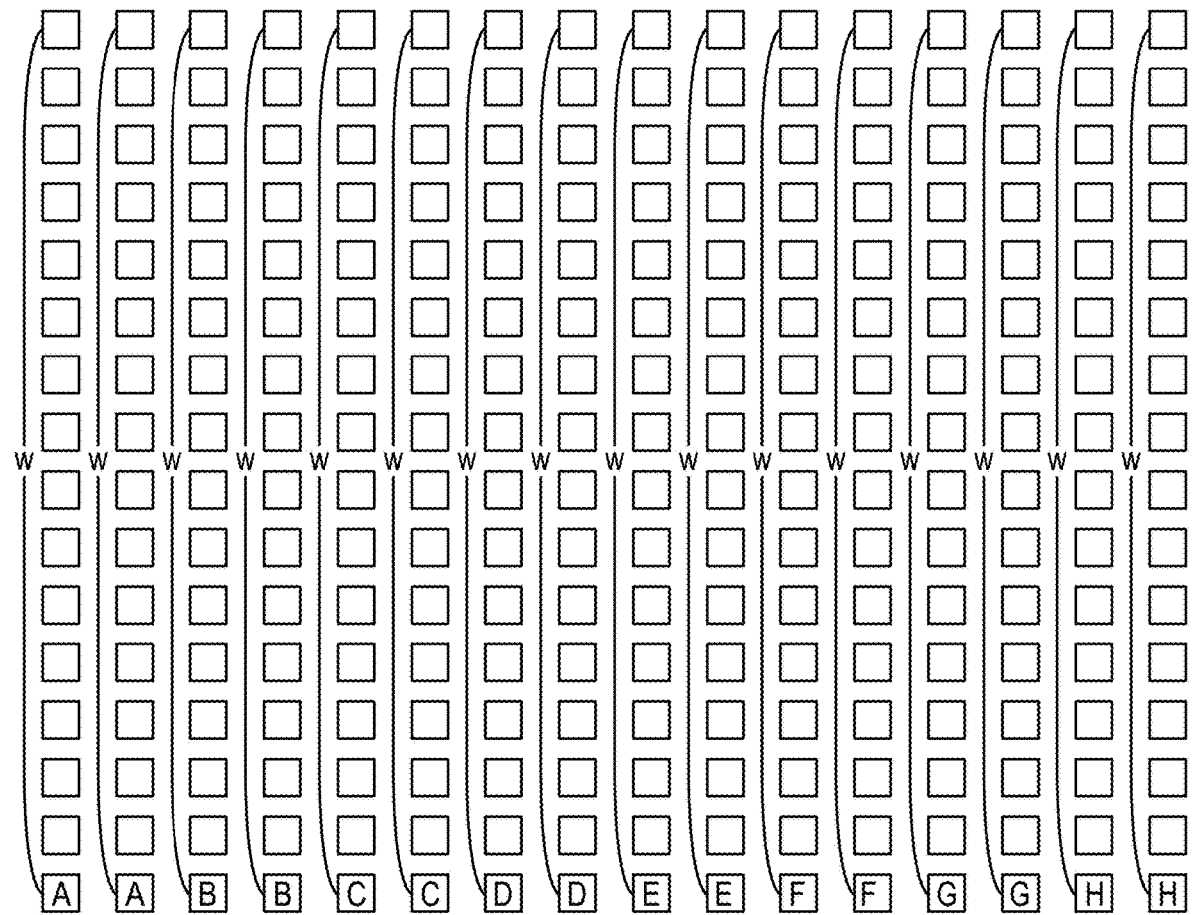
FIG. 37 shows an example of port class formats for beamformed CSI-RS with size 2 in accordance with an example embodiment.

An exemplary port class format with M=2 for a 16×16 antenna array with KP-based CSI-RS scheme is shown in FIG. 36. As stated, the eKP-based CSI-RS ports are assigned to the antennas in the first column and the first row. Referring to FIG. 36, the neighbor antennas in the same class with size M=2 are indicated by a common letter reference (e.g., A, B, C, etc.). FIG. 37 shows an example port class format with M=2 for a 16×16 antenna array with beamformed CSI-RS scheme. As shown, one beamformed CSI-RS port is assigned to each column and the reference signals on each column are precoded by the same weighting vector. Referring to FIG. 37, the antenna ports in the same class are indicated by the same letter reference (e.g., A, B, C, etc.).

Figure 38:
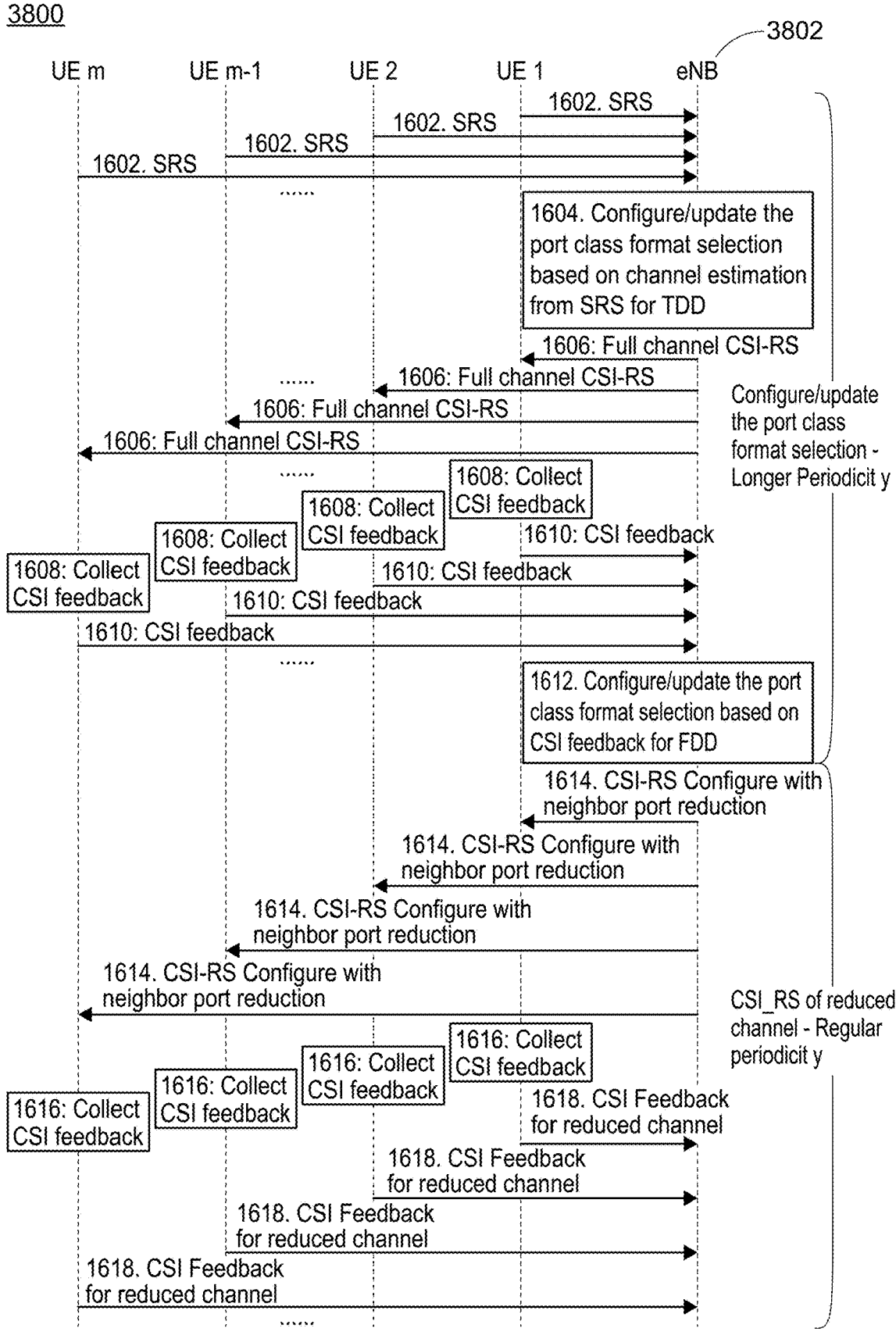
FIG. 38 is a call flow for CSI-RS with neighbor port reduction in accordance with an example embodiment.

Referring also to FIG. 38, an example system 3800 is shown that includes an eNB 3802 and a plurality of mobile devices (e.g., UEs), which communicate in a network. As shown, a UE1, a UE2, a $UE_m$, and a $UE_{m-1}$ represent the plurality of UEs. It will be appreciated that the example system 3800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 38, and all such embodiments are contemplated as within the scope of the present disclosure. For example, the illustrated eNB may be implemented alternatively by an eNB-like entity, an apparatus that is part of a radio access network, or the like.

In accordance with the illustrated embodiment, at 1602, to select the CSI-RS port class format, the eNB obtains the full channel estimation. This can be performed periodically with a long duration or aperiodically. For a TDD system, the eNB may take advantage of full channel reciprocity feature to use the UL channel CSI obtained from UL SRS for DL channel estimation. For a FDD system, the eNB may send CSI-RS through all ports as the legacy orthogonal CSI-RS, and UE will feedback CSI report according to the full channel information.

At 1604, in accordance with the illustrated example, based on the obtained CSI of the ports, the eNB selects a port class format from the available port class formats, with the maximum size which guarantees that the minimum acceptable quantization error among all the UEs will not exceed a given threshold δ. The quantization error may be calculated based on the difference between the full channel PMI and the reduced PMI.

For antenna elements in the same class, in accordance with an example, only one CSI-RS port and the same RE is used to send reference signals. The CSI-RS symbols transmitted on the antenna elements in one class can be precoded by a normalized vector with the same weights on all antenna elements.

At 1606, in accordance with the illustrated example, the eNB 3802 then signals the information of the selected port class format (e.g., port class size M and format pattern index with size M) to UEs. The signaling can be done via downlink control channels or other methods as desired (e.g., Radio Resource Control (RRC) signaling, MAC Control Element (CE), which might be more dynamic than RRC level signaling). For example, the downlink control channel can be a new or reused DCI format carried on PDCCH or ePDCCH, or any downlink control channels in a NR system. In some cases, when size M=1, it indicates the normal CSI-RS port, and when size M>1, it indicates the reduced CSI-RS port.

At 1608, each UE can obtain port class size M and a format pattern index with size M. At 1610, in accordance with the illustrated example, each UE can send feedback, in a CSI report for example, according to the reduced channel, such as CQI and/or PMI and RI for example. In some cases, depending on the port class size M, the PMI can be calculated based on different codebooks. The report at 1610 may reduce the CSI feedback overhead for MIMO systems, for instance NR MIMO systems. For example, the number of digits needed for CSI report according to the reduced channel will be less than the ones for the current KP-based or beamformed CSI-RS scheme, since with less CSI-RS ports, the codebook size for PMI calculation is reduced, and as a result, the number of bits in the PMI report is also reduced. At 1612, after the NB obtains CSI reports from UEs, the eNB can calculate the quantization error between the reported PMI and the full channel PMI learned from 1602. If the maximum error among the UEs is less than the given error threshold δ, the eNB 3802 may use the same port class format, and thus maintain the port size M. If the maximum error among the UEs is greater than the given error threshold δ, the eNB may select a port class format with a smaller size (e.g., M−1) at 1614. The above described steps may be repeated, as shown by 1616 and 1618.

Figure 39:
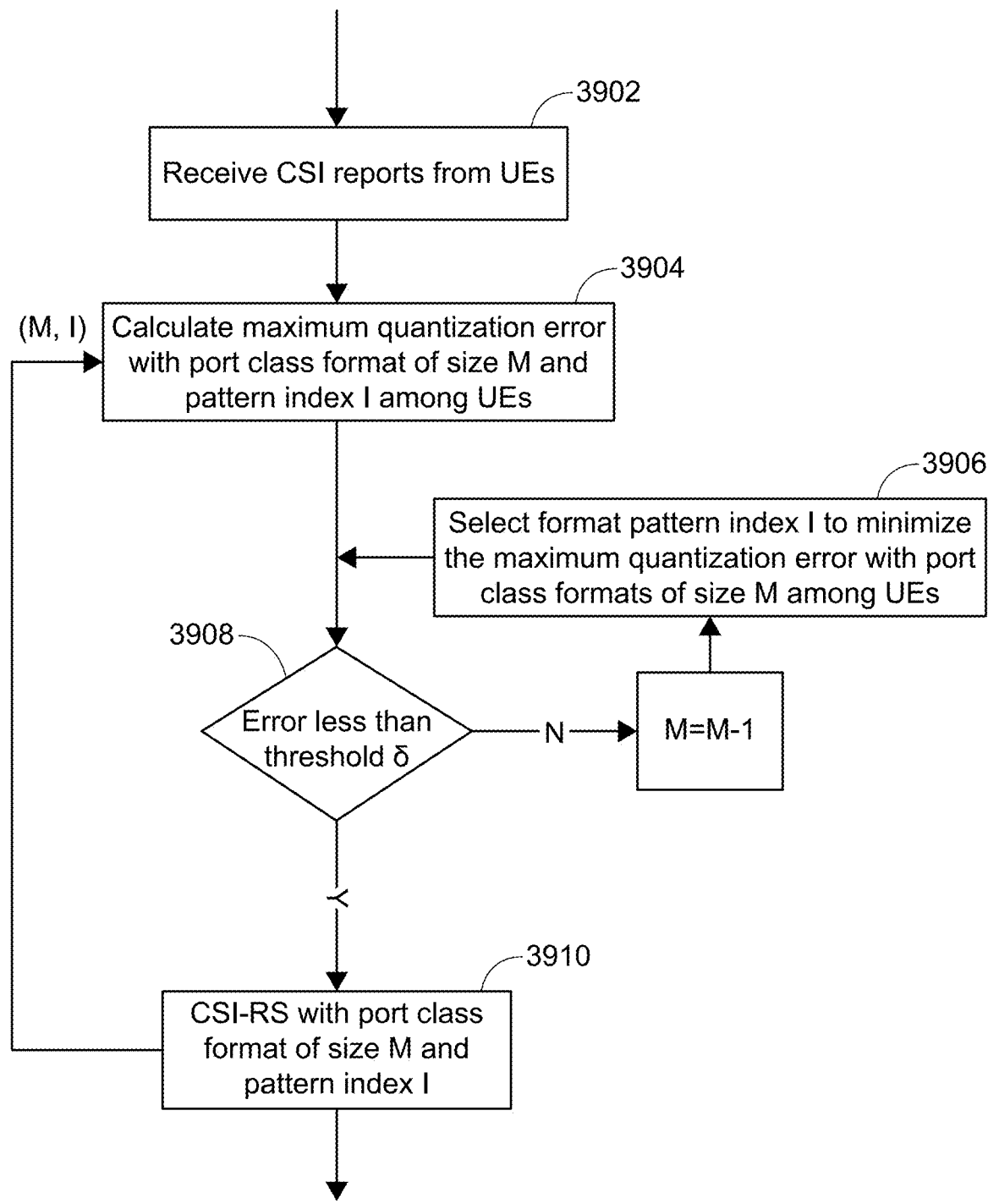
FIG. 39 is a flow diagram for selecting a port class format in accordance with an example embodiment.
Figure 40:
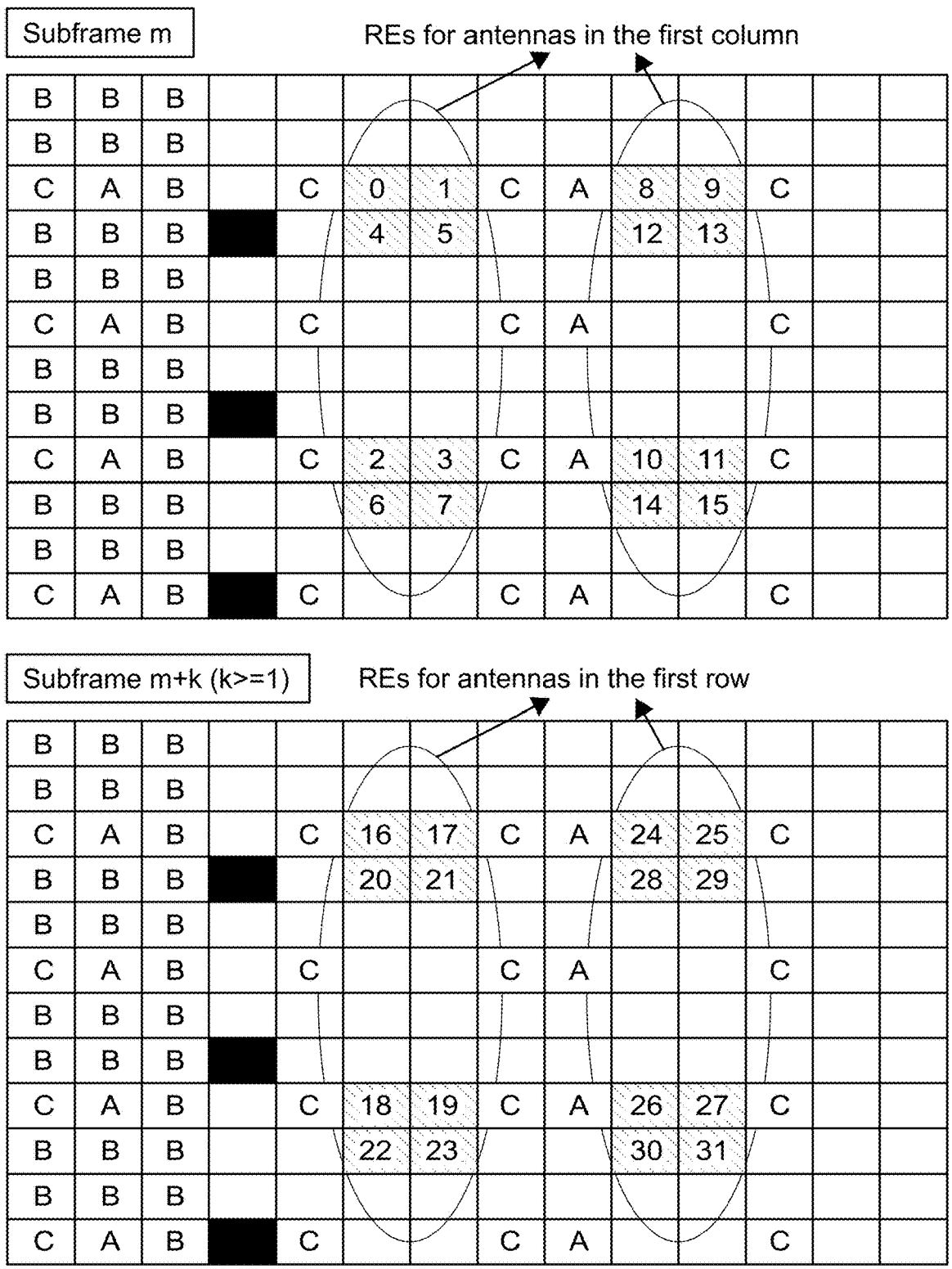
FIG. 40 shows an example of CSI-RS port reuse resource allocation that is KP-based for a full channel estimation in accordance with an example embodiment.
Figure 41:
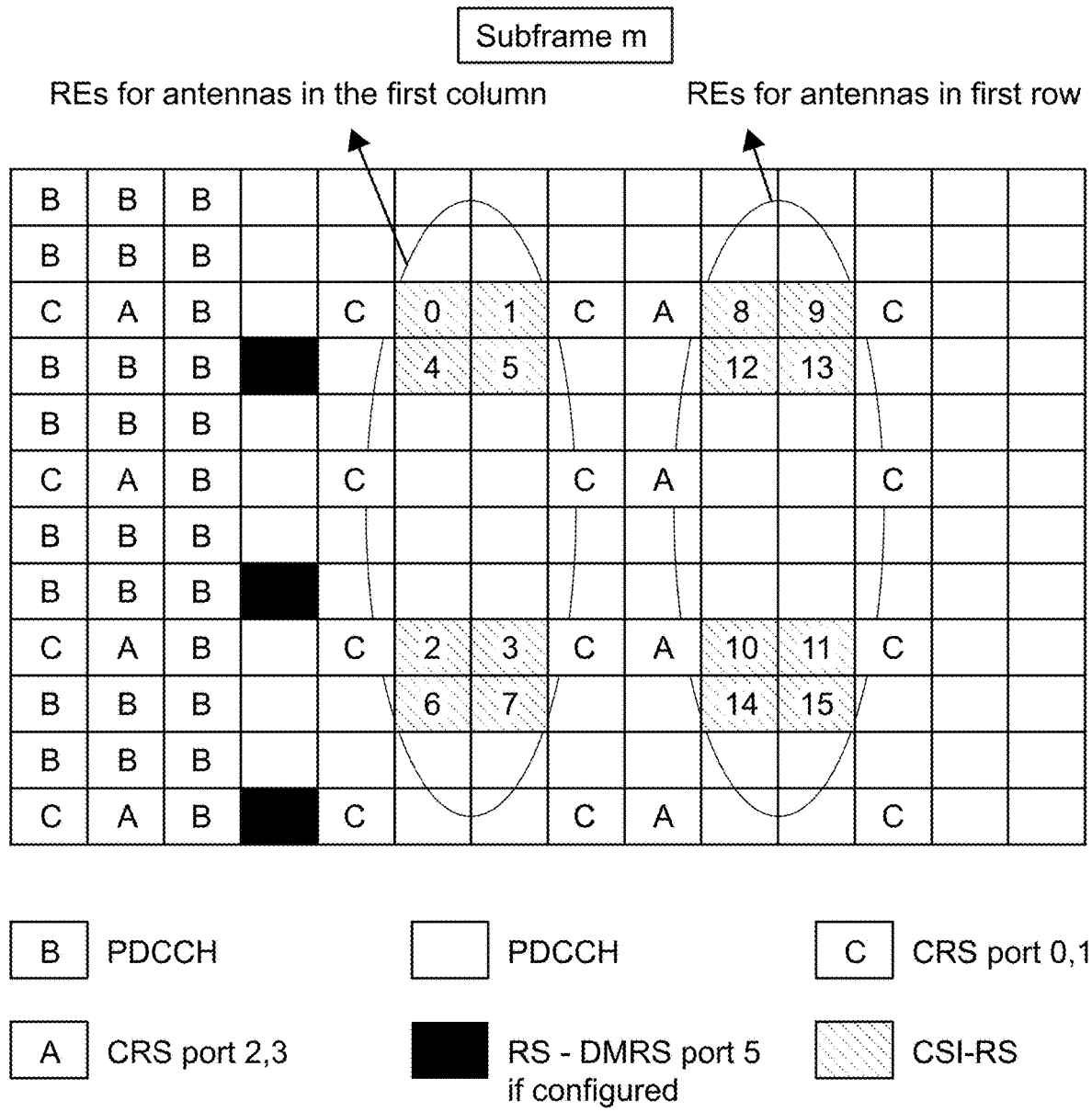
FIG. 41 shows another example of a KP-based CSI-RS port reuse resource allocation in accordance with an example embodiment.

FIG. 39 depicts an example port class format selection procedure that can be performed at the eNB 3802 or an access node. For example, at 3902, the node receives one or more CSI reports from UEs. At 3904, the node may calculate a maximum quantization error, with a port class format of size M and a pattern index I among the UEs. At 3908, the node determines whether the error is less than a threshold. If the error is less than the threshold, the process proceeds to 3910, where a CSI-RS with a port class of size M and pattern index I is selected. If the error is greater than the threshold, the process proceeds to 3906, where the node selects a format index to minimize the maximum quantization error with port class formats of size M among the UEs. After 3906, the process may return to 3908, where error is compared to the threshold.

Figure 43:
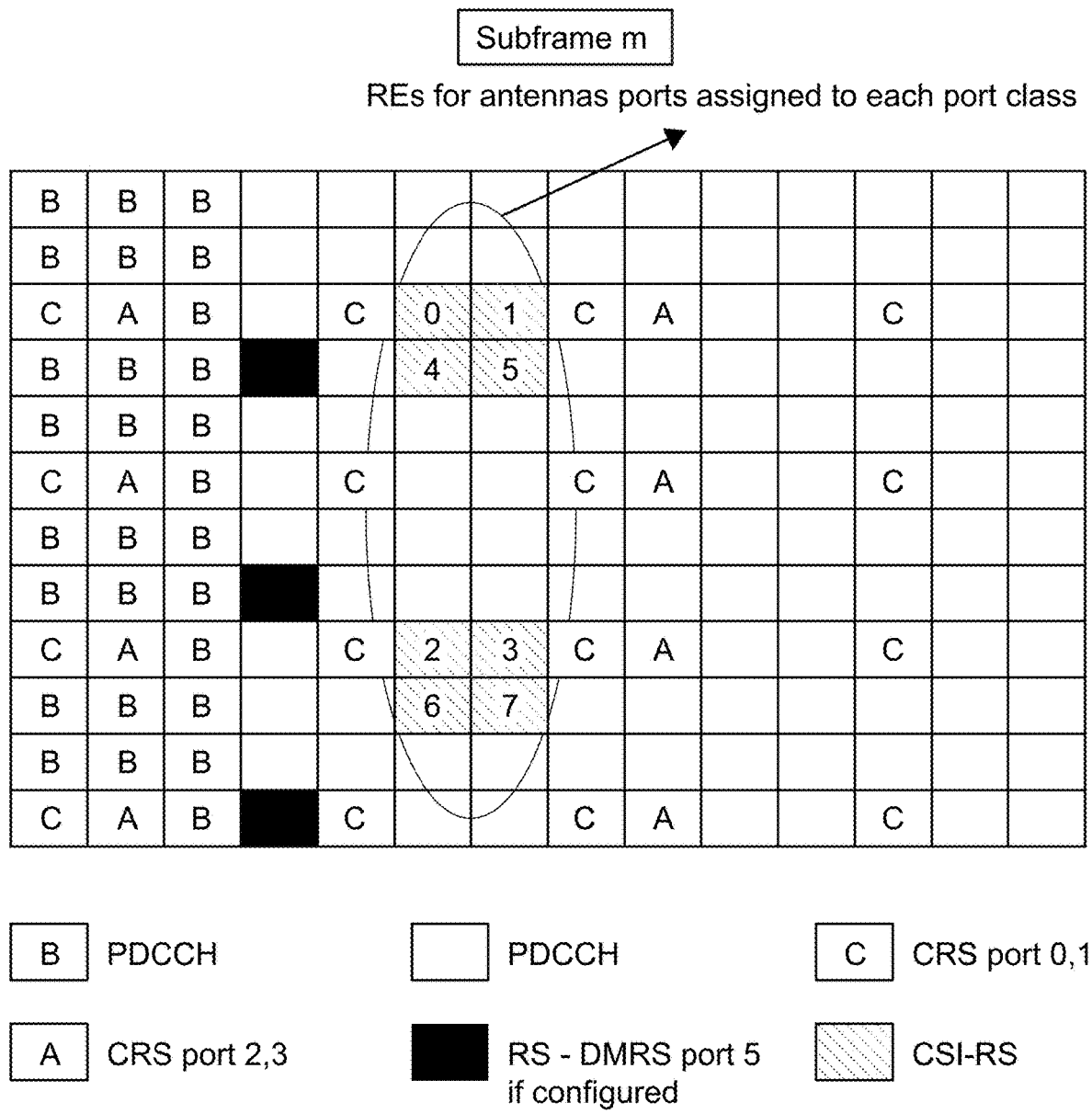
FIG. 43 shows another example of a beamformed CSI-RS port reuse resource allocation in accordance with an example embodiment.

By way of example, assume there is a 16×16 antenna array and the KP-based CSI-RS is applied. The RB diagram in FIG. 38 shows an example of how the CSI-RS ports/REs are allocated per RB to estimate the full channel without port reduction, which requires 32 REs for KP-based CSI-RS. By way of further example, suppose that the port class format with size 2 in FIG. 36 is selected by the eNB. To efficiently enhance the current CSI-RS design to reduce the CSI-RS overhead in accordance with an example embodiment, the antennas in the same class can use the same CSI-RS REs, which reduces the number of required REs from 32 to 16 as shown in FIG. 43.

Figure 42:
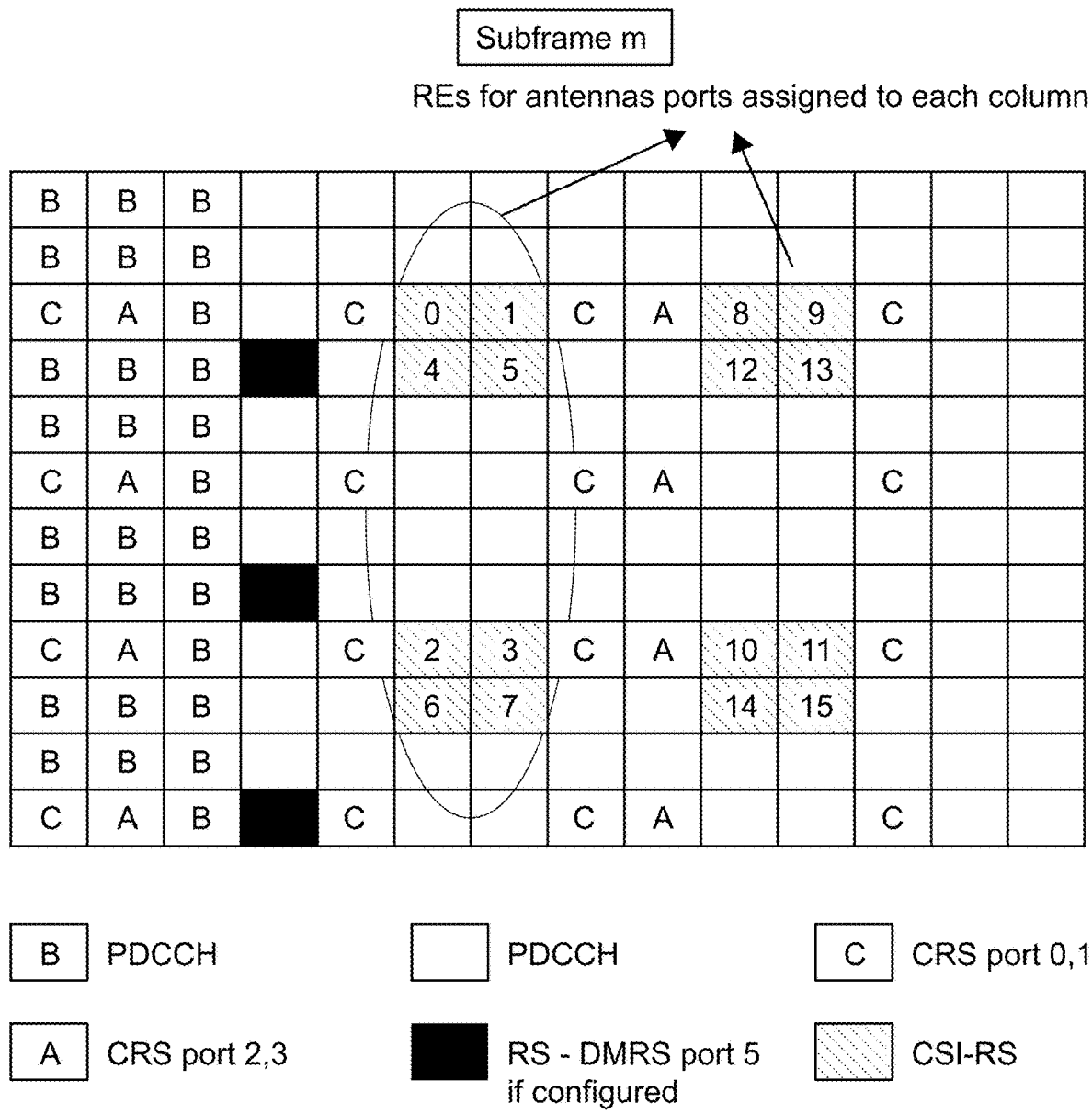
FIG. 42 shows an example of a beamformed CSI-RS port reuse resource allocation for a full channel estimation in accordance with an example embodiment.

By way of yet another example, assume there is a 16×16 antenna array and the beamformed CSI-RS is applied. The RB diagram in FIG. 42 shows an example of how the CSI-RS ports/REs can be allocated per RB for beamformed CSI-RS to estimate the full channel, which requires 16 REs without port reduction. Assuming that the port class format with size 2 in FIG. 37 is selected by the eNB, to efficiently enhance the current CSI-RS design to reduce the CSI-RS overhead in accordance with the example embodiment, the antennas in the same class can use the same CSI-RS REs, which reduces the number of required REs from 16 to 8 as shown in FIG. 43.

To support the above-described neighbor port reduction, port class size and format pattern index is sent from the eNB to the UEs, and each UE determines the codebook for the PMI calculation based on them. It will be understood that these parameters can be carried in multiple messages as desired. For example, the parameters can be added to other DCI formats as new fields or a new special DCI format can be created that is sent from the eNB to each UE via PDCCH or ePDCCH. Further, these parameters can be added in future NR downlink control channels because it is recognized herein that future cellular systems may have control channels other than PDCCH and ePDCCH. The proposed port class size and format pattern index fields in a new or reused DCI format are illustrated in Table 12 by way of example. The information can be periodically or aperiodically transmitted via PDCCH or ePDCCH or any future NR control channels based on, for example, a given UE's location, speed, or other context information associated with the UE. When applied to a static or low-mobility scenario, it can be less frequently transmitted as compared to a high-mobility scenario, in accordance with one example.

TABLE 12

Example of Port Class Size field and Format patter index field in a DCI Format

| Field Name | Length (Bits) |
| --- | --- |
| Port Class Size | 3 |
| Format Pattern Index | 3 |
| MCS | 5 |
| PMI confirmation for precoding | 1 |
| . . . | . . . |

As described above, regardless of whether the KP-based CSI-RS scheme or the beamformed CSI-RS scheme is applied, the number of REs used for transmitting CSI-RS may be further reduced by a factor of M. It will be understood that the embodiments described herein can also be applied to other CSI-RS schemes, such as the legacy orthogonal CSI-RS scheme for example.

Turning now to DL reference signals, to support a wide range of user mobility scenarios with low-latency in NR, reference signaling may be enhanced in DL NR.

In accordance with various example embodiments, DM-RS location within a slot/mini-slot or subframe may be flexible and adaptive to scenario-specific performance requirements. As an example case, a given DM-RS may be front-loaded, so that the proximity of DM-RS to control data allows accurate estimation channel at control data resources, thereby rendering accurate demodulation/decoding of control data. Further, an early DM-RS may minimize the delay in demodulation/decoding by delivering channel estimates early on.

Figure 44:
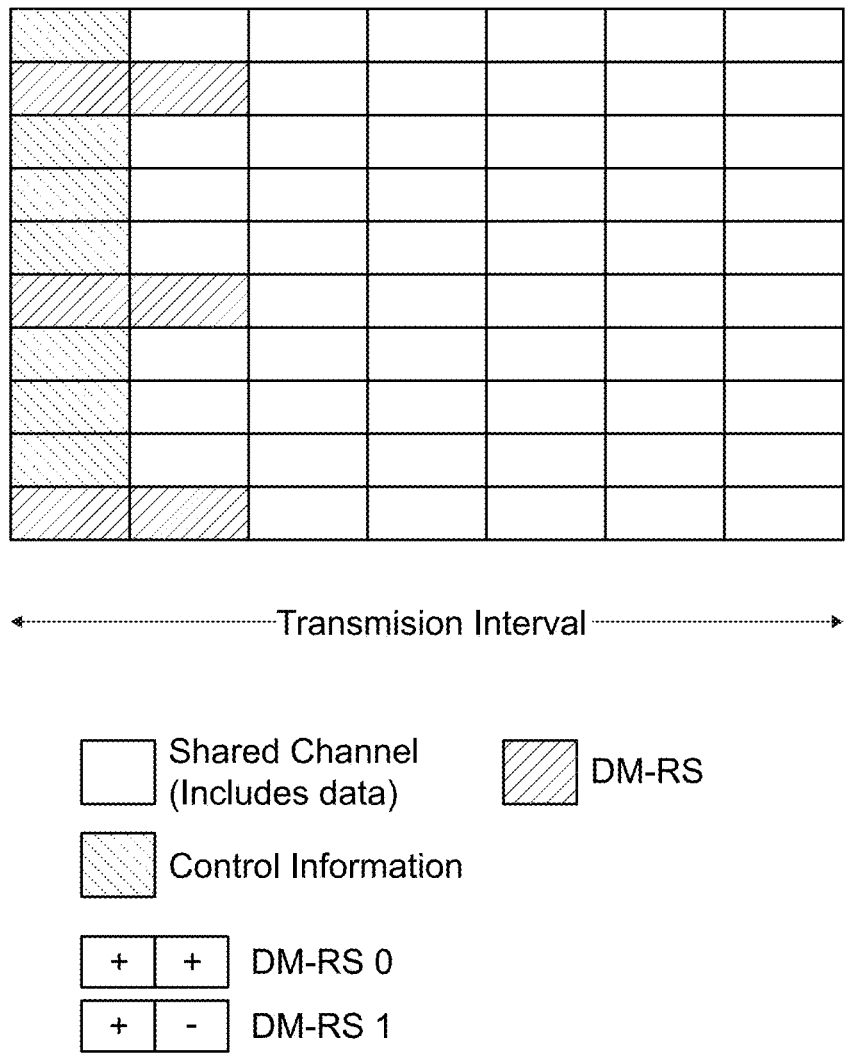
FIG. 44 is a diagram that illustrates an example front loaded DM-RS pattern with multiple ports.
Figure 45:
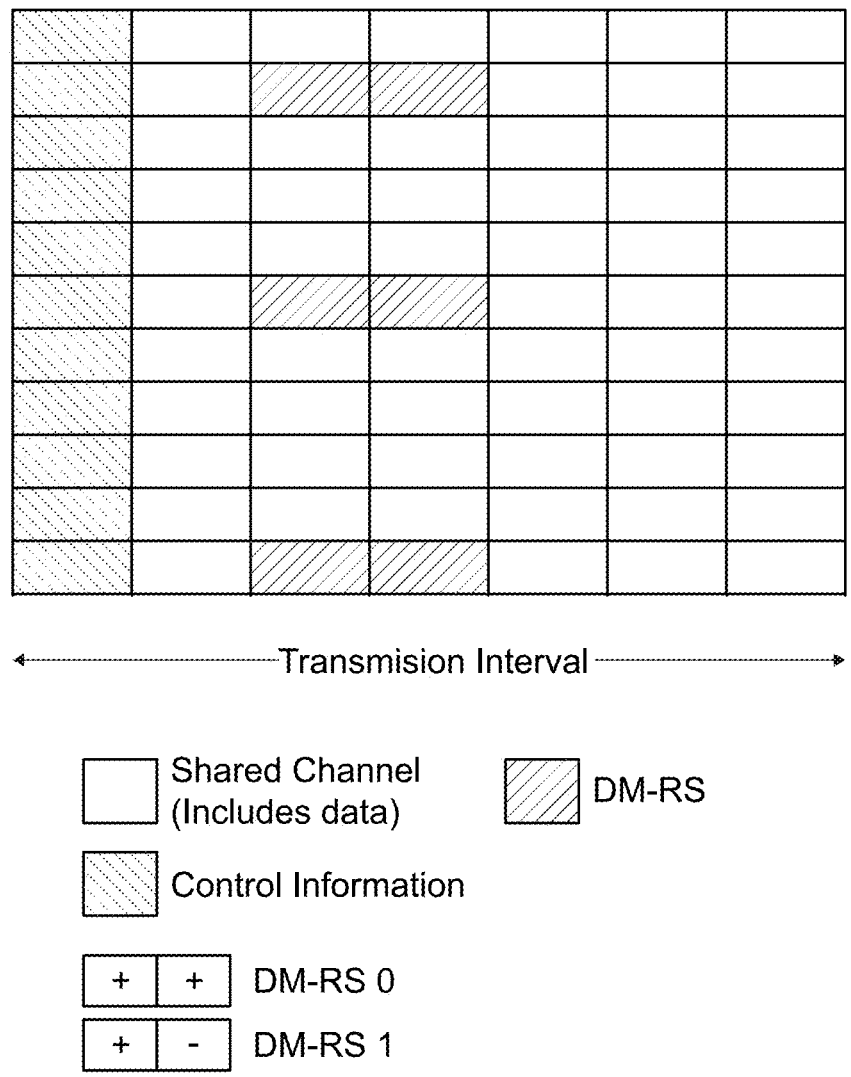
FIG. 45 is a diagram that illustrates an example DM-RS placement in center symbols of a transmission time.

FIG. 44 shows support for two ports via OCC. In general, support for N-layers can be achieved via appropriate codes. FIG. 45 shows that a DM-RS may be placed in the middle of a transmission interval so that channel estimates obtained over the entire duration of the interval may be more accurate as compared to having front-loaded DM-RS. Although the latency is higher for decoding control information, in some cases, mMTC and eMBB may be able to tolerate the latency.

Figure 46:
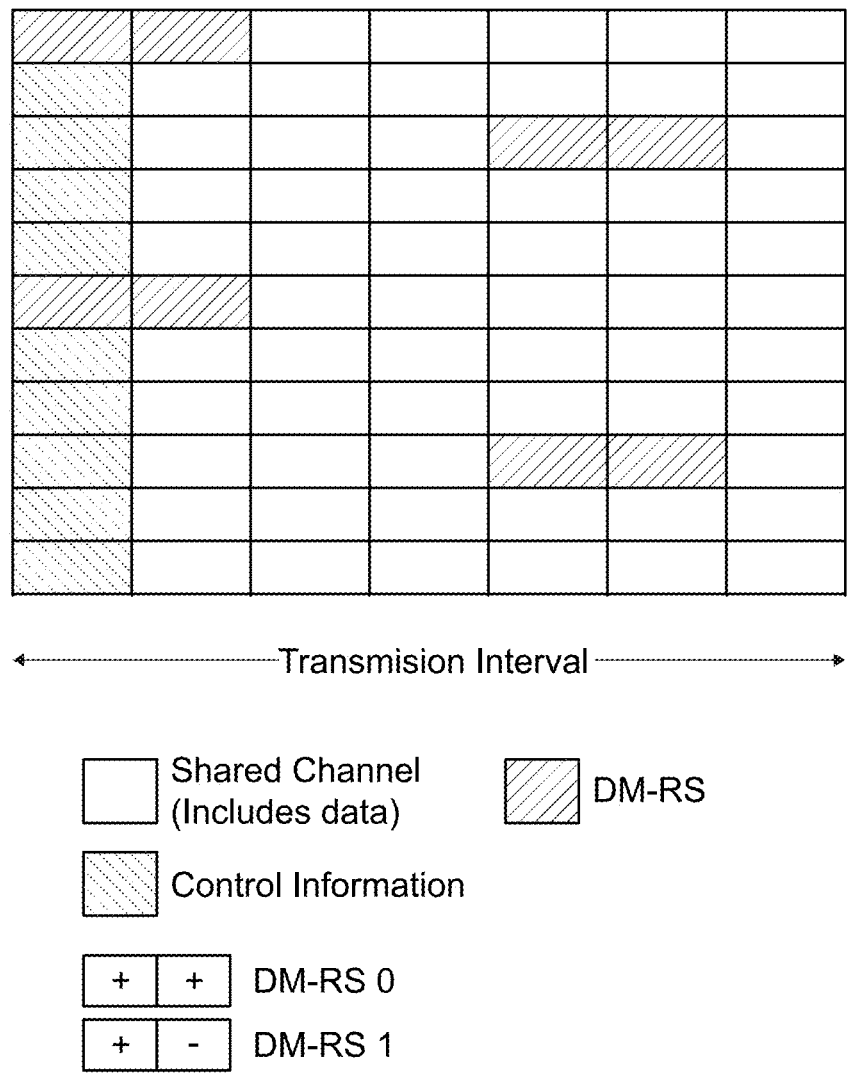
FIG. 46 is a diagram that illustrates an example DM-RS for higher mobility scenarios spread over time.

FIG. 46 shows an example DM-RS allocated with higher density in the transmission interval. For example, for high Doppler scenarios, the DM-RS may be allocated in multiple symbols spread over time, to enable accurate channel estimation.

Figure 47A:
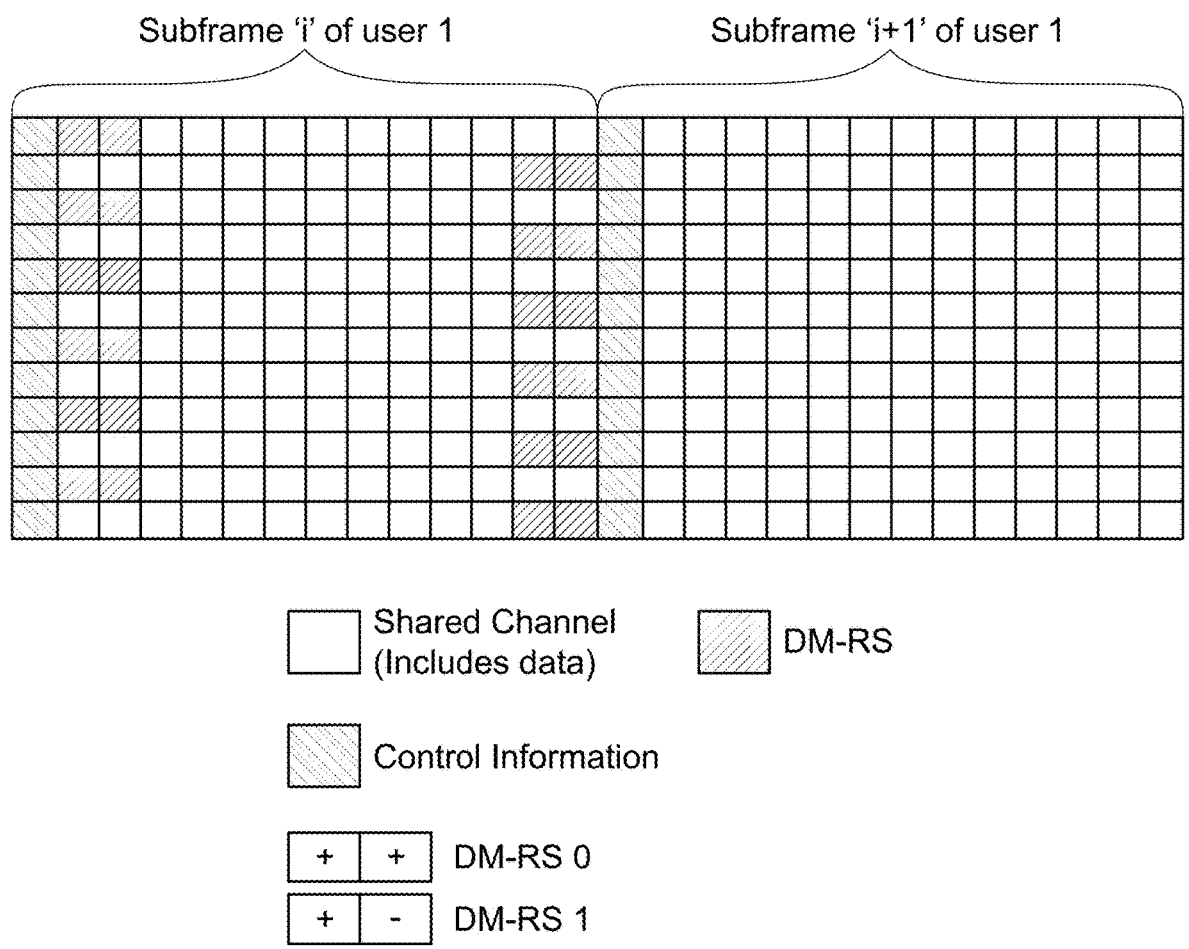
FIG. 47A illustrates an example of sharing between two subframes of the same user.
Figure 47B:
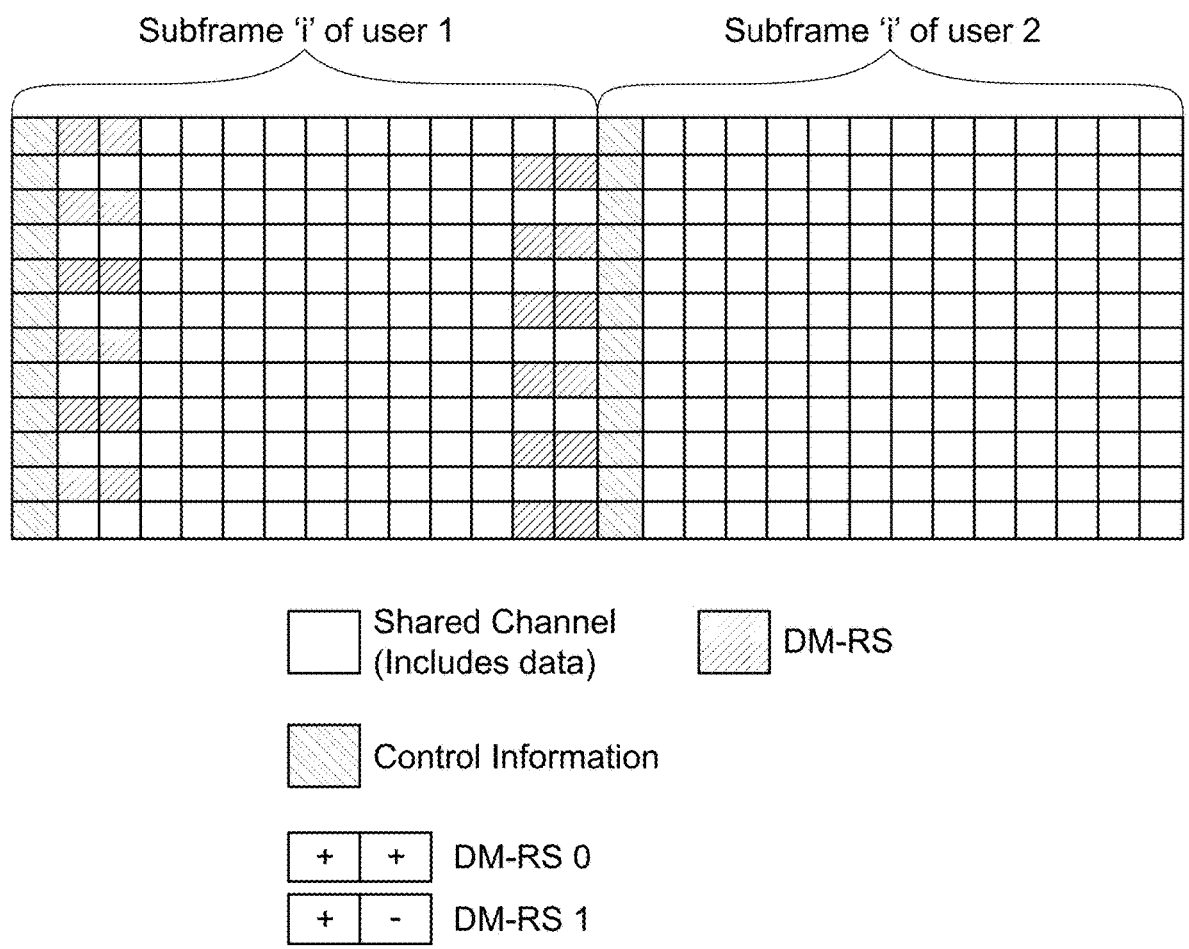
FIG. 47B illustrates an example of sharing between sub-frames of two different users who are precoded the same way.

For a scenario in which the UEs have low mobility, the DM-RS may be placed at the end of a minislot 'i', and be used to provide channel estimates to subframes 'i' and 'i+1'. Similarly, a given DM-RS can be shared between multiple UEs. For UEs 1 and 2 that have consecutive RBs in the same band, the DM-RS may be placed at the end of subframe '1', and may be used to provide channel estimates to two subframes belonging to different users. FIGS. 47A and 47B depict the aforementioned scenarios. In particular, FIG. 47A depicts sharing between two subframes of the same user, and FIG. 47B depicts sharing between subframes of two different users who are precoded the same way.

Figure 48:
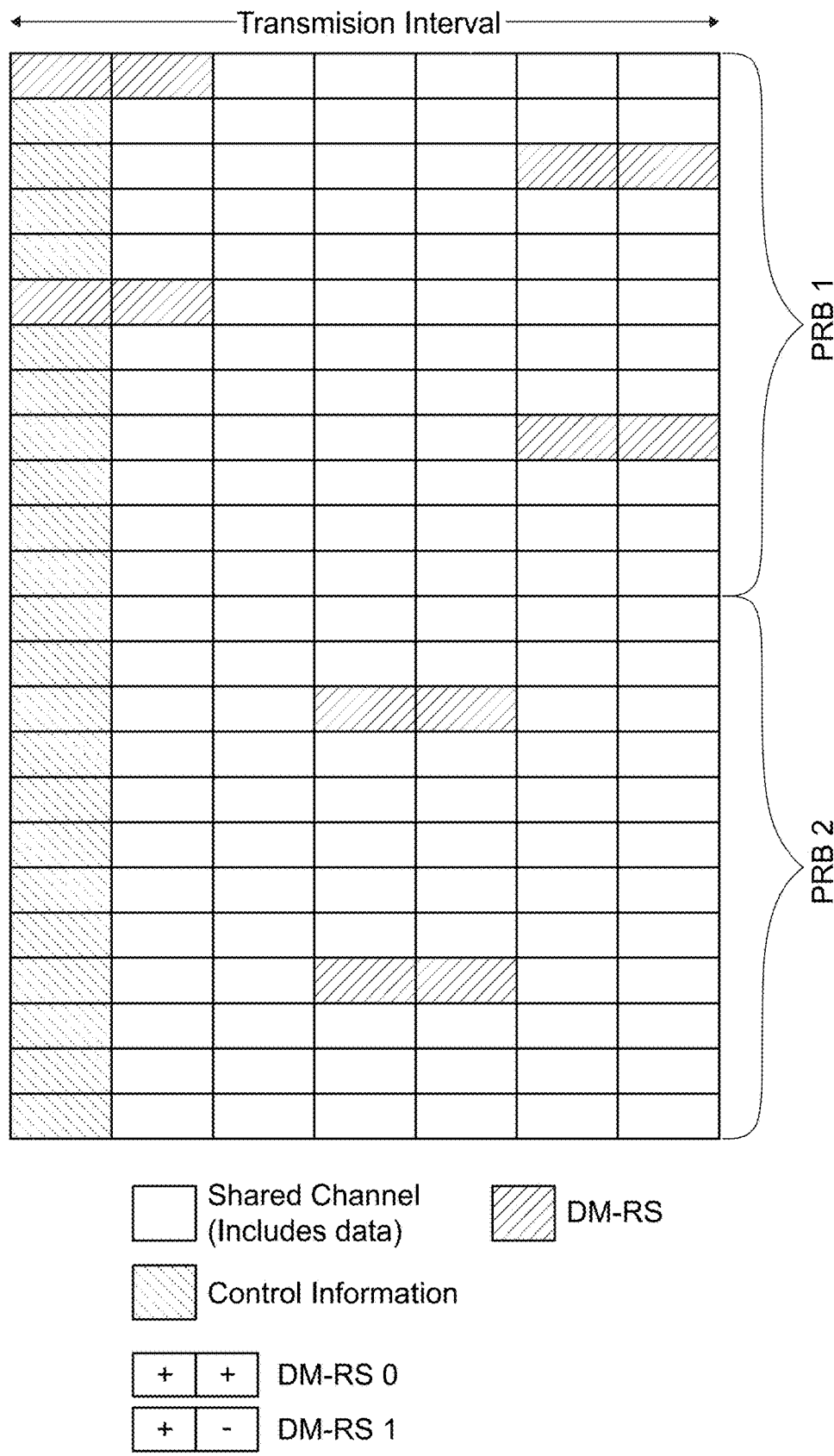
FIG. 48 is a diagram that illustrates an example of two bundled PRBs that undergo the same precoding but have different DM-RS patterns.

NR can support PRB bundling and can allow flexible location of DM-RS resources in the bundled PRBs. In FIG. 48, two bundled PRBs with different DM-RS patterns undergo the same precoding. PRB1 may have the DM-RS allocated in a manner in which it can be shared with a neighboring UE. As shown, PRB2 may have a lower density of DM-RS allocation as compared to PRB1.

In some cases, the resource assignment of DM-RS can be either dynamic or semi-static. Dynamic signaling can be done through DCI. A list of possible DM-RS patterns (locations and sequences) may be predetermined, out of which one may be assigned to a given UE. The assigned resource may be indicated through an index into the list. When semi-static signaling is used, for example, RRC or MAC CE updates may indicate the DM-RS configurations. The DM-RS may have the same numerology as data.

Turning now to Tracking Reference Signals (TRS) for phase tracking in NR, it is recognized herein that phase noise increases with increasing carrier frequency. Phase tracking issues in NR are now addressed.

In some cases, a TRS is not sent all the time. For example, a tracking RS might only be sent when needed, thereby avoiding costly transmission overhead brought by TRS transmissions. One or more of the following factors may influence the choice of switching TRS on or off, presented by way of example and without limitation:

Modulation order: The absence of phase tracking RS may have a more deteriorating effect on BLER when data is higher order modulated as compared to when it is lower order modulated.

Carrier frequency: In some cases, increasing carrier frequency may necessitate turning on Tracking RS.

UE speed: In some cases, increasing UE speed increases the Doppler, which implies the need to turn on Tracking RS.

Sub-carrier Spacing: In some cases, increased sub-carrier spacing may increase inherent immunity of system to carrier frequency offset, thereby reducing the need for Tracking RS.

A given TRS may be UE-specific or cell-specific. On/Off signaling for tracking RS may be done via distinct signaling, for example, depending on whether it is UE-specific or cell-specific. In an example in which TRS is UE-specific, it may be configured via RRC signaling and turned on/off through RRC signaling/MAC CE updates, or dynamically through the DCI. In an example in which a given TRS is cell/beam wide, system information may be used to signal its presence and resources.

Figure 49:
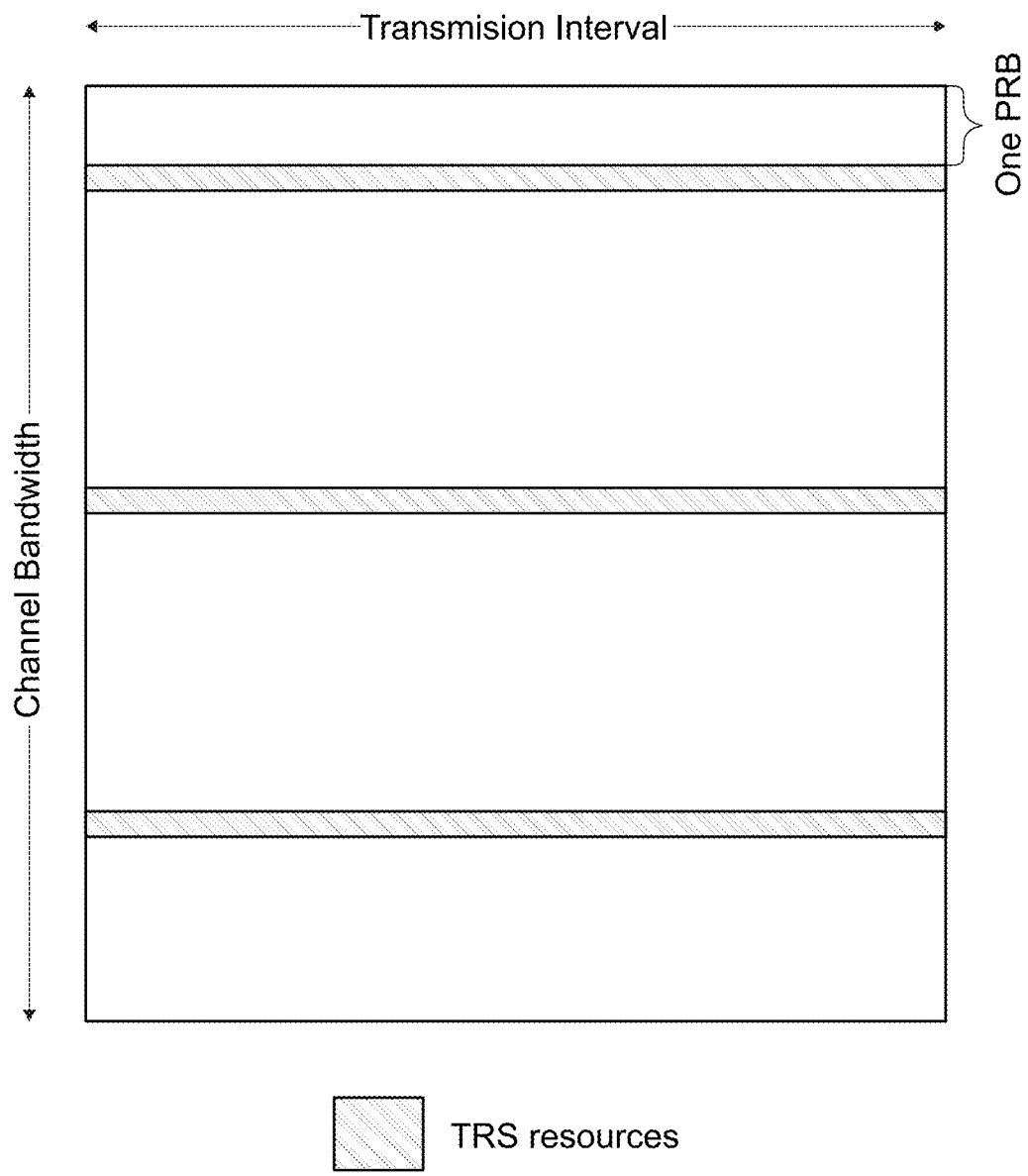
FIG. 49 is a diagram that illustrates an example tracking reference signal (TRS) that is assigned in specific resources across the available bandwidth.

FIG. 49 shows an example cell/beam wide case in which TRS resources are assigned in specific locations in the grid. Enough TRS resources may be reserved so that UEs that may operate only in certain subbands of available spectrum can access the TRS. FIGS. 50A-C show an example UE-specific case in which each UE can have TRS resources assigned according to its SNR, modulation, numerology, etc.

With respect to an example UE-specific TRS, a tracking RS may be precoded. Further, location and sequence of Tracking RS may depend on one or more of beam ID, cell ID, or UE-specific resource such as, for example, a root/shift of a sequence assigned to the UE or a location of the DL resources for the UE.

In an example cell/beam wide TRS, the TRS may be transmitted in resources that are known to the UEs. Further, the TRS may be a function of one or more of a Cell ID or a Beam ID.

In an example, a TRS transmission may be configured on one or more ports. In some scenarios it may be sufficient to track phase by transmitting the TRS on a single port. So, in an example, the TRS on a single port is supported by default. A NR system may also support more ports for TRS. The resources for the ports may be configured for both cell/beam wide and UE specific use cases through DCI or RRC signaling.

Figure 51:
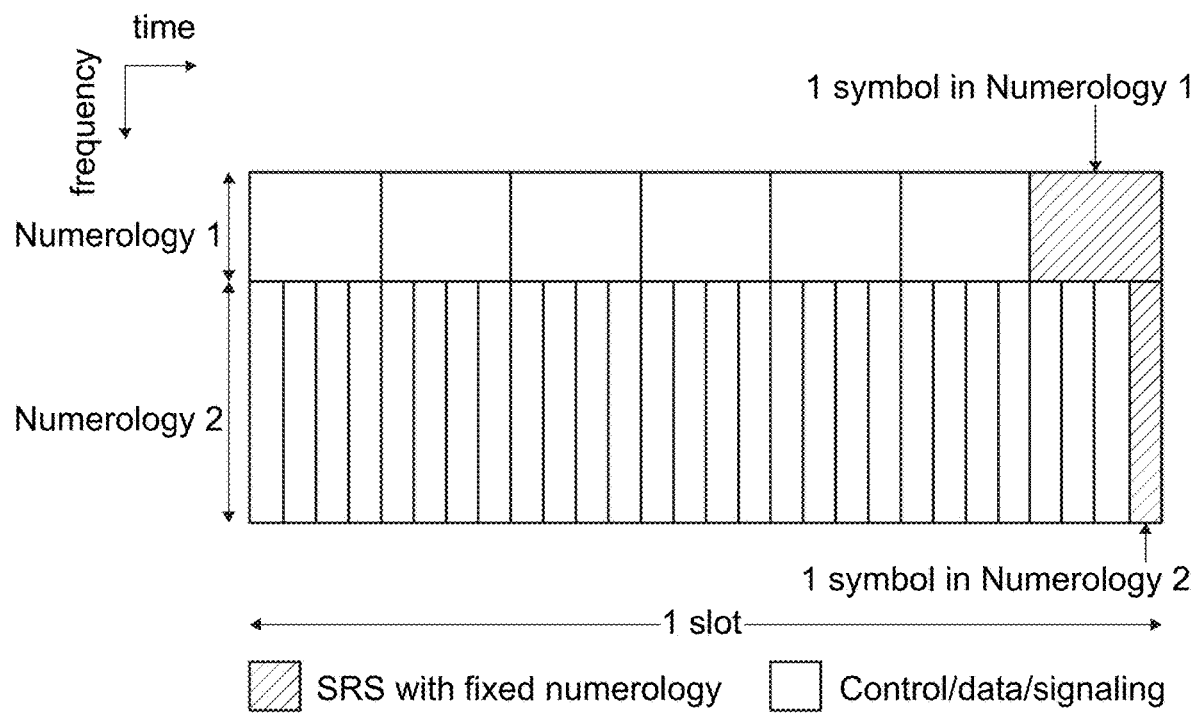
FIG. 51 is a diagram that illustrates example sub-bands with different numerologies for a Sounding Reference Signals (SRS).

Turning now to SRS resource allocation, in an example, NR-SRS numerology and resources are allocated in a manner compatible with supported data and control signal numerologies, and TDM/FDM multiplexing of multiple users. Example embodiments now described can address NR-SRS signaling aspects when multiple numerologies are supported simultaneously in a carrier. In an example, an NR-Node can allocate various resources for NR-SRS transmission. For example, the NR node can allocate certain OFDM symbols, or portions of the OFDM symbols may be reserved in a cell-wide or beam-wide manner for transmitting SRS in each supported numerology. As shown in FIG. 51, the network divides the transmission BW into two numerologies: Numerology 1 that supports 15 KHz subcarrier spacing; and Numerology 2 that supports 60 KHz subcarrier spacing. Within the bandwidth assigned to each numerology, the SRS transmission may have the same numerology.

Figure 52:
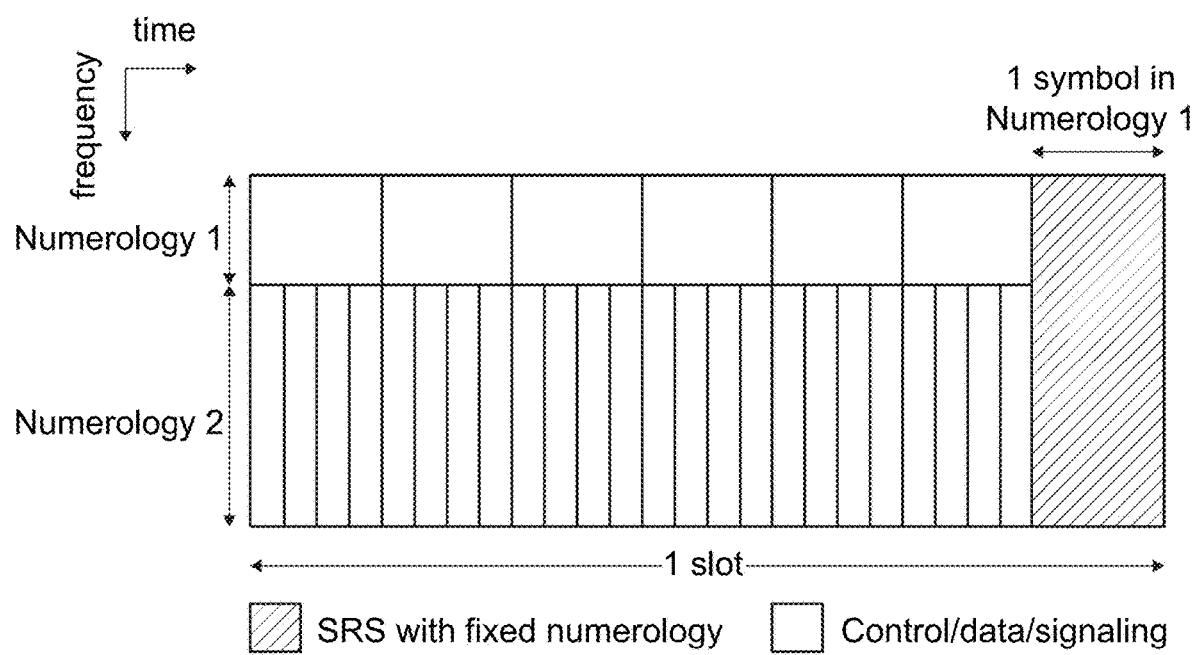
FIG. 52 is a diagram that illustrates an example fixed numerology for SRS resources.

The NR node can allocate certain OFDM symbols, or portions of the OFDM symbols may be reserved in a cell-wide or beam-wide manner in a reference numerology that may be associated to the carrier frequency or indicated by the system information. This aspect is illustrated by way of example in FIG. 52, where the SRS is always transmitted at a fixed numerology, although other signaling may occur in other numerologies. FIG. 52 shows an example in which an SRS is transmitted over 1 symbol corresponding to Numerology 1. The specific numerology can be assigned via a semi-static configuration, such as RRC signaling for example, or dynamically assigned by the DL DCI, for example.

Figure 54:
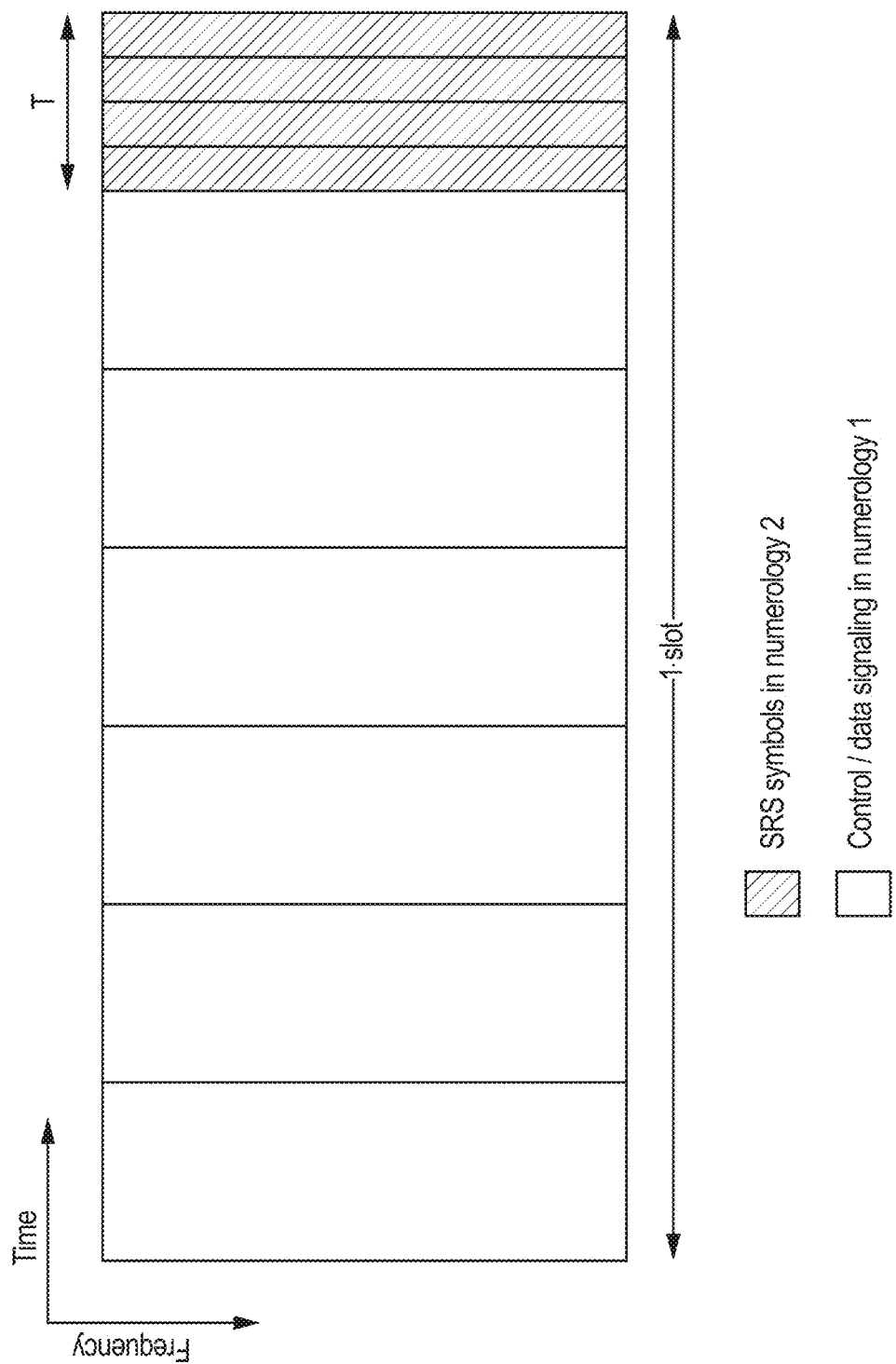
FIG. 54 is a diagram that illustrates an example SRS signaled with different numerologies with reserved resources in a given time duration T.

Alternatively, the SRS resources may be defined in units of time and may be configured to support any numerology. In this example, the reserved time may carry different numbers of NR-SRS symbols for different numerologies. This aspect is illustrated in FIG. 54 by way of example, where the NR-SRS resource is reserved for a fixed time duration T. Different numerologies may be used within this duration. For example, 1 symbol of NR-SRS may be reserved at 15 KHz subcarrier spacing (Numerology 1), or 2 symbols of NR-SRS may be reserved at 60 KHz subcarrier spacing (Numerology 2).

User equipment (UE) can be any device used by an end-user to communicate. It can be a hand-held telephone, a laptop computer equipped with a mobile broadband adapter, or any other device. For example, the UE can be implemented as the wireless transmit/receive units (WTRUs) 102 (such as 102a, 102b, 102c, and/or 102d) of FIG. 53A-F.

Radio Access nodes can include Node B, eNode B, 5G RAN nodes or any other node to provide access, which could be either located in the control plane, or in the user plane, and could be located in a centralized location (e.g., data center, cloud, i.e. central controller or central unit in support of virtualization) or could be located at the edge of the RAN as a distributed RAN unit for e.g. a Transmit Reception Point (TRP) with RAN functions located at the edge of the RAN. Radio access nodes (radio access nodes 103/1004/105) can be implemented as one of the apparatus of FIGS. 53A-F.

Similarly, core/control nodes can include MME, 5G CN control node, 5G network control entity, control unit located in the control plane, S-GW, P-GW or 5G core network equivalent node, 5G core network gateway or user data processing unit located in the data plane or user plane. Core/control nodes (core network 106/107/109) can be implemented as one of the apparatus of FIGS. 53A-F.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 53A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 53A-E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 53A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 53A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 53A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 53A may be configured to communicate with the base station 114a, which may employ a cellular-based radio technology, and with the base station 114c, which may employ an IEEE 802 radio technology.

FIG. 53B is a block diagram of an example apparatus or device configured for wireless communications in accordance with the embodiments illustrated herein, such as for example, a WTRU 102. As shown in FIG. 53B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 53B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 53B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 53A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite.

The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 53A may be configured to communicate with the base station 114a, which may employ a cellular-based radio technology, and with the base station 114b, which may employ an IEEE 802 radio technology.

FIG. 53B is a block diagram of an example apparatus or device configured for wireless communications in accordance with the embodiments illustrated herein, such as for example, a WTRU 102. As shown in FIG. 53B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 53B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 53B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 53B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

FIG. 53C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 53C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 53C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 53C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

FIG. 53D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 53D, the eNode-Bs 160a, 160b, 160c may communicate with one another over an X2 interface.

The core network 107 shown in FIG. 53D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

FIG. 53E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 53E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 53E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 53E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 53A, 53C, 53D, and 53E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 53A, 53B, 53C, 53D, and 53E are provided by way of example only, and it is understood that the subject matter disclosed and claimed herein may be embodied or implemented in any similar communication system, whether presently defined or defined in the future.

FIG. 53F is a block diagram of an exemplary computing system 90 in which one or more apparatuses of the communications networks illustrated in FIGS. 53A, 53C, 53D and 53E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 53A, 53B, 53C, 53D, and 53E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to NR technologies that may appear in the above description. Unless otherwise specified, the acronyms used herein refer to the corresponding term listed below.

AAS Active Antenna System
AoA Angle or Arrival
AoD Angle of Departure
AR Augmented Reality
AS Access Stratum
BF-RS Beam Form Reference Signal
CE Control Element
CoMP Coordinated Multipoint
CP Cyclic Prefix
CQI Channel Quality Indication
CRS Cell-specific Reference Signals
CSI Channel State Information
CSI-RS Channel State Information Reference Signals
DCI Downlink Control Information
DL DownLink
DM-RS Demodulation Reference Signals
eMBB enhanced Mobile Broadband
eNB evolved Node B
ePDCCH Enhanced Physical Downlink Control CHannel
FD Full-Dimension
FDD Frequency Division Duplex
FFS For Further Study
GUI Graphical User Interface
HARQ Hybrid Automatic Repeat Request
ID Identification
IMT International Mobile Telecommunications
KP Kronecker-Product
KPI Key Performance Indicators
LTE Long Term Evolution
MAC Medium Access Control
MCL Maximum Coupling Loss
MCS Modulation and Coding Scheme
MME Mobility Management Entity
MIMO Multiple-Input and Multiple-Output
NAS Non-Access Stratum
NB Narrow Beam
NDI New Data Indicator
NEO NEtwork Operation
NR-Node New Radio-Node
OCC Orthogonal Cover Codes
OFDM Orthogonal Frequency Division Multiplexing
PDCCH Physical Downlink Control Channel
PDSCH Physical Downlink Shared Channel PMI Precoder Matrix Indication
PRS Positioning Reference Signals
PUSCH Physical Uplink Shared Channel
PUCCH Physical Uplink Control Channel
RAT Radio Access Technology
RB Resource Block
RE Resource Element
RI Rank Indication
RRC Radio Resource Control
RRH Remote Radio Head
RS Reference Signal
RSSI Received Signal Strength Indicator
RSRP Reference Signal Received Power
RSRQ Reference Signal Received Quality
RV Redundancy Version
SC-FDMA Single Carrier-Frequency Division Multiple Access
SI System Information
SIB System Information Block
SISO Single-Input and Single-Output
SRS Sounding Reference Signal
2D Two-Dimensional
3D Three-Dimensional
TDD Time Division Duplex
TPC Transmit Power Control
TRP Transmission and Reception Point
TTI Transmission Time Interval
UAV Unmanned Aerial Vehicle
UE User Equipment
UL UpLink
URLLC Ultra-Reliable and Low Latency Communications
VR Virtual Reality
WB Wide Beam
WRC Wireless Planning Coordination

What is claimed:

1. An apparatus comprising a processor, a memory, and communication circuitry, the apparatus being connected to a network via its communication circuitry, the apparatus further comprising computer-executable instructions stored in the memory which, when executed by the processor, cause the apparatus to perform operations comprising:
   obtaining a first reference signal configuration and a second reference signal configuration, the first and second reference signal configurations being for a New Radio (NR) system;
   transmitting a first reference signal on uplink in accordance with the first reference signal configuration; and
   receiving a second reference signal on downlink in accordance with the second reference signal configuration,
   wherein, the first and second reference signal configurations comprise:
   start time information indicating start time of reference signal allocations in time domain;
   time allocation pattern information;
   start frequency information indicating start frequency of reference signal allocations in frequency domain;
   frequency allocation information indicating number of resource allocation for reference signals in frequency domain;
   frequency allocation pattern information indicating relation between subcarrier numbers and reference signal allocation numbers in frequency domain; and
   periodicity information indicating periodicity of reference signal.

2. The apparatus of claim 1, wherein the first reference signal configuration and the second reference signal configurations pertain to Orthogonal Frequency Division Multiplexing (OFDM) symbols in time domain and to subcarriers or resource blocks in frequency domain.

3. The apparatus of claim 1, wherein the periodicity information indicating periodicity of a reference signal indicates that a reference signal is aperiodic.

4. The apparatus of claim 1, wherein the first reference signal configuration pertains to a Sounding Reference Signal (SRS).

5. The apparatus of claim 1, wherein the second reference signal configuration pertains to a Channel State Information Reference Signal (CSI-RS).

6. The apparatus of claim 5, wherein the CSI-RS is used for mobility.

7. The apparatus of claim 1, wherein the first reference signal configuration pertains to a Demodulation Reference Signal (DM-RS) on a Physical Uplink Shared Channel (PUSCH).

8. The apparatus of 7, wherein the DMRS is located at the beginning of an uplink time interval.

9. The apparatus of claim 1, wherein the second reference signal configuration pertains to a Demodulation Reference Signal (DM-RS) on a Physical Downlink Shared Channel (PDSCH).

10. The apparatus of 9, wherein the DMRS is located at the beginning of an uplink time interval.

11. A second apparatus comprising a processor, a memory, and communication circuitry, the apparatus being connected to a network via its communication circuitry, the second apparatus further comprising computer-executable instructions stored in the memory which, when executed by the processor, cause the apparatus to perform operations comprising:
   providing, to a first apparatus, a first reference signal configuration and a second reference signal configuration, the first and second reference signal configurations being for a New Radio (NR) system;
   receiving a first reference signal on uplink in accordance with the reference signal configuration; and
   transmitting a second reference signal on downlink in accordance with the second reference signal configuration,
   wherein, the first and second reference signal configurations comprise:
   start time information indicating start time of reference signal allocations in time domain;
   time allocation pattern information;
   start frequency information indicating start frequency of reference signal allocations in frequency domain;
   frequency allocation information indicating number of resource allocation for reference signals in frequency domain;
   frequency allocation pattern information indicating relation between subcarrier numbers and reference signal allocation numbers in frequency domain; and
   periodicity information indicating periodicity of reference signal.

12. The second apparatus of claim 11, wherein the first reference signal configuration and the second reference signal configurations pertain to Orthogonal Frequency Division Multiplexing (OFDM) symbols in time domain and to subcarriers or resource blocks in frequency domain.

13. The second apparatus of claim 11, wherein the periodicity information indicating periodicity of a reference signal indicates that a reference signal is aperiodic.

14. The second apparatus of claim 11, wherein the first reference signal configuration pertains to a Sounding Reference Signal (SRS).

15. The second apparatus of claim 11, wherein the second reference signal configuration pertains to a Channel State Information Reference Signal (CSI-RS).

16. The second apparatus of claim 15, wherein the CSI-RS is used for mobility.

17. The second apparatus of claim 11, wherein the first reference signal configuration pertains to a Demodulation Reference Signal (DM-RS) on a Physical Uplink Shared Channel (PUSCH).

18. The second apparatus of claim 17, wherein the DMRS is located at the beginning of an uplink time interval.

19. The second apparatus of claim 11, wherein the second reference signal configuration pertains to a Demodulation Reference Signal (DM-RS) on a Physical Downlink Shared Channel (PDSCH).

20. The second apparatus of claim 19, wherein the DMRS is located at the beginning of an uplink time interval.

* * * * *